(12) United States Patent
Xiang et al.

(10) Patent No.: US 11,997,158 B2
(45) Date of Patent: May 28, 2024

(54) DATA SHARING METHOD, APPARATUS, AND SYSTEM, AND ELECTRONIC DEVICE

(71) Applicant: HUAWEI TECHNOLOGIES CO., LTD., Guangdong (CN)

(72) Inventors: Chao Xiang, Shenzhen (CN); Chao Xu, Xi'an (CN); Wuping Peng, Xi'an (CN); Wenhui Liu, Xi'an (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/143,212

(22) Filed: May 4, 2023

(65) Prior Publication Data
US 2023/0275955 A1 Aug. 31, 2023

Related U.S. Application Data

(63) Continuation of application No. PCT/CN2021/125324, filed on Oct. 21, 2021.

(30) Foreign Application Priority Data

Nov. 5, 2020 (CN) .......................... 202011224839.5

(51) Int. Cl.
*H04L 67/06* (2022.01)
*H04L 43/106* (2022.01)
*H04L 67/141* (2022.01)

(52) U.S. Cl.
CPC ............ *H04L 67/06* (2013.01); *H04L 43/106* (2013.01); *H04L 67/141* (2013.01)

(58) Field of Classification Search
CPC ...... H04L 67/06; H04L 67/141; H04L 43/106

USPC ......................................................... 709/203
See application file for complete search history.

(56) References Cited

U.S. PATENT DOCUMENTS

| 2016/0150063 | A1* | 5/2016 | Choi ................. | H04M 1/72403 |
| | | | | 455/414.1 |
| 2019/0250835 | A1* | 8/2019 | Piccinini ................. | G06F 21/78 |
| 2019/0340150 | A1* | 11/2019 | Kim .................... | H04L 67/1097 |
| 2020/0228950 | A1* | 7/2020 | Clark ....................... | H04L 67/06 |
| 2020/0259884 | A1* | 8/2020 | Schmidt ................ | H04L 67/306 |

FOREIGN PATENT DOCUMENTS

CN   104243517 A  * 12/2014  ......... H04L 12/1813

\* cited by examiner

*Primary Examiner* — Ruolei Zong
(74) *Attorney, Agent, or Firm* — WOMBLE BOND DICKINSON (US) LLP

(57) ABSTRACT

This application provides a data sharing method and apparatus relating to the field of data communications technologies. In the method, a cloud device may select a target device from a first device group through screening based on a data sharing policy and received status information of at least one device in the first device group. Then, the cloud device may indicate the target device to send data associated with the data sharing policy for a first cloud account to at least one device in a second device group. The first cloud account is used to log in to a device in the first device group, a second cloud account is used to log in to a device in the second device group, and the cloud device stores the data sharing policy for the first cloud account and an association relationship between the first cloud account and the second cloud account.

20 Claims, 40 Drawing Sheets

US 11,997,158 B2

DATA SHARING METHOD, APPARATUS, AND SYSTEM, AND ELECTRONIC DEVICE

CROSS-REFERENCE TO RELATED APPLICATIONS

This application is a continuation of International Application No. PCT/CN2021/125324, filed on Oct. 21, 2021, which claims priority to Chinese Patent Application No. 202011224839.5, filed on Nov. 5, 2020. The disclosures of the aforementioned applications are hereby incorporated by reference in their entireties.

TECHNICAL FIELD

This application relates to the field of data communications technologies, and in particular, to a data sharing method, apparatus, and system, and an electronic device.

BACKGROUND

With popularization of smart devices, each user may have a plurality of devices. Users may share data such as a picture, a video, or a file with each other by using their respective devices. For example, when a user A shares data with a user B, if the user A needs to share a picture in a mobile phone of the user A with the user B, the user A needs to first connect the mobile phone of the user A to a device used by the user B, and then the user A sends the picture in the mobile phone of the user A to the device used by the user B, so as to complete data sharing. If the user A needs to share a video in a computer of the user A with the user B, the user A needs to first connect the computer of the user A to a device to which the user B belongs, and then the user A sends the video in the computer of the user A to the device to which the user B belongs, so as to complete data sharing. It may be learned that, currently, when different users share data with each other, the users usually need to first connect their respective devices to each other, and then share the data. The entire data sharing process is complex, has a low degree of intelligence, and has poor user experience.

SUMMARY

Embodiments of this application provide a data sharing method, apparatus, and system, and an electronic device. In this way, data sharing between cloud accounts can be implemented, so that different devices belonging to one cloud account can automatically share their respective data with a device belonging to another cloud account in a specific scenario. This simplifies a data sharing process, and improves a degree of intelligence of data sharing.

According to a first aspect, an embodiment of this application provides a data sharing method, applied to a system including a first device group, a second device group, and a cloud device, where the first device group and the second device group each include at least one device, a first cloud account is used to log in to a device in the first device group, a second cloud account is used to log in to a device in the second device group, the cloud device stores a data sharing policy for the first cloud account and an association relationship between the first cloud account and the second cloud account, and the method includes:

The at least one device in the first device group sends first status information of the at least one device in the first device group to the cloud device.

In response to receiving the first status information of the at least one device in the first device group, the cloud device determines a target device based on the first status information and the data sharing policy, where the target device is one of the at least one device in the first device group.

The cloud device sends a first message to the target device in response to determining the target device, where the first message is used to indicate the target device to share data.

The target device sends first data to the at least one device in the second device group in response to receiving the first message, where the first data is associated with the data sharing policy for the first cloud account.

In this way, data sharing between cloud accounts is implemented, so that different devices belonging to one cloud account can automatically share their respective data with a device belonging to another cloud account in a specific scenario. This simplifies a data sharing process, and improves a degree of intelligence of data sharing.

In an embodiment, the first device group includes a first device and a second device, the data sharing policy includes a correspondence between the first device and a first sharing policy and a correspondence between the second device and a second sharing policy, the first sharing policy includes a first sharing object, a first data sharing type, and a first data sharing condition, the second sharing policy includes the first sharing object, a second data sharing type, and a second data sharing condition, and the first sharing object is associated with the second cloud account. In this way, content included in the data sharing policy is indicated.

In an embodiment, that the first data is associated with the data sharing policy for the first cloud account is specifically: The first data is all or a part of data included in the first data sharing type.

In an embodiment, a data sharing type includes one or more of a data type, a file type, and a multimedia type, a data sharing condition includes one or more of a data sharing scenario, a data sharing priority, and a data sharing time period, and the data sharing scenario includes one or more of a sports scenario, an entertainment scenario, and a driving scenario. In this way, specific forms of the data sharing type, the data sharing condition, and the data sharing scenario are determined.

In an embodiment, the first data sharing condition and the second data sharing condition each are a data sharing scenario, the data sharing scenario corresponding to the first data sharing condition is a driving scenario, and the data sharing scenario corresponding to the second data sharing condition is an entertainment scenario.

That the at least one device in the first device group sends first status information of the at least one device in the first device group to the cloud device is specifically:

The first device sends first status information of the first device to the cloud device, where the first status information of the first device includes speed information and an identifier of the first device.

The second device sends first status information of the second device to the cloud device, where the first status information of the second device is screen brightness information and an identifier of the second device.

That the cloud device determines a target device based on the first status information and the data sharing policy is specifically:

if a speed of the first device is greater than a preset speed threshold, determining that the first device meets the driving scenario, and determining that the first device is the target device; and/or if screen brightness of the second device is greater than a preset brightness threshold, determining that the second device meets the entertainment scenario, and determining that the second device is the target device.

In this way, a process of determining the target device is presented in a specific scenario.

In an embodiment, the first data sharing condition and the second data sharing condition each are a data sharing time period, the data sharing time period corresponding to the first data sharing condition is a first time period, and the data sharing time period corresponding to the second data sharing condition is a second time period.

That the at least one device in the first device group sends first status information of the at least one device in the first device group to the cloud device is specifically:

The first device sends first status information of the first device to the cloud device, where the first status information of the first device includes first running information and an identifier of the first device, and the first running information is used to indicate whether the first device is in a running state.

The second device sends first status information of the second device to the cloud device, where the first status information of the second device includes second running information and an identifier of the second device, and the second running information is used to indicate whether the second device is in a running state.

That the cloud device determines a target device based on the first status information and the data sharing policy is specifically:

if both the first device and the second device are in a running state, and a current time period belongs to the first time period, determining that the first device is the target device; or if both the first device and the second device are in a running state, and a current time period belongs to the second time period, determining that the second device is the target device.

In this way, a process of determining the target device is presented in a specific scenario.

In an embodiment, the first device is a vehicle, and the first running information includes speed information and/or start/stop information of the vehicle; and/or the second device is an electronic device having a screen, and the second running information includes screen brightness information and/or power-on/off information of the electronic device. Therefore, specific content of the running information is described.

In an embodiment, the data sharing condition further includes the data sharing priority, and a priority of the first device is higher than that of the second device.

That the cloud device determines a target device based on the first status information and the data sharing policy is specifically:

If both the first device and the second device meet the data sharing scenario and/or the data sharing time period, the cloud device determines that the first device is the target device. In this way, a process of determining the target device is presented in a specific scenario.

In an embodiment, the data sharing policy further includes a data sharing periodicity. In this way, periodic data sharing is implemented.

In an embodiment, the first device group further includes a third device, and the third device is configured to:

detect a first operation entered by a user on a first interface of the third device, where the first interface displays an identifier of the at least one device in the first device group, and the first operation corresponds to the identifier of the first device in the identifier of the at least one device in the first device group;

display, by the third device, a first setting interface in response to the detected first operation, where the first device interface is used to set a third data sharing policy for a fourth device in the first device group, and the first setting interface includes a first control;

detect a second operation entered by the user on the first control;

display a second setting interface in response to the second operation, where the second setting interface is used to set a third data sharing condition in the third data sharing policy, and the second interface includes a second control;

detect a third operation entered by the user on the second control; and display a third control on the second setting interface in response to the third operation, where the third control is used to select the third data sharing condition.

In this way, the data sharing condition is set.

In an embodiment, the third device is further configured to send the third data sharing policy to the cloud device.

The method further includes: The cloud device stores the third data sharing policy for the first cloud account in response to receiving the third data sharing policy. In this way, the cloud device stores the data sharing policy.

In an embodiment, the method further includes:

The at least one device in the first device group establishes the association relationship between the first cloud account and the second cloud account in response to a fourth operation entered by the user.

The at least one device in the first device group sends the association relationship between the first cloud account and the second cloud account to the cloud device.

The cloud device stores the association relationship between the first cloud account and the second cloud account in response to receiving the association relationship between the first cloud account and the second cloud account. In this way, the cloud device stores the association relationship between the first cloud account and the second cloud account.

In an embodiment, the method further includes:

The at least one device in the first device group sends a first request to the cloud device in response to a fifth operation entered by the user, where the first request is used to request the cloud device to establish the association relationship between the first cloud account and the second cloud account, and the first request carries the first cloud account and the second cloud account.

The cloud device establishes the association relationship between the first cloud account and the second cloud account in response to receiving the first request. In this way, the cloud device stores the association relationship between the first cloud account and the second cloud account.

In an embodiment, before the cloud device sends the first message to the target device, the method further includes:

The cloud device determines, based on second status information of the at least one device in the second device group, that a fifth device is online, where the at least one device in the second device group includes the fifth device.

That the cloud device sends a first message to the target device is specifically:

The cloud device sends the first message to the target device, where the first message carries an identifier of the fifth device.

That the target device sends first data to the at least one device in the second device group in response to receiving the first message is specifically:

The target device sends the first data to the fifth device in response to receiving the first message.

In this way, data is sent to a device in an online state in the second device group.

In an embodiment, before the cloud device determines, based on the second status information of the at least one device in the second device group, that the fifth device is online, the method further includes:

The fifth device sends second status information of the fifth device to the cloud device, where the second status information of the fifth device is used to represent that the fifth device is online. In this way, the cloud device determines that the fifth device is online.

In an embodiment, that the target device sends first data to the at least one device in the second device group in response to receiving the first message is specifically:

The target device sends the first data to the cloud device in response to receiving the first message.

The cloud device sends the first data to the at least one device in the second device group in response to receiving the first data.

In this way, the cloud device forwards the first data.

According to a second aspect, an embodiment of this application provides a data sharing method, applied to a system including a first device group and a second device group, where the first device group and the second device group each include at least one device, a first cloud account is used to log in to a device in the first device group, a second cloud account is used to log in to a device in the second device group, the at least one device in the first device group includes a first device, the first device stores a data sharing policy for the first cloud account and an association relationship between the first cloud account and the second cloud account, and the method includes:

The first device receives first status information of the at least one device in the first device group.

The first device determines, based on the first status information of the at least one device in the first device group, that the first device meets the data sharing policy.

The first device sends first data to the at least one device in the second device group in response to determining that the first device meets the data sharing policy, where the first data is associated with the data sharing policy for the first cloud account.

The at least one device in the second device group receives the first data.

Alternatively, the first device determines, based on the first status information of the at least one device in the first device group, that a second device meets the data sharing policy, where the second device is a device other than the first device in the first device group.

The first device sends a first message to the second device in response to determining that the second device meets the data sharing policy, where the first message is used to indicate the second device to share data.

The second device sends first data to the at least one device in the second device group in response to receiving the first message, where the first data is associated with the data sharing policy for the first cloud account.

The at least one device in the second device group receives the first data.

In an embodiment, before the first device sends the first data to the at least one device in the second device group, the method further includes:

The first device determines, based on second status information of the at least one device in the second device group, that a fifth device is online, where the at least one device in the second device group includes the fifth device.

That the first device sends first data to the at least one device in the second device group is specifically:

The first device sends the first data to the fifth device.

Alternatively, before the first device sends the first message to the second device, the method further includes:

The first device determines, based on second status information of the at least one device in the second device group, that a fifth device is online, where the at least one device in the second device group includes the fifth device.

That the first device sends a first message to the second device is specifically: The first message carries an identifier of the fifth device.

That the second device sends first data to the at least one device in the second device group is specifically: The second device sends the first data to the fifth device.

In an embodiment, before the first device determines, based on the second status information of the at least one device in the second device group, that the fifth device is online, the method further includes:

The fifth device sends second status information of the fifth device to the first device, where the second status information of the fifth device is used to represent that the fifth device is online.

According to a third aspect, an embodiment of this application provides a data sharing method, applied to a cloud device, where the cloud device stores a data sharing policy for a first cloud account and a second cloud account and an association relationship between the first cloud account and the second cloud account, the first cloud account is used to log in to a device in a first device group, the second cloud account is used to log in to a device in a second device group, and the first device group and the second device group each include at least one device.

The method includes:

receiving first status information of the at least one device in the first device group;

in response to receiving the first status information of the at least one device in the first device group, determining a target device based on the first status information and the data sharing policy, where the target device is one of the at least one device in the first device group; and sending a first message to the target device, where the first message is used to indicate the target device to share data, and the data shared by the target device is associated with the data sharing policy for the first cloud account.

In an embodiment, the first device group includes a first device and a second device, the data sharing policy includes a correspondence between the first device and a first sharing policy and a correspondence between the second device and a second sharing policy, the first sharing policy includes a first sharing object, a first data sharing type, and a first data sharing condition, the second sharing policy includes the first sharing object, a second data sharing type, and a second data sharing condition, and the first sharing object is associated with the second cloud account.

In an embodiment, that the data shared by the target device is associated with the data sharing policy for the first cloud account is specifically: The data shared by the target device is all or a part of data included in the first data sharing type.

In an embodiment, a data sharing type includes one or more of a data type, a file type, and a multimedia type, a data sharing condition includes one or more of a data sharing scenario, a data sharing priority, and a data sharing time period, and the data sharing scenario includes one or more of a sports scenario, an entertainment scenario, and a driving scenario.

In an embodiment, the first data sharing condition and the second data sharing condition each are a data sharing scenario, the data sharing scenario corresponding to the first data sharing condition is a driving scenario, and the data sharing scenario corresponding to the second data sharing condition is an entertainment scenario.

The receiving first status information of the at least one device in the first device group is specifically:
  receiving first status information sent by the first device and first status information sent by the second device, where the first status information of the first device includes speed information and an identifier of the first device, and the first status information of the second device is screen brightness information and an identifier of the second device.

The determining a target device based on the first status information and the data sharing policy specifically includes:
  if a speed of the first device is greater than a preset speed threshold, determining that the first device meets the driving scenario, and determining that the first device is the target device; and/or if screen brightness of the second device is greater than a preset brightness threshold, determining that the second device meets the entertainment scenario, and determining that the second device is the target device.

In an embodiment, the first data sharing condition and the second data sharing condition each are a data sharing time period, the data sharing time period corresponding to the first data sharing condition is a first time period, and the data sharing time period corresponding to the second data sharing condition is a second time period.

The receiving first status information of the at least one device in the first device group is specifically:
  receiving first status information sent by the first device and first status information sent by the second device, where the first status information of the first device includes first running information and an identifier of the first device, the first running information is used to indicate whether the first device is in a running state, the first status information of the second device includes second running information and an identifier of the second device, and the second running information is used to indicate whether the second device is in a running state.

The determining a target device based on the first status information and the data sharing policy specifically includes:
  if both the first device and the second device are in a running state, and a current time period belongs to the first time period, determining that the first device is the target device; or
  if both the first device and the second device are in a running state, and a current time period belongs to the second time period, determining that the second device is the target device.

In an embodiment, the first device is a vehicle, and the first running information includes speed information and/or start/stop information of the vehicle; and/or
  the second device is an electronic device having a screen, and the second running information includes screen brightness information and/or power-on/off information of the electronic device.

In an embodiment, the data sharing condition further includes the data sharing priority, and a priority of the first device is higher than that of the second device.

The determining a target device based on the first status information and the data sharing policy is specifically:
  if both the first device and the second device meet the data sharing scenario and/or the data sharing time period, determining that the first device is the target device.

In an embodiment, the data sharing policy further includes a data sharing periodicity.

In an embodiment, the method further includes:
  receiving the data sharing policy for the first cloud account that is set by a user and that is sent by the at least one device in the first device group.

In an embodiment, the method further includes:
  receiving the association relationship between the first cloud account and the second cloud account that is sent by the at least one device in the first device group, and storing the association relationship between the first cloud account and the second cloud account.

In an embodiment, the method further includes:
  receiving a first request sent by the at least one device in the first device group, where the first request is used to request the cloud device to establish the association relationship between the first cloud account and the second cloud account, and the first request carries the first cloud account and the second cloud account; and
  establishing the association relationship between the first cloud account and the second cloud account in response to receiving the first request.

In an embodiment, before the sending a first message to the target device, the method further includes:
  determining, based on second status information of the at least one device in the second device group, that a fifth device is online, where the at least one device in the second device group includes the fifth device.

The sending a first message to the target device is specifically:
  sending the first message to the target device, where the first message carries an identifier of the fifth device, and the first message is used to indicate the target device to send data to the fifth device.

In an embodiment, before the determining, based on second status information of the at least one device in the second device group, that a fifth device is online, the method further includes:
  receiving second status information of the fifth device that is sent by the fifth device, where the second status information of the fifth device is used to represent that the fifth device is online.

In an embodiment, the method further includes:
  receiving the shared data sent by the target device, and sending the shared data to the at least one device in the second device group.

According to a fourth aspect, an embodiment of this application provides a data sharing method, applied to a first device, where the first device is a device in a first device group, the first device group includes at least one device, a first cloud account is used to log in to a device in the first device group, and the method includes:
  receiving a first message sent by a cloud device, where the first message is used to indicate the first device to share data; and
  sending first data to at least one device in a second device group in response to receiving the first message, where the cloud device stores a data sharing policy for the first cloud account and a second cloud account and an association relationship between the first cloud account and the second cloud account, the second cloud account is used to log in to a device in the second device group, the second device group includes the at least one device, and the first data is associated with the data sharing policy for the first cloud account.

In an embodiment, the data sharing policy includes a correspondence between the first device and a first sharing policy, the first sharing policy includes a first sharing object, a first data sharing type, and a first data sharing condition, and the first sharing object is associated with the second cloud account.

In an embodiment, that the first data is associated with the data sharing policy for the first cloud account is specifically: The first data is all or a part of data included in the first data sharing type.

In an embodiment, a data sharing type includes one or more of a data type, a file type, and a multimedia type, the first data sharing condition includes one or more of a data sharing scenario, a data sharing priority, and a data sharing time period, and the data sharing scenario includes one or more of a sports scenario, an entertainment scenario, and a driving scenario.

In an embodiment, the data sharing policy further includes a data sharing periodicity.

In an embodiment, the method further includes:
detecting a first operation entered by a user on a first interface of the first device, where the first interface displays an identifier of the at least one device in the first device group, and the first operation corresponds to an identifier of the first device in the identifier of the at least one device in the first device group;
displaying a first setting interface in response to the detected first operation, where the first device interface is used to set a second data sharing policy for a second device in the first device group, and the first setting interface includes a first control;
detecting a second operation entered by the user on the first control;
displaying a second setting interface in response to the second operation, where the second setting interface is used to set a second data sharing condition in the second data sharing policy, and the second interface includes a second control;
detecting a third operation entered by the user on the second control; and
displaying a third control on the second setting interface in response to the third operation, where the third control is used to select the second data sharing condition.

In an embodiment, the method further includes:
sending the second data sharing policy to the cloud device.

In an embodiment, the method further includes:
establishing the association relationship between the first cloud account and the second cloud account in response to a fourth operation entered by the user; and sending the association relationship between the first cloud account and the second cloud account to the cloud device.

In an embodiment, the method further includes:
sending a first request to the cloud device in response to a fifth operation entered by the user, where the first request is used to request the cloud device to establish the association relationship between the first cloud account and the second cloud account, and the first request carries the first cloud account and the second cloud account.

In an embodiment, the sending first data to at least one device in a second device group includes:
sending the first data to the cloud device, so that the cloud device sends the first data to the at least one device in the second device group.

In an embodiment, before the receiving a first message sent by a cloud device, the method further includes:
sending first status information to the cloud device, so that the cloud device determines the first device from the first device group based on the first status information and the data sharing policy.

According to a fifth aspect, an embodiment of this application provides a data sharing method, applied to a first device, where the first device is a device in a first device group, the first device group includes at least one device, a first cloud account is used to log in to a device in the first device group, the first device stores a data sharing policy for the first cloud account and an association relationship between the first cloud account and a second cloud account, the second cloud account is used to log in to a second device group, and the second device group includes at least one device.

The method includes:
receiving first status information of the at least one device in the first device group;
determining, based on the first status information of the at least one device in the first device group, that the first device meets the data sharing policy; and
sending first data to the at least one device in the second device group in response to determining that the first device meets the data sharing policy, where the first data is associated with the data sharing policy for the first cloud account; or
determining, based on the first status information of the at least one device in the first device group, that a second device meets the data sharing policy, where the second device is a device other than the first device in the first device group; and
sending a first message to the second device in response to determining that the second device meets the data sharing policy, where the first message is used to indicate the second device to share data.

In an embodiment, before the sending first data to the at least one device in the second device group, the method further includes:
determining, based on second status information of the at least one device in the second device group, that a fifth device is online, where the at least one device in the second device group includes the fifth device; and
the sending first data to the at least one device in the second device group is specifically: sending the first data to the fifth device; or
before the sending a first message to the second device, the method further includes:
determining, based on second status information of the at least one device in the second device group, that a fifth device is online, where the at least one device in the second device group includes the fifth device; and
the sending a first message to the second device is specifically: the first message carries an identifier of the fifth device.

In an embodiment, before the determining, based on second status information of the at least one device in the second device group, that a fifth device is online, the method further includes:

receiving second status information of the fifth device that is sent by the fifth device, where the second status information of the fifth device is used to represent that the fifth device is online.

According to a sixth aspect, an embodiment of this application provides a data sharing system. The system includes a first device group, a second device group, and a cloud device, the first device group and the second device group each include at least one device, a first cloud account is used to log in to a device in the first device group, a second cloud account is used to log in to a device in the second device group, the cloud device stores a data sharing policy for the first cloud account and an association relationship between the first cloud account and the second cloud account, and the system is configured to perform the method provided in the first aspect.

Alternatively, the system includes a first device group and a second device group, the first device group and the second device group each include at least one device, a first cloud account is used to log in to a device in the first device group, a second cloud account is used to log in to a device in the second device group, the at least one device in the first device group includes a first device, the first device stores a data sharing policy for the first cloud account and an association relationship between the first cloud account and the second cloud account, and the system is configured to perform the method provided in the second aspect.

According to a seventh aspect, an embodiment of this application provides a data sharing apparatus, configured to perform the method provided in the third aspect, the fourth aspect, or the fifth aspect.

According to an eighth aspect, an embodiment of this application provides a data sharing apparatus, including:

a memory, configured to store a program; and a processor, configured to execute the program stored in the memory, where when the program stored in the memory is executed, the processor is configured to perform the method provided in the third aspect, the fourth aspect, or the fifth aspect.

According to a ninth aspect, an embodiment of this application provides an electronic device, including the apparatus provided in the seventh aspect or the eighth aspect.

According to a tenth aspect, an embodiment of this application provides a computer storage medium. The computer storage medium stores instructions, and when the instructions are run on a computer, the computer is enabled to perform the method provided in the third aspect, the fourth aspect, or the fifth aspect.

According to an eleventh aspect, an embodiment of this application provides a chip, including at least one processor and an interface.

The interface is configured to provide program instructions or data for the at least one processor.

The at least one processor is configured to execute the program instructions to implement the method provided in the third aspect, the fourth aspect, or the fifth aspect.

BRIEF DESCRIPTION OF DRAWINGS

The following briefly describes the accompanying drawings required for describing embodiments.

FIG. 7l is a schematic diagram of an interface of a terminal according to an embodiment of this application;

DESCRIPTION OF EMBODIMENTS

To make objectives, technical solutions, and advantages of embodiments of this application clearer, the following describes the technical solutions of embodiments of this application with reference to the accompanying drawings.

In the descriptions of embodiments of this application, a word such as "example", "for example", or "in an example" is used to represent giving an example, an illustration, or a description. Any embodiment or design scheme described as an "example", "for example", or "in an example" in embodiments of this application should not be explained as being more preferred or having more advantages than another embodiment or design scheme. Exactly, use of the word "example", "for example", or "in an example" is intended to present a related concept in a specific manner.

In the descriptions of embodiments of this application, the term "and/or" describes only an association relationship for describing associated objects and represents that three relationships may exist. For example, A and/or B may represent the following three cases: Only A exists, only B exists, and both A and B exist. In addition, unless otherwise specified, the term "a plurality of" means two or more. For example, a plurality of systems mean two or more systems, and a plurality of screen terminals mean two or more screen terminals.

Moreover, the terms "first" and "second" are merely intended for a purpose of description, and shall not be understood as an indication or implication of relative importance or implicit indication of an indicated technical feature. Therefore, a feature limited by "first" or "second" may explicitly or implicitly include one or more features. The terms "include", "contain", "have", and their variants all mean "include but are not limited to", unless otherwise specifically emphasized in another manner.

Figure 1:
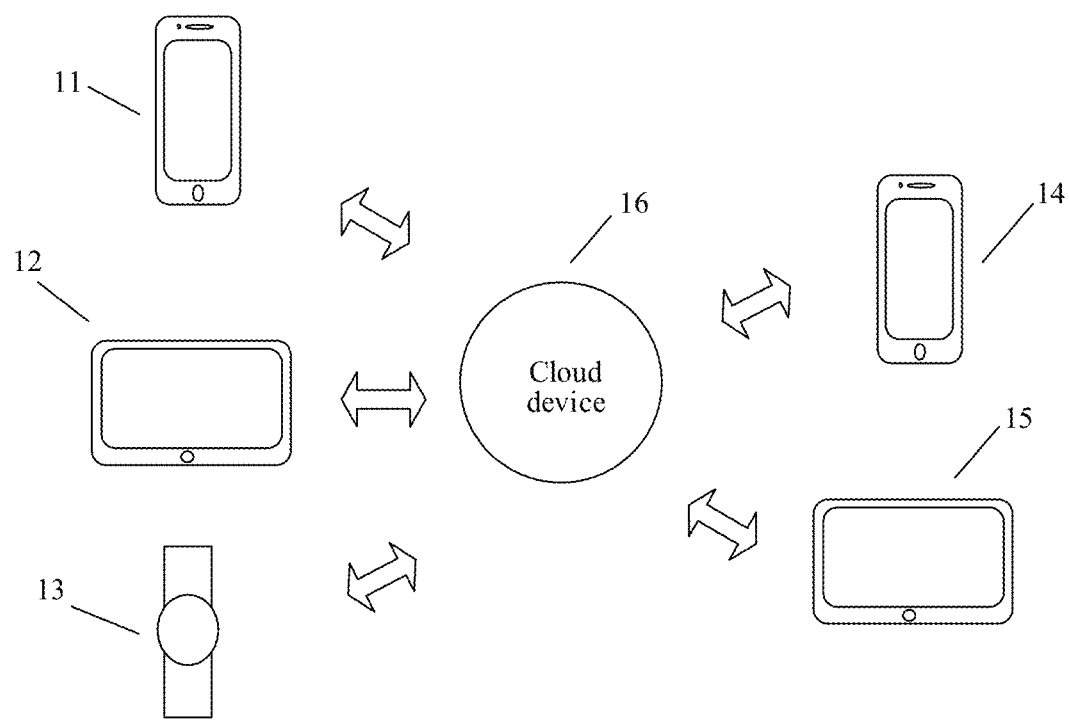
FIG. 1 is a schematic diagram of an architecture of a data sharing system according to an embodiment of this application.

FIG. 1 is a schematic diagram of an architecture of a data sharing system. Refer to FIG. 1. The system includes a plurality of terminals, for example, terminals 11, 12, 13, 14, and 15, and a cloud device 16. The terminals 11, 12, and 13 belong to a user A, and the terminals 14 and 15 belong to a user B. The user A may associate the terminals 11, 12, and 13 with each other by using a cloud account a, and the user B may associate the terminals 14 and 15 with each other by using a cloud account b. For example, when the terminals 11, 12, and 13 are all Huawei devices, the user A may simultaneously log in to a Huawei account registered by the user A on the terminals 11, 12, and 13. In other words, the user A may simultaneously log in to one account on a plurality of terminals. Data may be transmitted unidirectionally or bidirectionally between a terminal (that is, the terminals 11, 12, and 13) corresponding to the user A and a terminal (that is, the terminals 14 and 15) corresponding to the user B. For example, a picture in the terminal 11 may be transmitted to the terminal 14, and a picture in the terminal 14 may also be transmitted to the terminal 11. It should be understood that a client corresponding to the cloud account is installed on the terminal, and/or the terminal has a web page for login by using the cloud account, or the like. The client may be an operating system in the terminal, such as HuaweiHarmonyOS (HongmengOS) or iOS (iPhone Operating System), or may be a third-party cloud application in the terminal, such as Google Cloud or Amazon Cloud. The cloud account may be a Huawei cloud account, an Apple cloud account, a Google cloud account, an Amazon cloud account, or the like.

The cloud device 16 may associate the cloud account a of the user A with the cloud account b of the user B. In this way, when the user A logs in to the cloud account a registered by the user A on at least one of the terminals 11, 12, and 13, and the user B logs in to the cloud account b registered by the user B on at least one of the terminals 14 and 15, an association relationship between the terminals 11, 12, and 13 and the terminals 14 and 15 is established by using an association relationship between the cloud account a and the cloud account b. The cloud device 16 establishes a distributed network between the terminals corresponding to the user A and the user B.

Then, data in the terminal corresponding to the user A is transmitted to the cloud device 16 by using a client or a web page end that is logged in to by using the cloud account a. Next, the cloud device 16 shares the received data with a client or a web page that is logged in to by using the cloud account b. Finally, when using any one of the terminals 14 and 15, the user B may receive the data transmitted by the cloud device 16, so as to implement data sharing between the user A and the user B.

In some examples, the terminal may be an electronic device such as a mobile phone, a tablet computer, a digital camera, a personal digital assistant (personal digital assistant, PDA), a wearable device, a smart television, or Huawei Vision. An example embodiment of the electronic device includes but is not limited to an electronic device using iOS, Android, Windows, HarmonyOS, or another operating system. The electronic device may alternatively be another electronic device such as a laptopcomputer having a touch-sensitive surface (for example, a touch panel). A type of the electronic device is not specifically limited in this embodiment of this application.

The terminal may be connected to the cloud device 16 over a network such as a wired network or a wireless network. For example, the network may be a local area network (LAN), or may be a wide area network (WAN) (for example, the internet). A network between the terminal and the cloud device 16 may be implemented by using any known network communication protocol. The network communication protocol may be various wired or wireless communication protocols, for example, communication protocols such as Ethernet, universal serial bus (USB), Fire-Wire, global system for mobile communications (GSM), general packet radio service (GPRS), code division multiple access (CDMA), wideband code division multiple access (WCDMA), time-division synchronous code division multiple access (TD-SCDMA), long term evolution (LTE), new radio (NR), Bluetooth (Bluetooth), and wireless fidelity (Wi-Fi).

In some examples, the cloud device 16 may be configured to provide a cloud service. The cloud device 16 may be a server or a hyper terminal that can establish a communication connection to the terminal and that can provide a data processing function, an operation function, and/or a storage function for the terminal. The cloud device 16 may be a hardware server, or may be embedded in a virtualized environment. For example, the cloud device 16 may be a virtual machine executed on a hardware server including one or more other virtual machines. In addition, the cloud device 16 may interact with the terminal over a network, for example, receive data from the terminal 11 and send data to the terminal 14.

In some examples, the terminal may send device status information of the terminal to the cloud device 16 in real time or at an interval of preset duration. The device status information includes an identifier of the terminal, information about an environment in which the terminal is located, time information, location information, and the like. For example, the terminal may first send the device status information to the client corresponding to the cloud account of the terminal, and then the client uploads the device status information to the cloud device 16.

Then, the cloud device 16 may determine, from the plurality of terminals based on a preset data sharing policy and the device status information of the terminal, a terminal that currently needs to share data. For example, the terminals include the terminals 11, 12, and 13, and the preset sharing policy is "the terminal starts to share data when being in a driving mode, and priorities of the terminals 11, 12, and 13 are in descending order". In this case, if device status information of the terminal 11 and that of the terminal 12 indicate that both the terminals are in a driving mode, and device status information of the terminal 13 indicates that the terminal 13 is in an airplane mode, the cloud device 16 may determine, through screening, that the terminals 11 and 12 are terminals that need to share data. Further, because the priority of the terminal 11 is higher than the priority of the terminal 12, the cloud device 16 may determine that the terminal 11 is a terminal that needs to share data.

Next, the cloud device 16 may feed back information about the determined terminal that needs to share data to the client corresponding to the cloud account. Next, the client with which sharing is to be performed may obtain data in the terminal that needs to share data, and upload the obtained data to the cloud device 16. Next, the cloud device 16 sends the received data to the client corresponding to the associated cloud account.

In an example, when forwarding data, the cloud device 16 may determine status information of a terminal in which a client corresponding to a corresponding associated cloud account is located. The status information may represent whether the corresponding terminal is in a running state. When the corresponding terminal is in a running state, the cloud device 16 forwards the data to the corresponding terminal. The terminal in which the client corresponding to the corresponding associated cloud account is located may periodically send the status information of the terminal to the cloud device 16, so that the cloud device 16 can learn of the status information of the terminal in time.

The following describes a schematic diagram of a hardware structure of a terminal according to an embodiment of this application. The terminal is a terminal corresponding to a user A and/or a terminal corresponding to a user B.

Figure 2:
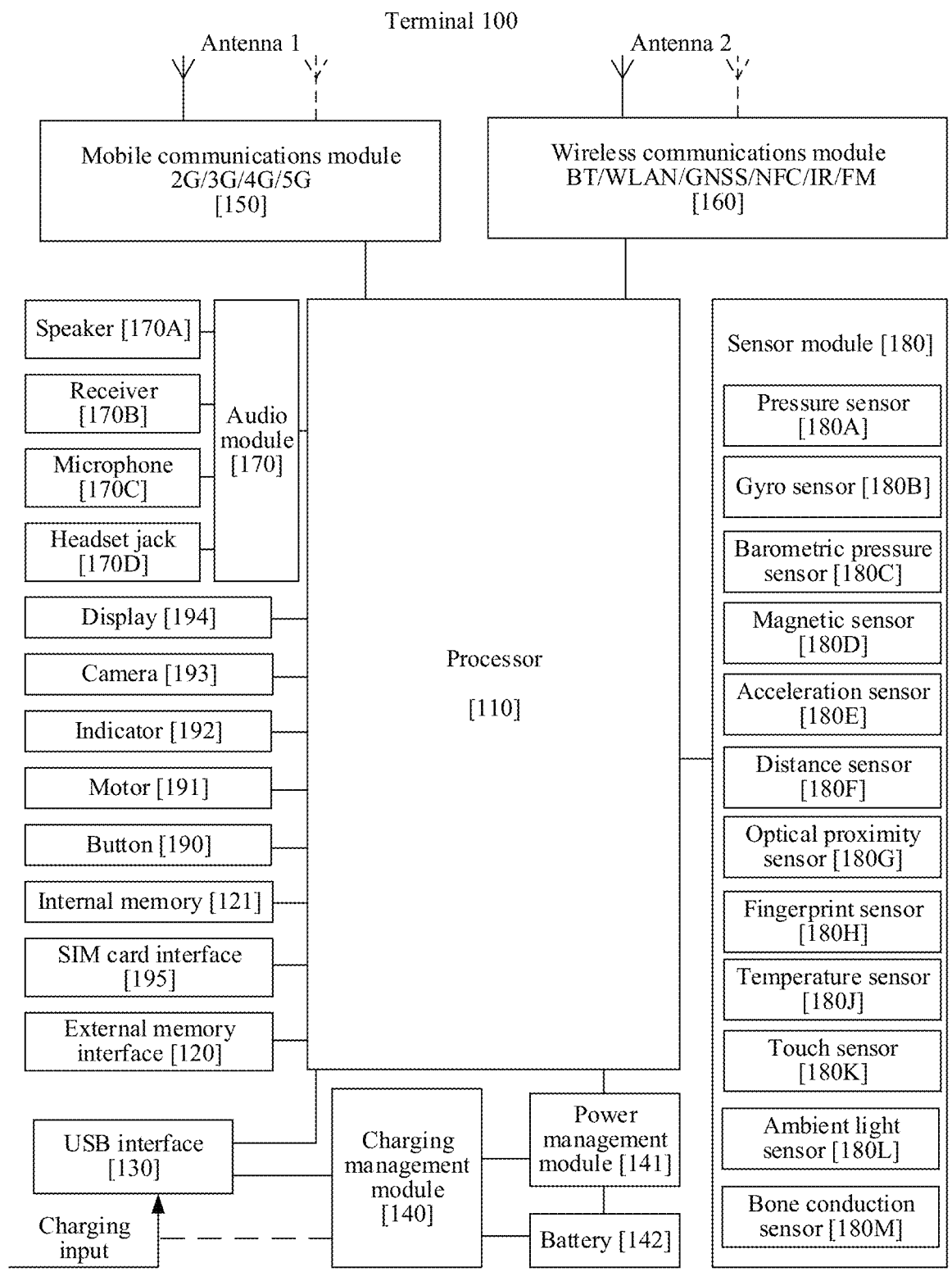
FIG. 2 is a schematic diagram of a hardware structure of a terminal according to an embodiment of this application.

FIG. 2 is a schematic diagram of a hardware structure of a terminal. As shown in FIG. 2, the terminal 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the terminal 100. In some other embodiments of this application, the terminal 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include one or more of an application processor (AP), a modem, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

A memory may be further disposed in the processor 110, and is configured to store instructions and data. In some examples, the memory in the processor 110 is a cache. The memory may store instructions or data just used or cyclically used by the processor 110. If the processor 110 needs to use the instructions or the data again, the processor 110 may directly invoke the instructions or the data from the memory, to avoid repeated access, and reduce waiting duration of the processor 110, thereby improving system efficiency. In some examples, the processor 110 may be configured to: parse image data collected by the camera 193, analyze and process the image data, and determine whether the terminal 100 is in a moving state.

In some examples, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The charging management module 140 is configured to receive a charging input from a charger. The charger may be a wireless charger, or may be a wired charger. In some examples of wired charging, the charging management module 140 may receive a charging input from the wired charger through the USB interface 130. In some examples of wireless charging, the charging management module 140 may receive a wireless charging input by using a wireless charging coil of the terminal 100. The charging management module 140 may further supply power to another electronic device through the power management module 141 while charging the battery 142.

The power management module 141 is configured to connect the battery 142 and the charging management module 140 to the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a quantity of battery cycles, and a battery state of health (leakage and impedance). In some other examples, the power management module 141 may alternatively be disposed in the processor 110. In some other examples, the power management module 141 and the charging management module 140 may alternatively be disposed in a same device.

A wireless communication function of the terminal 100 may be implemented through the antenna 1, the antenna 2, the mobile communications module 150, the wireless communications module 160, the modem, the baseband processor, and the like.

The antenna 1 and the antenna 2 are configured to transmit and receive an electromagnetic wave signal. Each antenna in the terminal 100 may be configured to cover one or more communication frequency bands. Different antennas may be further multiplexed, to improve antenna utilization. For example, the antenna 1 may be multiplexed as a diversity antenna of a wireless local area network. In some other examples, the antenna may be used in combination with a tuning switch.

The mobile communications module 150 may provide a wireless communication solution that is applied to the terminal 100 and that includes 2G/3G/4G/5G and the like. The mobile communications module 150 may include at least one filter, a switch, a power amplifier, a low noise amplifier (low noise amplifier, LNA), and the like. The mobile communications module 150 may receive an electromagnetic wave through at least two antennas including the antenna 1, perform processing such as filtering or amplification on the received electromagnetic wave, and transmit a processed electromagnetic wave to the modem for demodulation. The mobile communications module 150 may further amplify a signal modulated by the modem, and convert an amplified signal into an electromagnetic wave through the antenna 1 for radiation. In some examples, at least some function modules of the mobile communications module 150 may be disposed in the processor 110. In some examples, at least some function modules of the mobile communications module 150 may be disposed in a same device as at least some modules of the processor 110.

The modem may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some examples, the modem may be an independent component. In some other examples, the modem may be independent of the processor 110, and is disposed in a same device as the mobile communications module 150 or another function module. In some other examples, the mobile communications module 150 may be a module in a modem.

The wireless communications module 160 may provide a wireless communication solution that is applied to the terminal 100 and that includes a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, and the like. The wireless communications module 160 may be one or more components integrating at least one communications processor module. The wireless communications module 160 receives an electromagnetic wave through the antenna 2, performs frequency modulation and filtering on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some examples, in the terminal 100, the antenna 1 is coupled to the mobile communications module 150, and the antenna 2 is coupled to the wireless communications module 160, so that the terminal 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division synchronous code division multiple access (TD-SCDMA), long term evolution (LTE), fifth-generation new radio (NR), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The terminal 100 implements a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some examples, the terminal 100 may include one or more displays 194.

The terminal 100 may implement a photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, and an optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some examples, the ISP may be disposed in the camera 193.

The camera 193 is configured to capture a still image or a video, for example, capture facial feature information and posture feature information of a person. An object generates an optical image through the lens and projects the optical image to the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP, so that the ISP converts the electrical signal into a digital image signal. The ISP outputs the digital image signal to the DSP for processing. The DSP converts the digital image signal into an image signal in a standard format such as RGB or YUV. In some examples, the terminal 100 may include one or more cameras 193.

The digital signal processor is configured to process a digital signal. In addition to a digital image signal, the digital signal processor may further process another digital signal. For example, when the terminal 100 selects a frequency, the digital signal processor is configured to perform Fourier transform on frequency energy.

The video codec is configured to compress or decompress a digital video. The terminal 100 may support one or more video codecs. In this way, the terminal 100 may play or record videos in a plurality of coding formats, for example, moving picture experts group (moving picture experts group, MPEG)-1, MPEG-2, MPEG-3, and MPEG-4.

The external memory interface 120 may be configured to connect to an external storage card, for example, a micro-SD card, to extend a storage capability of the terminal 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to implement various function applications and data processing of the terminal 100. The internal memory 121 may include a program storage area and a data storage area. The program storage area may store an operating system, an application required by at least one function (for example, a sound play function or an image play function), and the like. The data storage area may store data (for example, audio data or a phone book) and the like created in a process of using the terminal 100. In addition, the internal memory 121 may include a high-speed random access memory, or may include a nonvolatile memory, for example, at least one disk storage device, a flash memory, or a universal flash storage (UFS).

The terminal 100 may implement an audio function such as music play or recording through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to encode and decode an audio signal. In some examples, the audio module 170 may be disposed in the processor 110, or some function modules of the audio module 170 may be disposed in the processor 110.

The speaker 170A, also referred to as a "horn", is configured to convert an audio electrical signal into a sound signal. The terminal 100 may be used to listen to music or answer a call in a hands-free mode through the speaker 170A.

The receiver 170B, also referred to as an "earpiece", is configured to convert an audio electrical signal into a sound signal. When the terminal 100 is used to answer a call or listen to voice information, the receiver 170B may be put close to a human ear to listen to a voice.

The microphone 170C, also referred to as a "mike" or a "microphone", is configured to convert a sound signal into an electrical signal. When making a call or sending a voice message, a user may make a sound near the microphone 170C through the mouth of the user, to input a sound signal to the microphone 170C. At least one microphone 170C may be disposed in the terminal 100. In some other examples, two microphones 170C may be disposed in the terminal 100, to collect a sound signal and implement a noise reduction function. In some other embodiments, three, four, or more microphones 170C may alternatively be disposed in the terminal 100, to collect a sound signal, implement noise reduction, identify a sound source, implement a directional recording function, and the like.

The headset jack 170D is configured to connect to a wired headset. The headset jack 170D may be a USB interface 130, or may be a 3.5 mm open mobile terminal platform (OMTP) standard interface or cellular telecommunications industry association of the USA (CTIA) standard interface.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and can convert the pressure signal into an electrical signal. In some examples, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal 100 determines pressure intensity based on a change in the capacitance. When a touch operation is performed on the display 194, the terminal 100 detects intensity of the touch operation based on the pressure sensor 180A. The terminal 100 may also calculate a touch location based on a detection signal of the pressure sensor 180A. In some examples, touch operations that are performed at a same touch location but have different touch operation intensity may correspond to different operation instructions. For example, when a touch operation whose touch operation intensity is less than a first pressure threshold is performed on a Messages application icon, an instruction for viewing an SMS message is performed. When a touch operation whose touch operation intensity is greater than or equal to the first pressure threshold is performed on the Messages application icon, an instruction for creating an SMS message is performed.

The gyro sensor 180B may be configured to determine a moving posture of the terminal 100. In some examples, an angular velocity of the terminal 100 around three axes (namely, axes x, y, and z) may be determined through the gyro sensor 180B. The gyro sensor 180B may be configured to implement image stabilization during photographing. For example, when the terminal 100 is used to collect user characteristic information in an environment, the gyro sensor 180B detects an angle at which the terminal 100 jitters, and calculates, based on the angle, a distance for which a lens module needs to be compensated, to allow the lens to cancel the jitter of the terminal 100 through reverse motion, thereby implementing image stabilization.

The barometric pressure sensor 180C is configured to measure barometric pressure. In some examples, the terminal 100 calculates an altitude by using the barometric pressure measured by the barometric pressure sensor 180C, to assist in positioning and navigation.

The acceleration sensor 180E may detect magnitude of acceleration in various directions (usually on three axes) of the terminal 100, and may detect magnitude and a direction of the gravity when the terminal 100 is still. The acceleration sensor 180E may be further configured to identify a posture of the terminal, and is applied to an application such as switching between landscape mode and portrait mode or a pedometer.

The distance sensor 180F is configured to measure a distance. The terminal 100 may measure the distance in an infrared manner or a laser manner. In some examples, when the terminal is used to collect user characteristic information of the user in an environment, the terminal 100 may measure a distance through the distance sensor 180F, to implement quick focusing.

The ambient light sensor 180L is configured to sense ambient light brightness. The terminal 100 may adaptively adjust brightness of the display 194 based on the sensed ambient light brightness.

The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like.

The temperature sensor 180J is configured to detect a temperature. In some examples, the terminal 100 executes a temperature processing policy by using the temperature detected by the temperature sensor 180J. For example, when the temperature reported by the temperature sensor 180J exceeds a threshold, the terminal 100 lowers performance of a processor located near the temperature sensor 180J, to reduce power consumption for thermal protection. In some other embodiments, when the temperature is lower than another threshold, the terminal 100 heats the battery 142 to avoid abnormal shutdown of the terminal 100 due to a low temperature. In some other embodiments, when the temperature is lower than still another threshold, the terminal 100 boosts an output voltage of the battery 142 to avoid abnormal shutdown caused by a low temperature.

The touch sensor 180K is also referred to as a "touch component". The touch sensor 180K may be disposed on the display 194, and the touch sensor 180K and the display 194 constitute a touchscreen. The touch sensor 180K is configured to detect a touch operation performed on or near the touch sensor 180K. The touch sensor may transfer the detected touch operation to the application processor to determine a touch event type. A visual output related to the touch operation may be provided by the display 194. In some other embodiments, the touch sensor 180K may alternatively be disposed on a surface of the terminal 100 at a location different from that of the display 194.

The button 190 includes a power button, a volume button, an input keyboard, and the like. The button 190 may be a mechanical button, or may be a touch button. The terminal 100 may receive a key input, and generate a key signal input related to a user setting and function control of the terminal 100.

The motor 191 may generate a vibration prompt. The motor 191 may be configured to provide an incoming call vibration prompt and a touch vibration feedback. For example, touch operations performed on different applications (for example, video play and audio play) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The following describes a schematic diagram of a structure of a cloud device according to an embodiment of this application.

Figure 3:
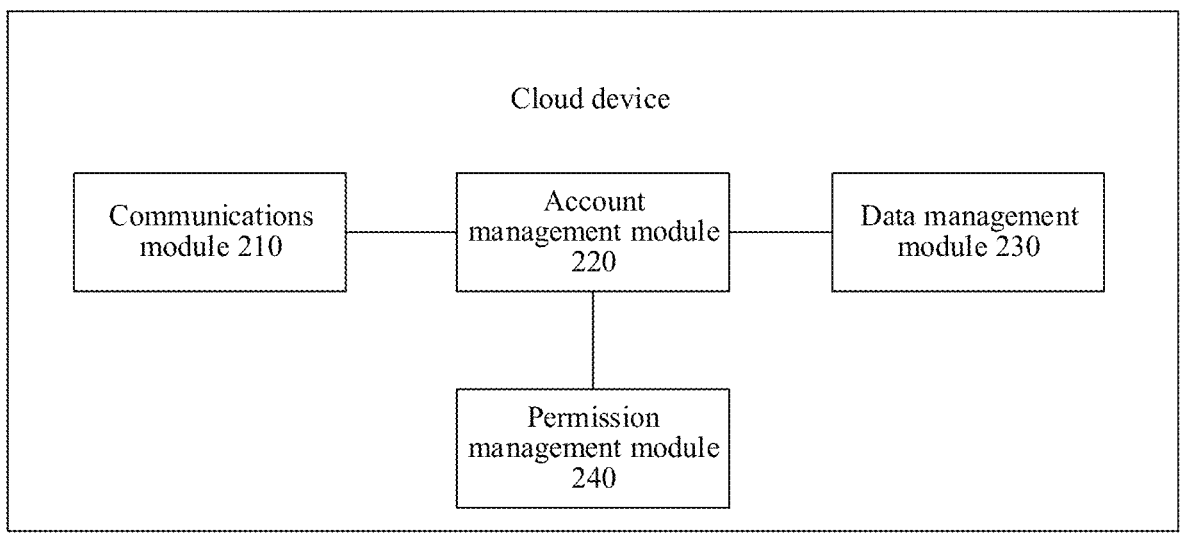
FIG. 3 is a schematic diagram of a structure of a cloud device according to an embodiment of this application.

FIG. 3 is a schematic diagram of a structure of a cloud device. As shown in FIG. 3, the cloud device may include a communications module 210, an account management module 220, a data management module 230, a permission management module 240, and the like. The communications module 210 may establish a communication connection to a terminal (for example, the terminals 11, 12, and 13), to exchange data. For example, when a client corresponding to a cloud account is installed on the terminal 11, and the cloud account a is used to log in to the client, data such as a picture and a video in the terminal 11 may be transmitted to the cloud device through the client that is logged in to by using the cloud account a. In this way, the cloud device can receive the data such as the picture and the video in the terminal 11.

The account management module 220 may manage a cloud account, for example, establish an association relationship between the cloud account a and the cloud account b, add a cloud account, delete a cloud account, and register a cloud account. In some examples, when a same account is used to log in to a plurality of terminals, the account management module 220 may also establish a trust relationship between the plurality of terminals, so as to implement data streamlining between the plurality of terminals, and ensure consistency of data formats, consistency of data collection rules, consistency of storage rules, and the like.

The data management module 230 may forward the data obtained from the cloud account a to the cloud account b that has the association relationship with the cloud account a. For example, when the cloud account a is used to log in to the terminal 11, the cloud account b is used to log in to the terminal 15, and there is the association relationship between the cloud account a and the cloud account b, after the picture in the terminal 11 is uploaded to cloud storage space corresponding to the cloud account a in the cloud device 16 by using the cloud account a, the data management module 230 may forward the picture to cloud storage space corresponding to the cloud account b. Therefore, after the terminal 15 is logged in to by using the cloud account b, the terminal 15 can download the picture from the cloud storage space corresponding to the cloud account b, so as to share the picture in the terminal 11 with the terminal 15.

The permission management module 240 may manage data sharing permission corresponding to the cloud account. For example, if the user A changes, through the client that is logged in to by using the cloud account a, permission to be shared with the cloud account b from sharing only a picture to sharing a picture and a video, the permission management module 240 may synchronously change data sharing permission of the cloud account b.

The following describes how to establish an association relationship between a cloud account and a terminal.

Figure 4A:
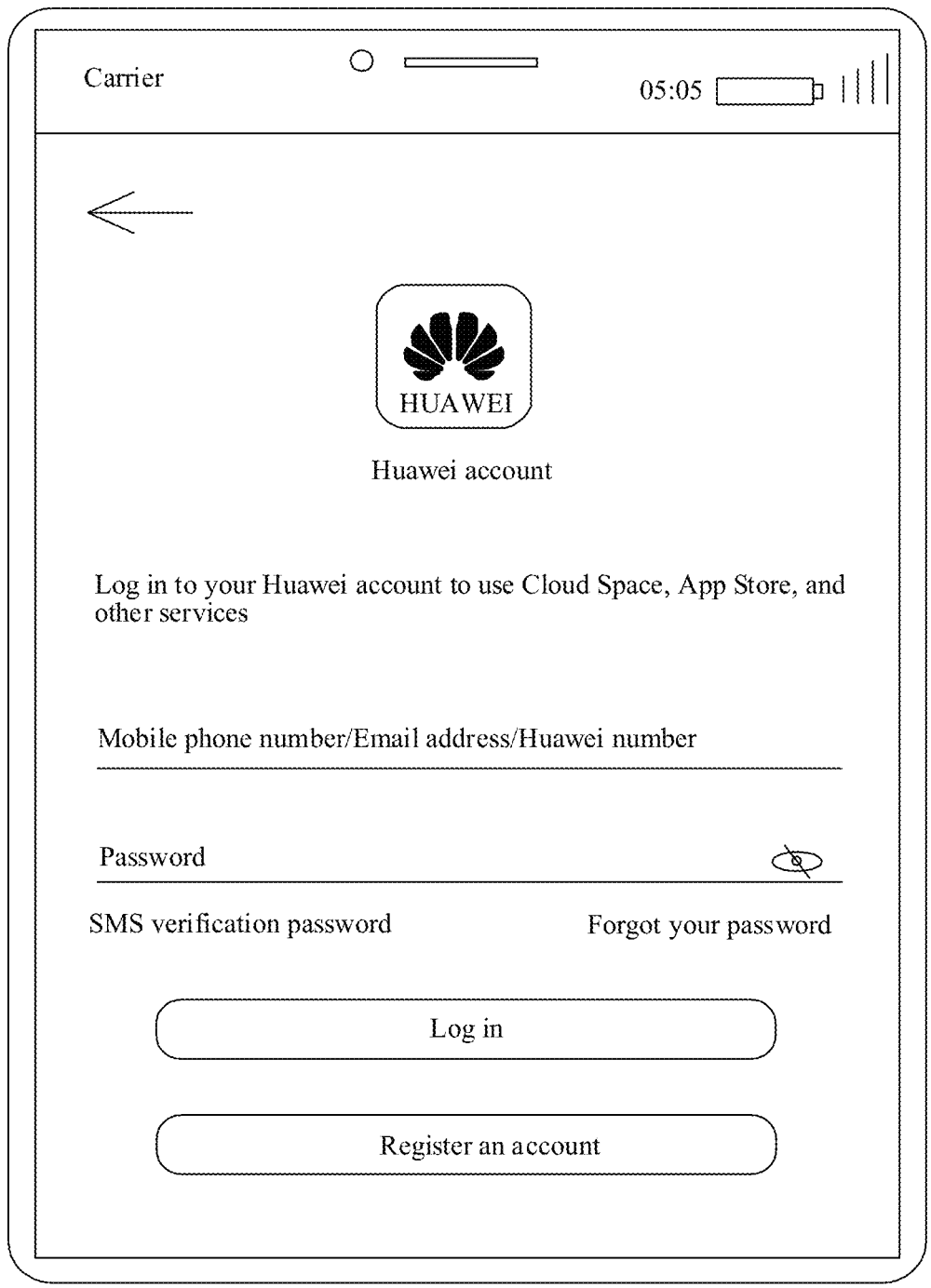
FIG. 4a is a schematic diagram of an interface of a terminal according to an embodiment of this application.

When the terminal is used for the first time, an account usually needs to be set, and the account may be usually used to log in to most devices provided by a same vendor. Therefore, if a vendor of the terminal can provide a cloud service, the account may be used as a cloud account. In this way, an association relationship between the cloud account and the terminal is established. For example, the cloud account is a Huawei account. As shown in FIG. 4a, assuming that a terminal is provided by Huawei, when the terminal is powered on for the first time, a user may select "register an account" on a setting interface, to obtain a Huawei account. The Huawei account may be used by the current user to log in to most Huawei terminals of the current user, and Huawei can provide a cloud service. Therefore, the account may be used as a cloud account of the current user. It may be understood that, that the cloud account is a Huawei account is merely an example for description, and the cloud account may alternatively be another cloud account, for example, a Google cloud account or an Amazon cloud account.

Figure 4B:
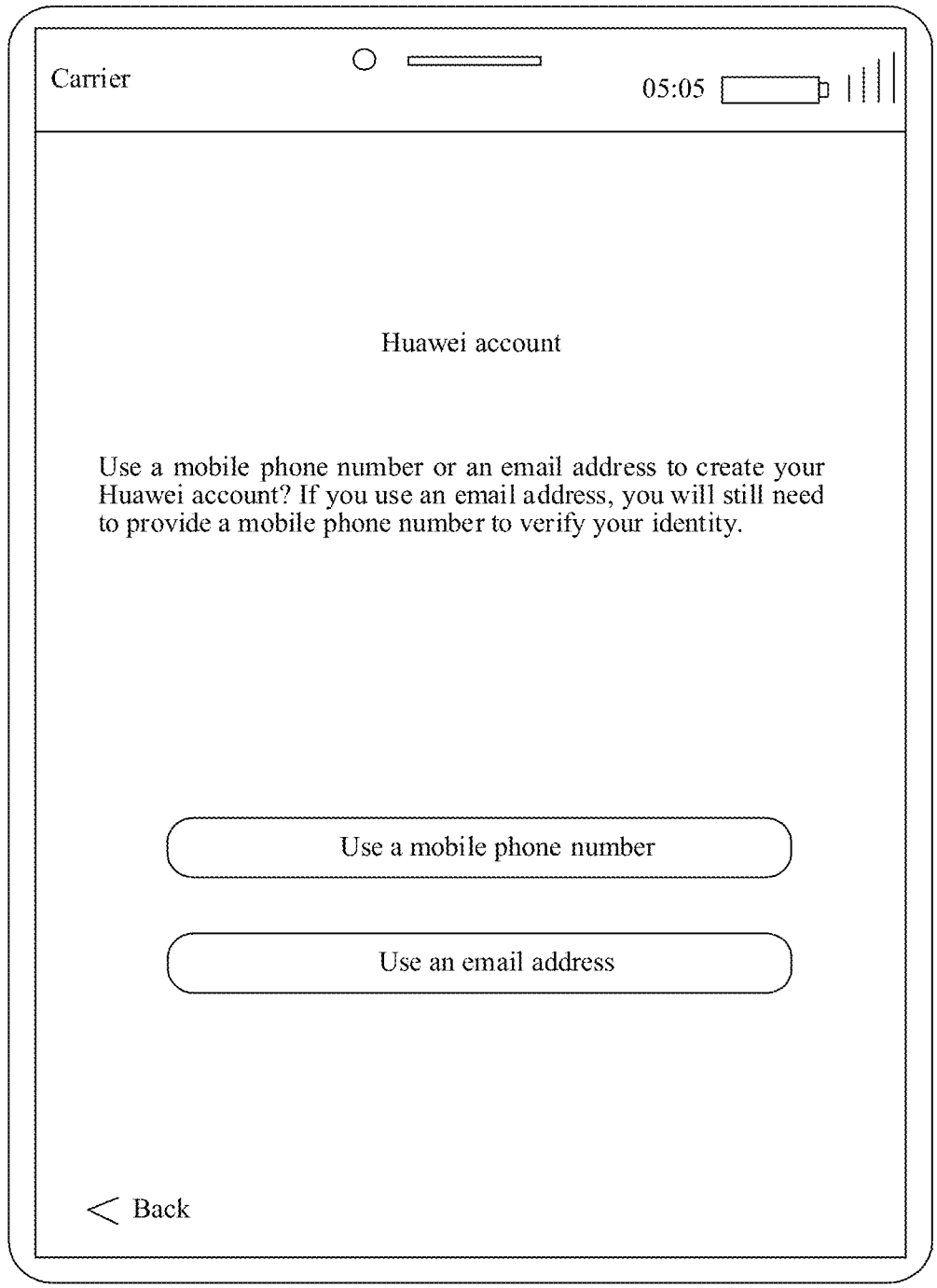
FIG. 4b is a schematic diagram of an interface of a terminal according to an embodiment of this application.
Figure 4C:
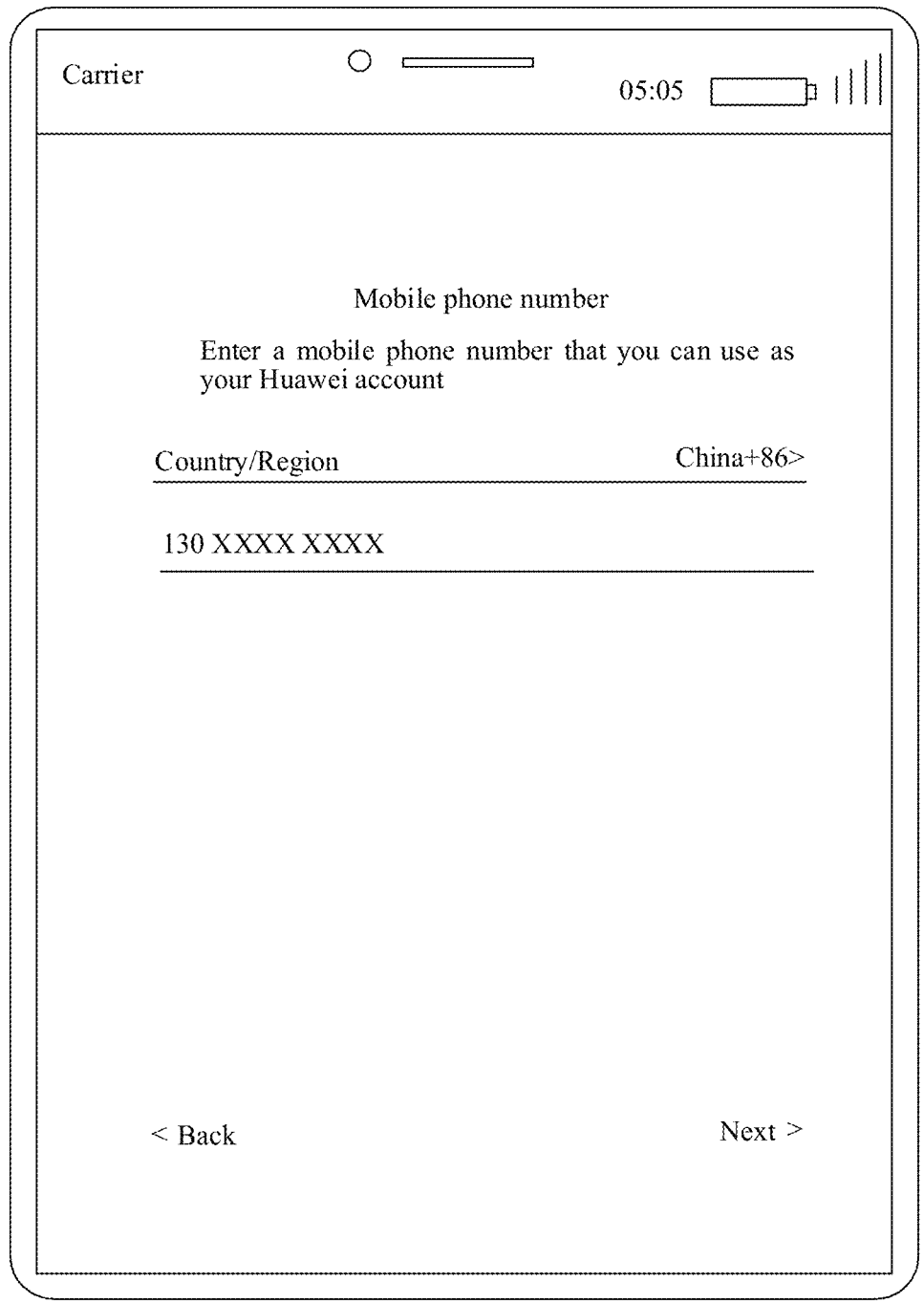
FIG. 4c is a schematic diagram of an interface of a terminal according to an embodiment of this application.
Figure 4D:
FIG. 4d is a schematic diagram of an interface of a terminal according to an embodiment of this application.

In addition, if a vendor of the terminal cannot provide a cloud service, the user may apply for a cloud account from a third party, and log in to the current terminal by using the cloud account, that is, may associate the cloud account with the current terminal. In this way, an association relationship between the cloud account and the terminal is established. For example, after logging in to the terminal, the user may download Huawei cloud software. Then, as shown in FIG. 4a, the user opens the Huawei cloud software, and taps "Register an account" on a display interface. Then, as shown in FIG. 4b, the user selects "Use a mobile phone number". Then, as shown in FIG. 4c, the user selects "Country/Region", enters "Mobile phone number", and taps "Next". Then, as shown in FIG. 4d, the user enters received verification code "abcd" in a corresponding area, and taps "Next".

Figure 4E:
FIG. 4e is a schematic diagram of an interface of a terminal according to an embodiment of this application.

Then, as shown in FIG. 4e, the user enters a password, confirms the password, and taps "Complete", to complete application for a Huawei account. Then, the user logs in to, by using the applied Huawei cloud account, the Huawei cloud software on the current terminal that is being used by the user, that is, may associate the Huawei cloud account with the current terminal that is being used by the user.

Figure 5:
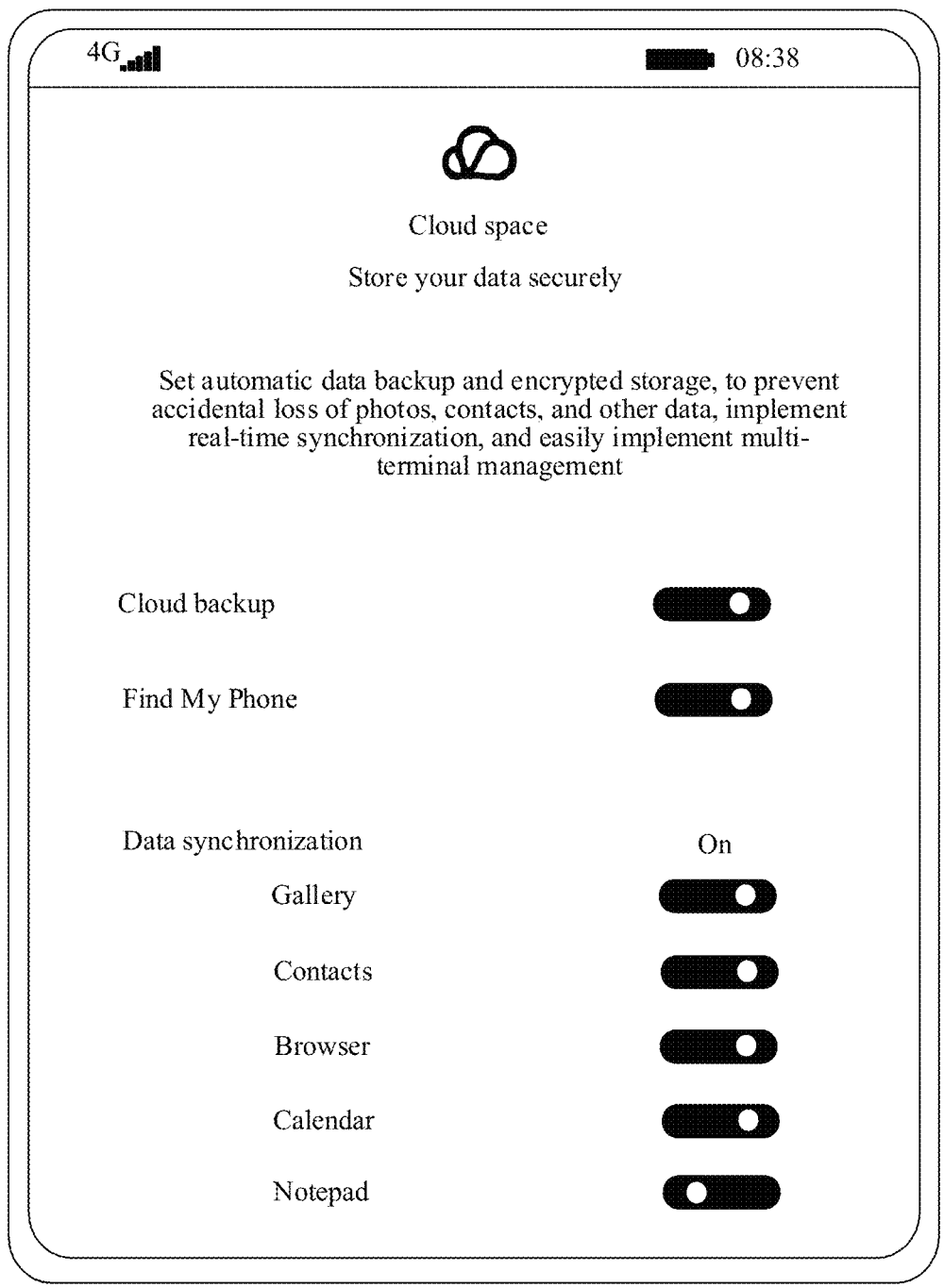
FIG. 5 is a schematic diagram of an interface of a terminal according to an embodiment of this application.

In an example, after successfully completing login by using the cloud account, the user may select data uploaded to cloud space. For example, as shown in FIG. 5, the user may choose to turn on cloud backup, turn on Find My Phone, turn on data synchronization, and turn on data synchronization of Gallery, Contacts, Browser, and Calendar and turn off data synchronization of Notepad in data synchronization.

Next, how to establish an association relationship between accounts is described.

First, the user adds the other party as a friend.

Figure 6A:
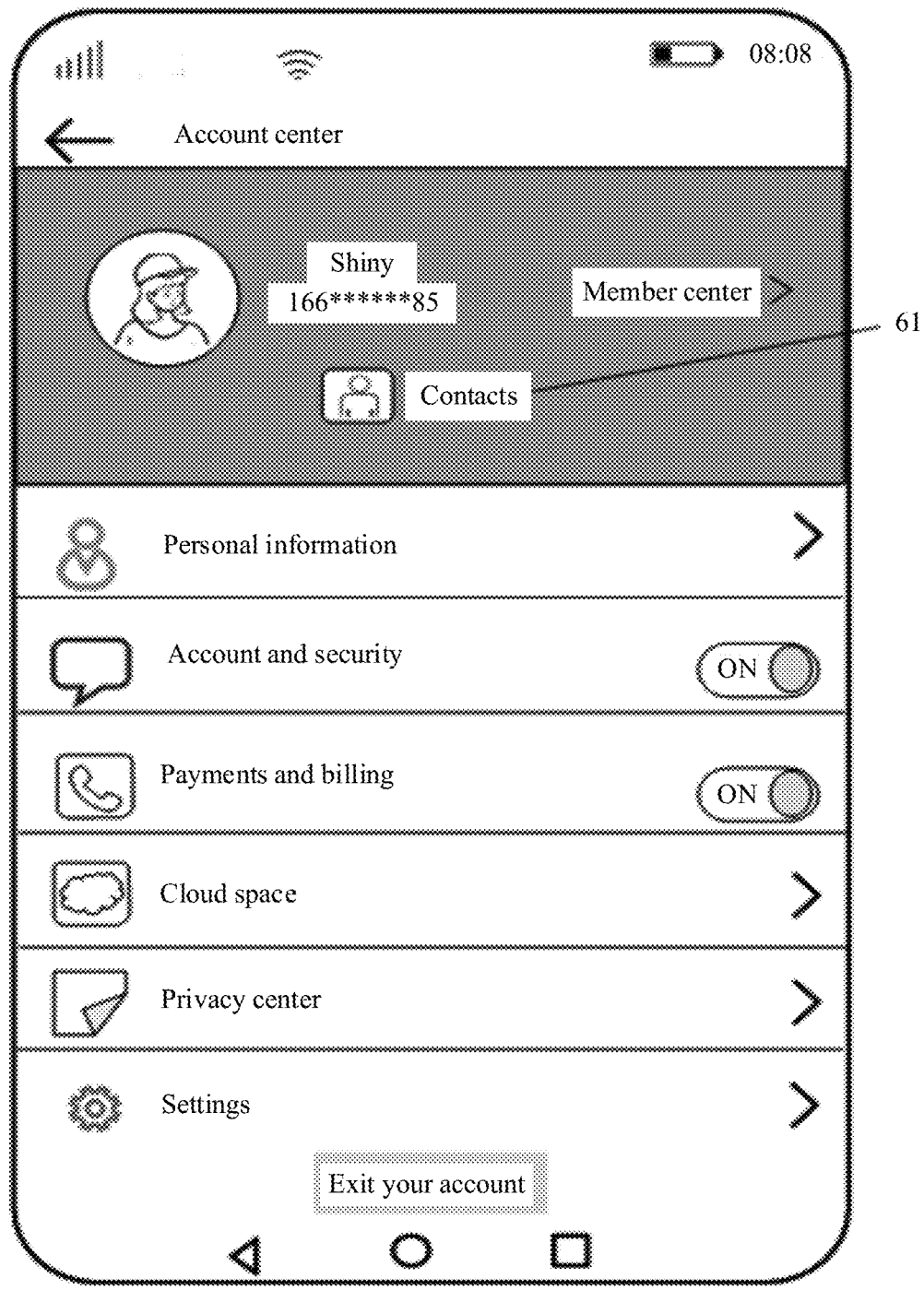
FIG. 6a is a schematic diagram of an interface of a terminal according to an embodiment of this application.
Figure 6B:
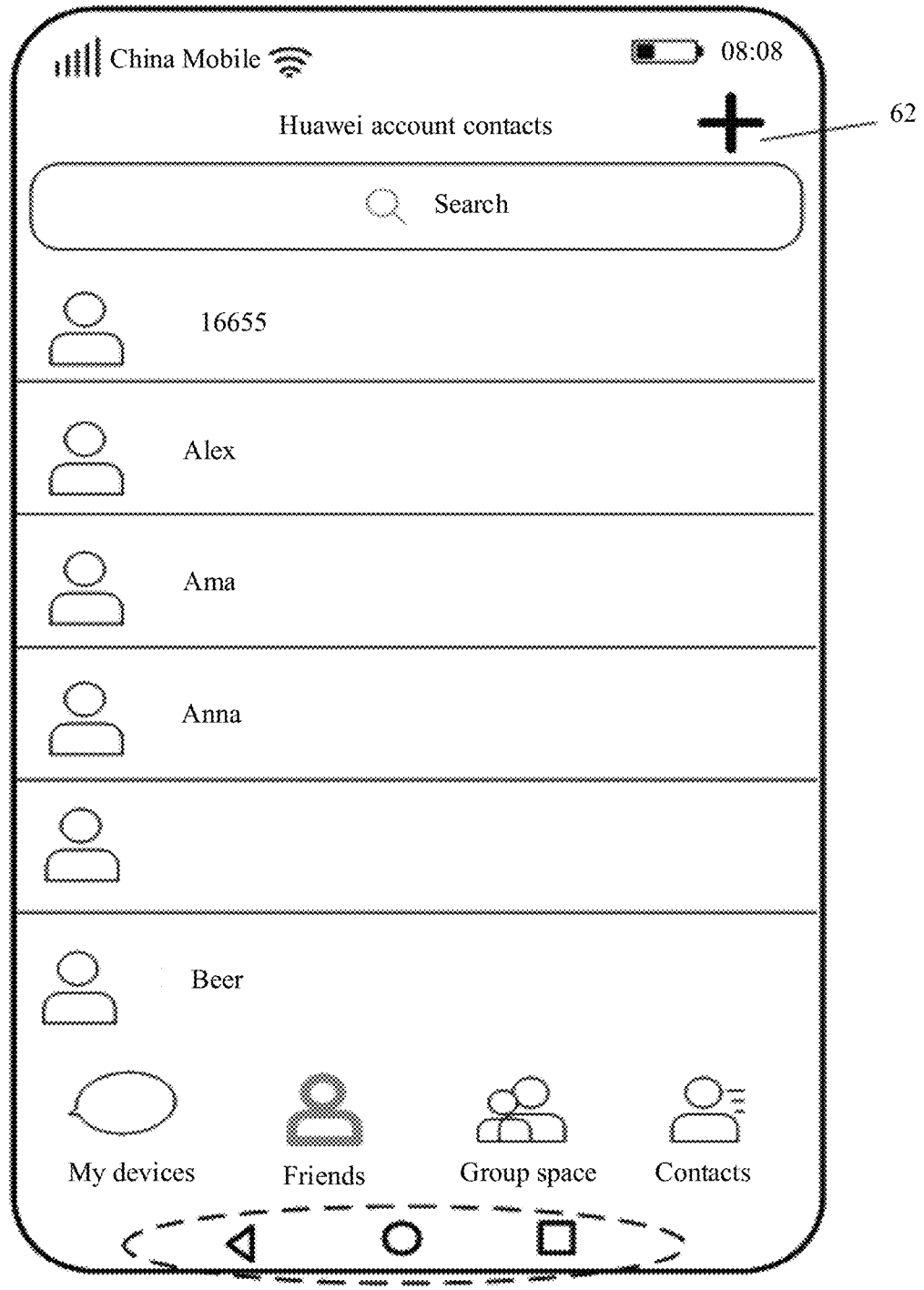
FIG. 6b is a schematic diagram of an interface of a terminal according to an embodiment of this application.
Figure 6C:
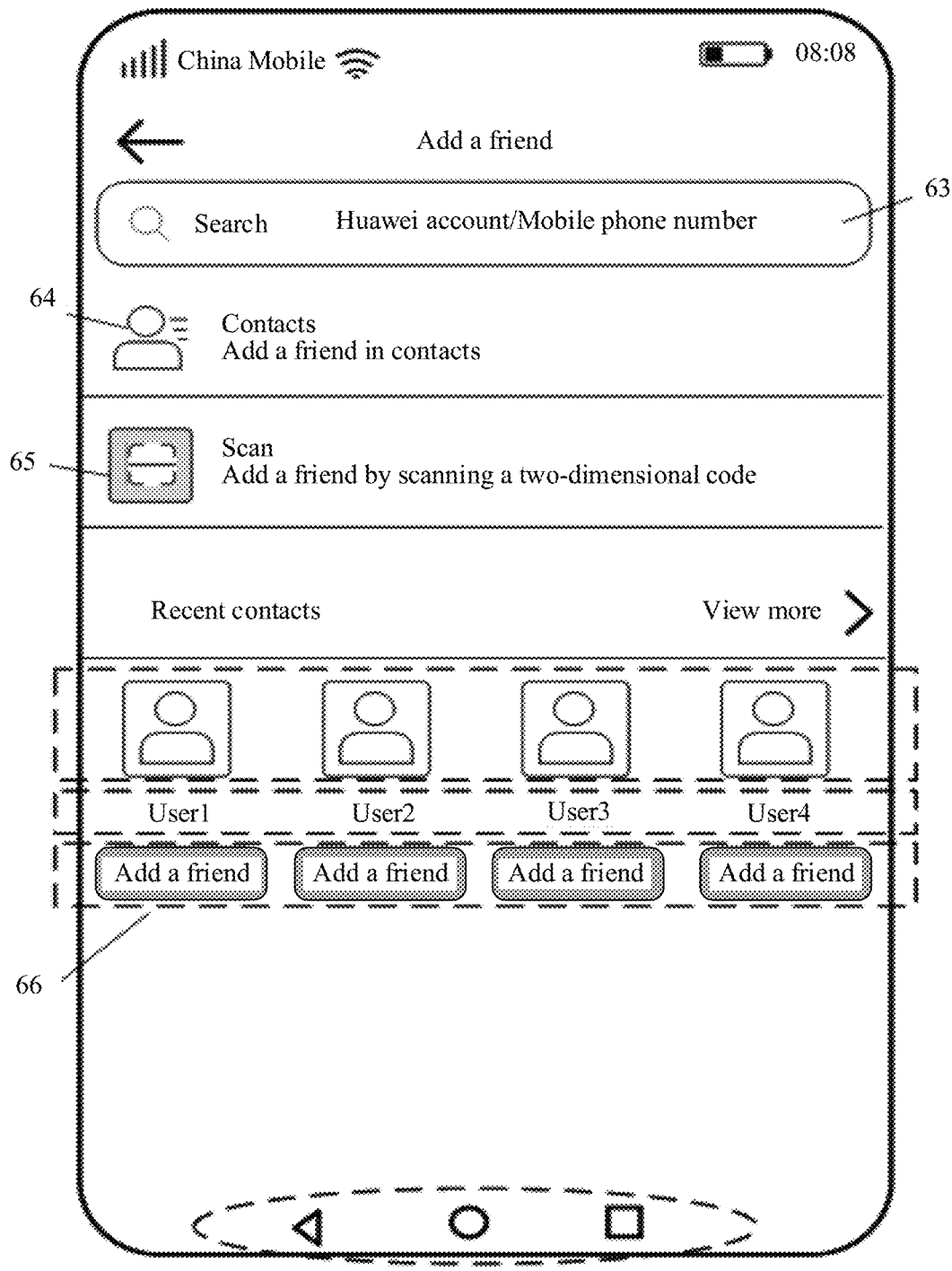
FIG. 6c is a schematic diagram of an interface of a terminal according to an embodiment of this application.

The user may use the cloud account to log in to a client corresponding to the cloud account on the terminal. As shown in FIG. 6a, after logging in to the client corresponding to the cloud account, the user may select Contacts 61 in "Account center", and then enter an interface shown in FIG. 6b. In the interface, the user may view, in a "Friends" list, friends that have been added by the user, for example, "Ama" and "Anna" in FIG. 6b. Then, the user may select a button 62 for adding a friend in the interface displayed in FIG. 6b, and then enter an interface displayed in FIG. 6c. In the interface displayed in FIG. 6c, the user may enter, in a friend search area 63, a Huawei account, a mobile phone number, or the like of a friend that needs to be added by the user, and search for the friend. After finding a cloud account of another user, the user taps an "Add" button. After the another user agrees, an operation of adding a friend is completed. In addition, in FIG. 6c, the user may add a friend in contacts from Contacts 64, or may add a friend by scanning a two-dimensional code from Scan 65. In addition, in FIG. 6c, recent contacts of the user may be further presented to the user in a display area 66. In this case, a button of "Add a friend" may be displayed below the recent contacts. After the user selects "Add a friend", and another user agrees, an operation of adding a friend is completed.

Figure 6D:
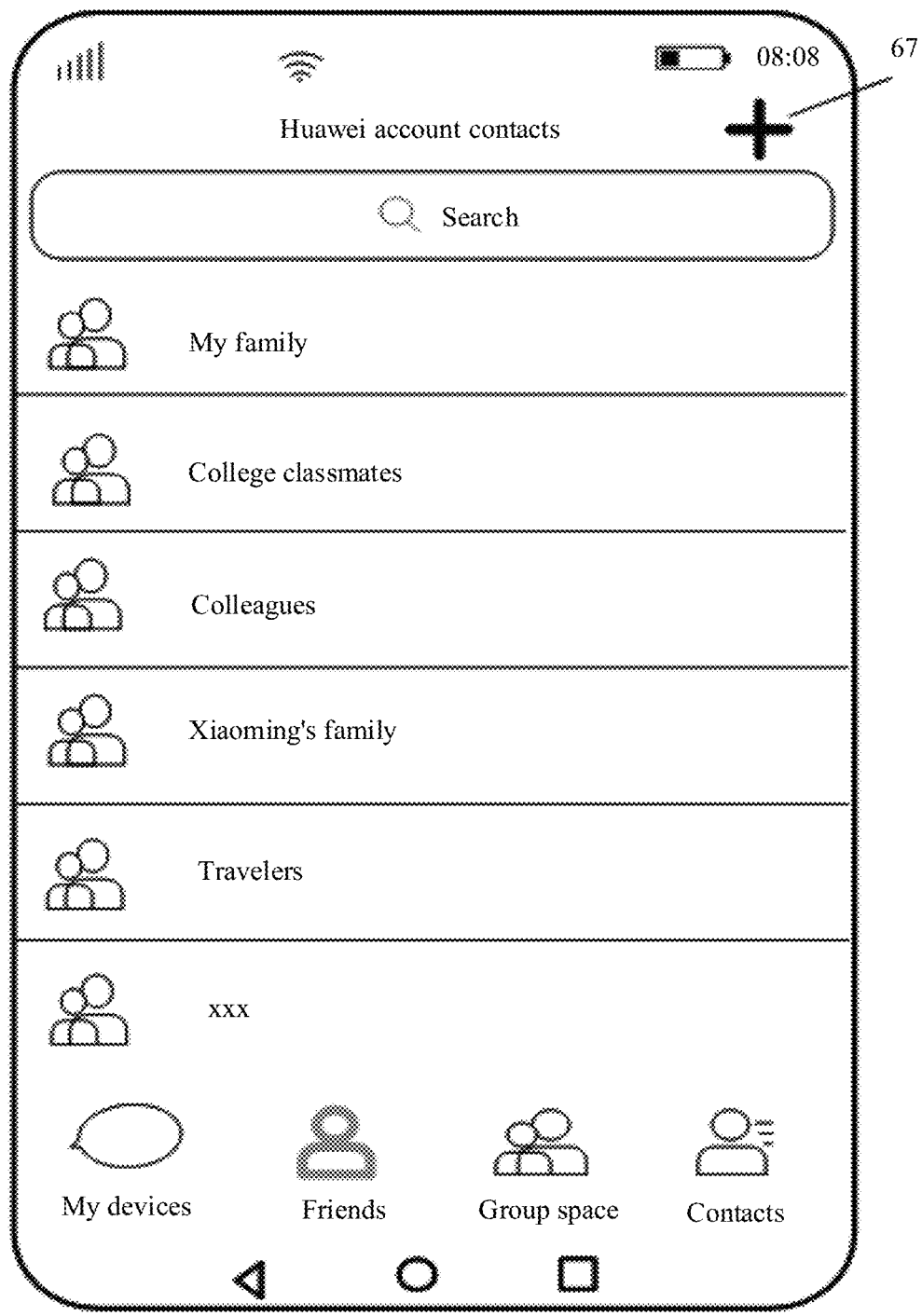
FIG. 6d is a schematic diagram of an interface of a terminal according to an embodiment of this application.
Figure 6E:
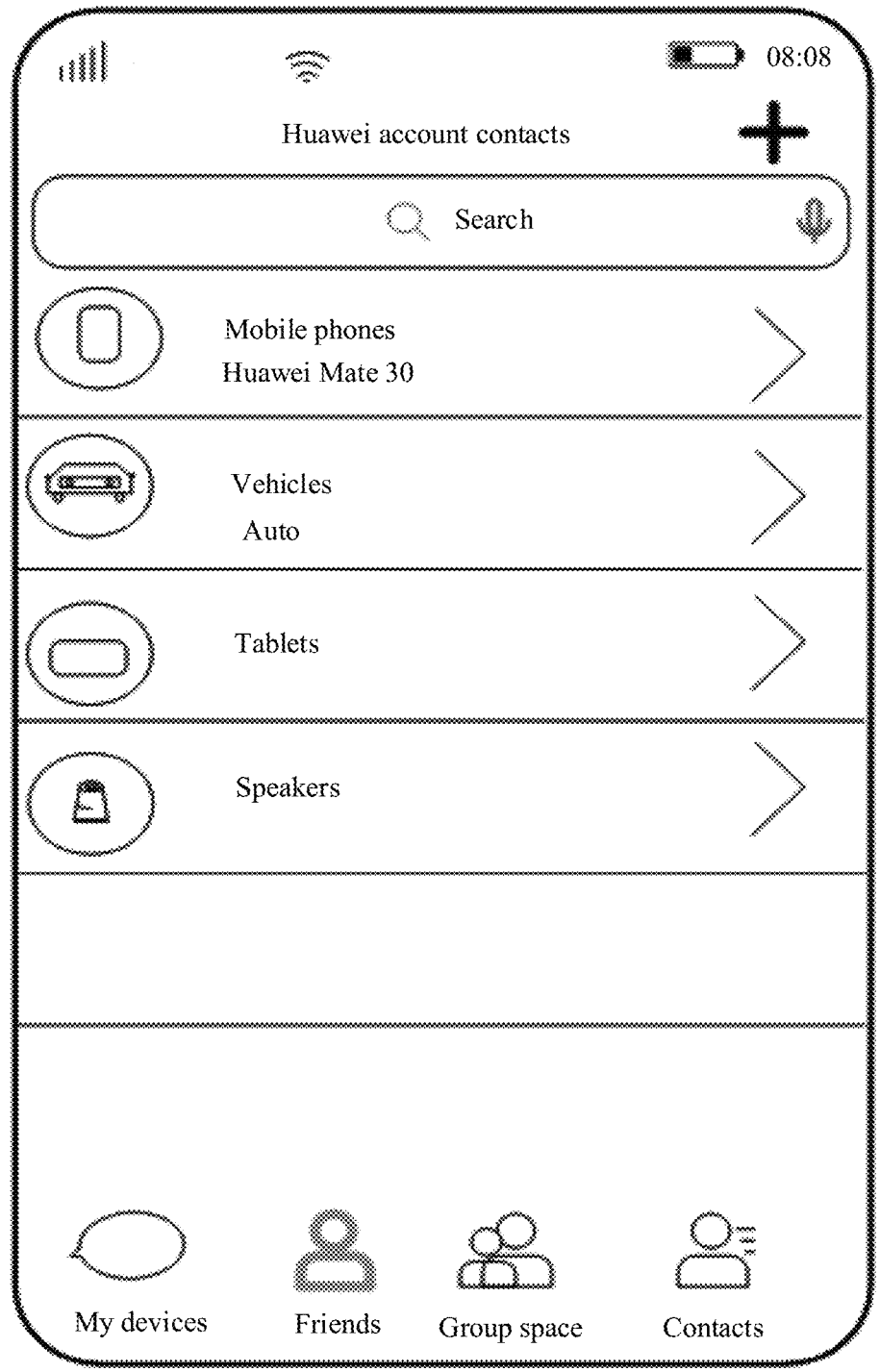
FIG. 6e is a schematic diagram of an interface of a terminal according to an embodiment of this application.

In addition, as shown in FIG. 6d, the user may view, in a list of "Group space", groups that are set by the user, for example, "My family", "College classmates", and "Colleagues". In addition, in FIG. 6d, after the user taps a button 67 of adding a group, a new group may be established. As shown in FIG. 6e, the user may view, in a list of "My devices", devices associated with the cloud account of the user, for example, "Mobile phones", "Vehicles", "Tablets", and "Speakers".

Then, the user sets a sharing policy.

Figure 7A:
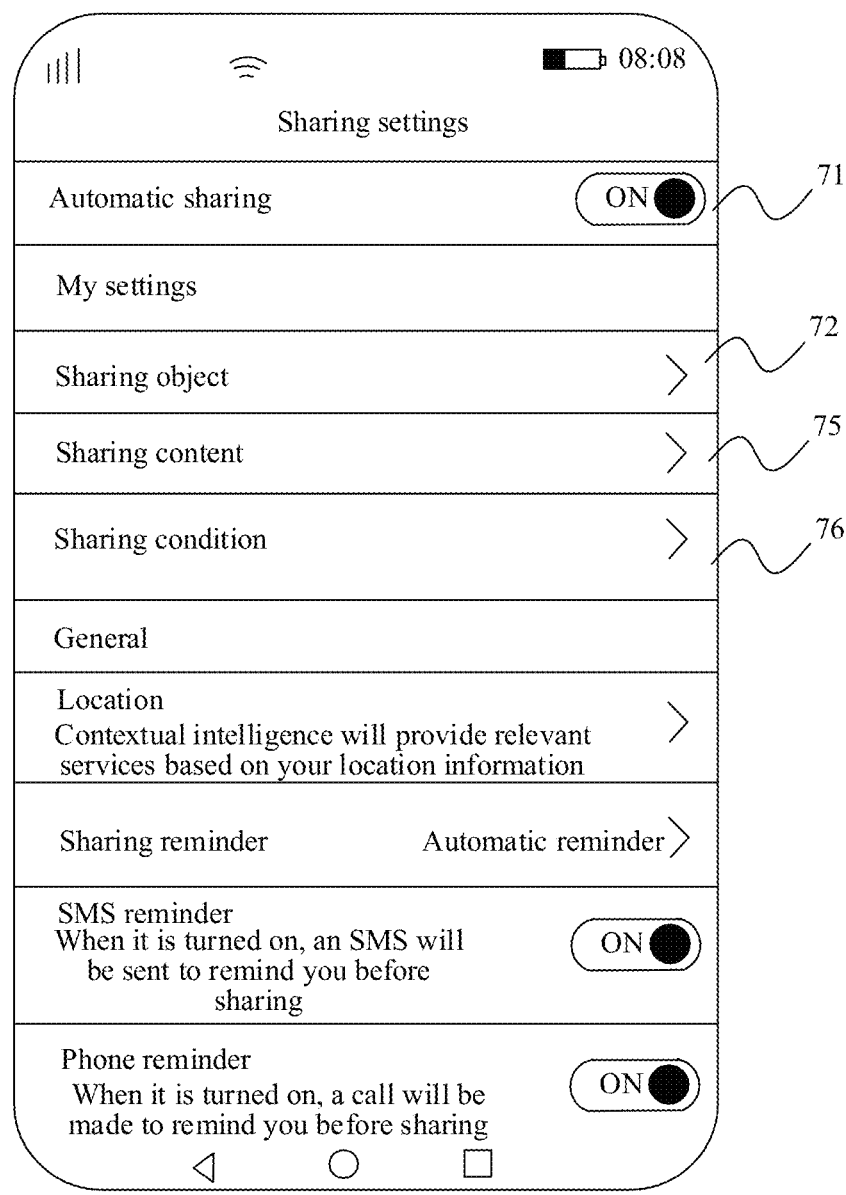
FIG. 7a is a schematic diagram of an interface of a terminal according to an embodiment of this application.
Figure 7B:
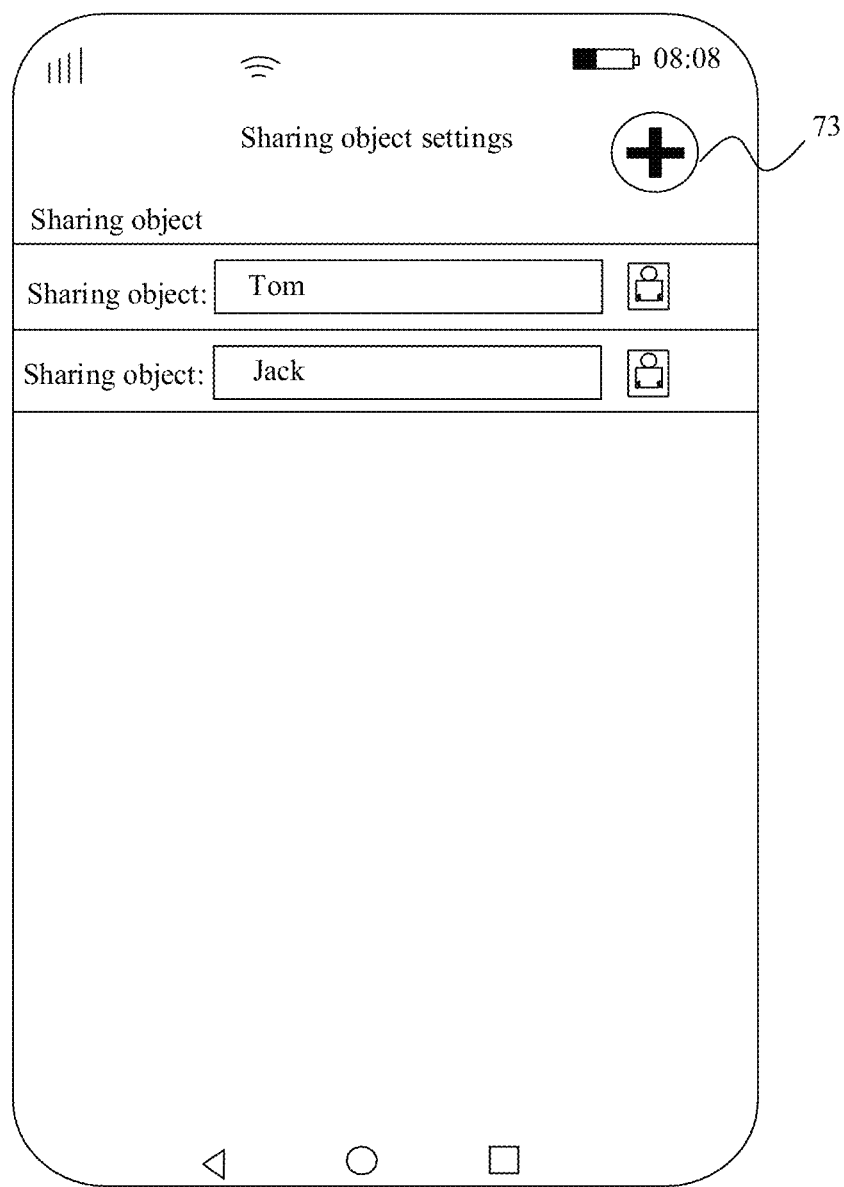
FIG. 7b is a schematic diagram of an interface of a terminal according to an embodiment of this application.
Figure 7C:
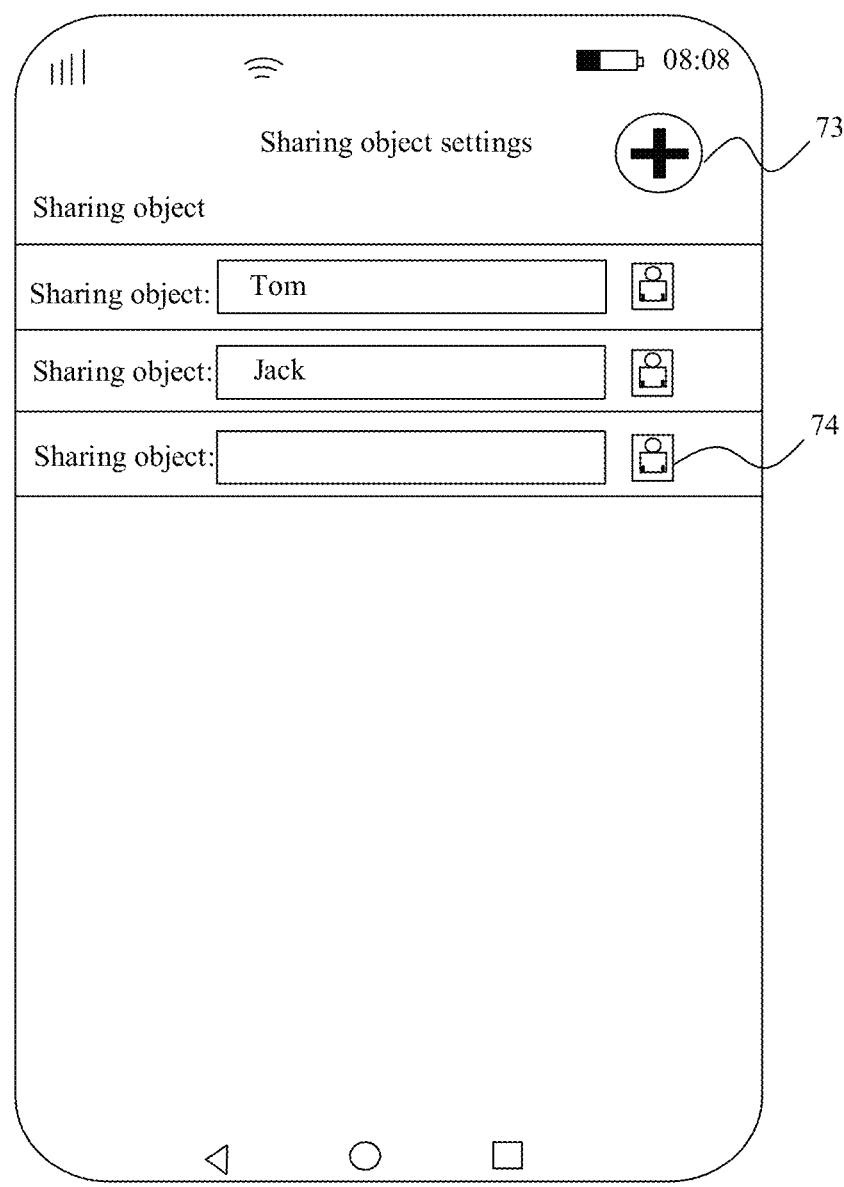
FIG. 7c is a schematic diagram of an interface of a terminal according to an embodiment of this application.
Figure 7D:
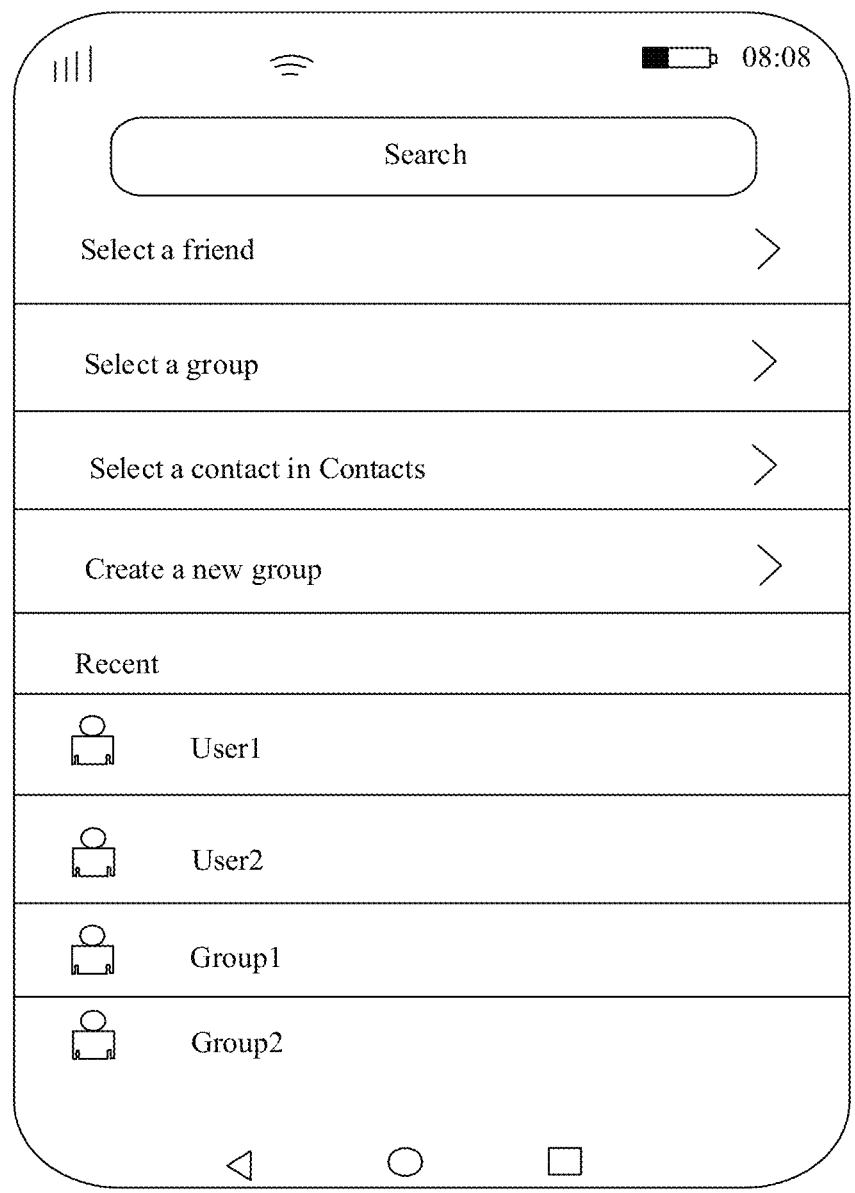
FIG. 7d is a schematic diagram of an interface of a terminal according to an embodiment of this application.
Figure 7E:
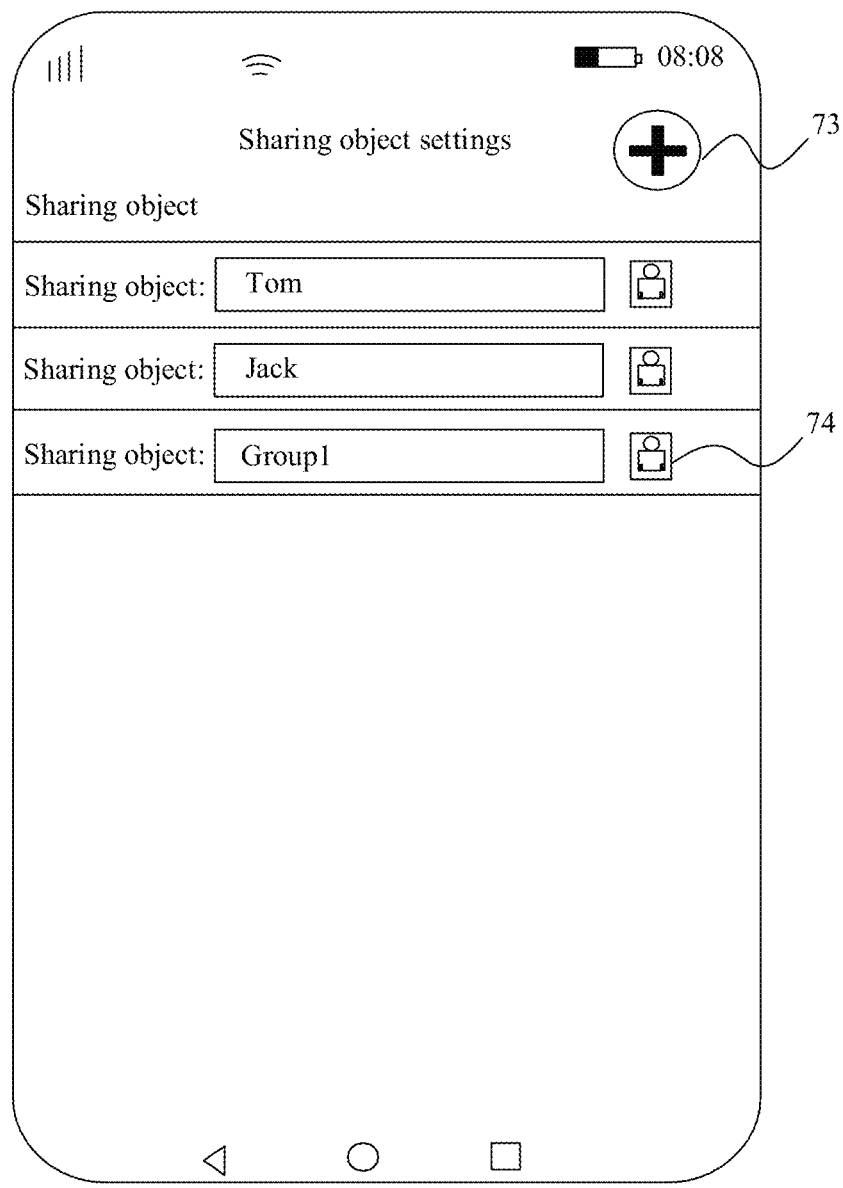
FIG. 7e is a schematic diagram of an interface of a terminal according to an embodiment of this application.
Figure 7F:
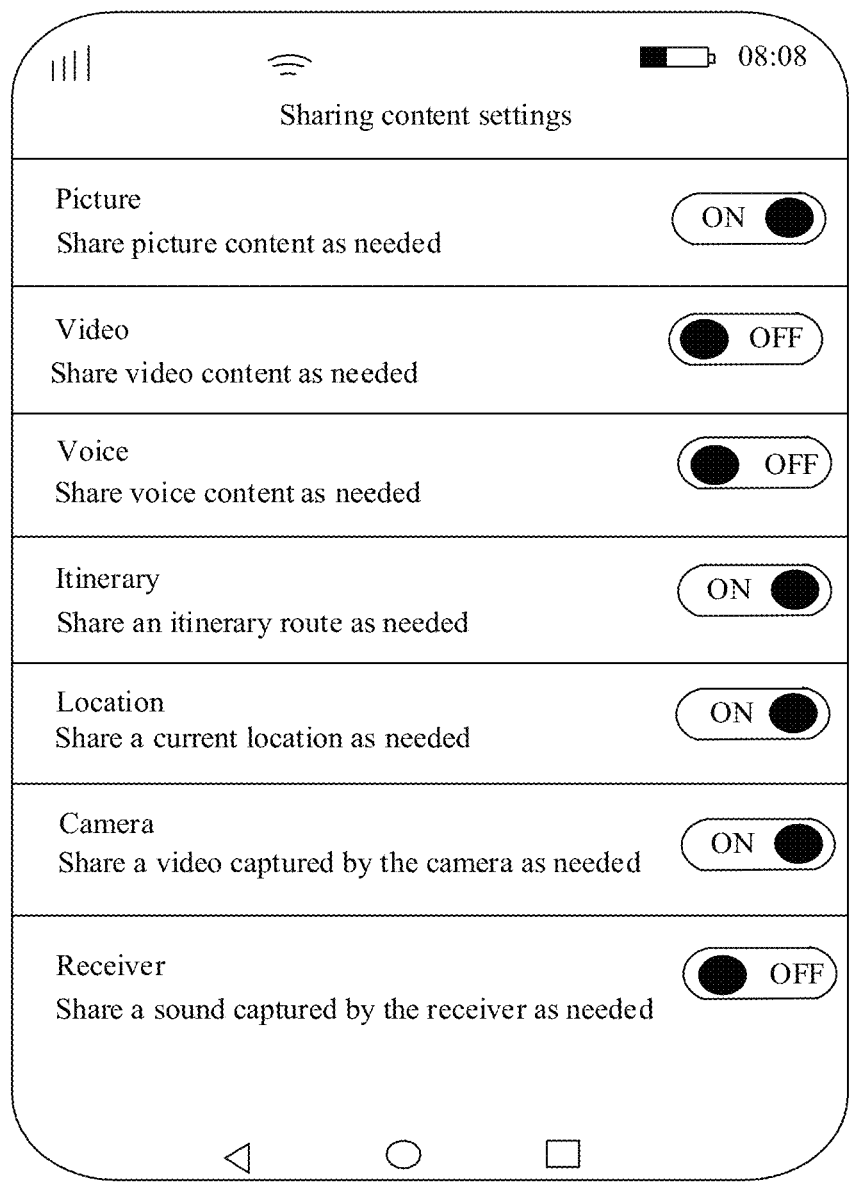
FIG. 7f is a schematic diagram of an interface of a terminal according to an embodiment of this application.

Still refer to FIG. 6e. The user may tap one of "Mobile phones", "Vehicles", "Tablets", and "Speakers" in the list of "My devices", and then enter a sharing setting interface of a corresponding terminal shown in FIG. 7a. As shown in FIG. 7a, in the sharing setting interface, the user may turn on automatic sharing in a display area 71. Then, the user may select a sharing object in the display area 72, and enter a sharing object setting interface shown in FIG. 7b. As shown in FIG. 7b, in the sharing object setting interface, the user may tap a button 73 of adding a sharing object to add a sharing object, and enter an interface shown in FIG. 7c. In this case, the user may tap a display area 74 to select an object that needs to be added by the user, and then enter an interface shown in FIG. 7d. In FIG. 7d, the user may select a sharing object as an individual or a group. When selecting a sharing object as a group, the user enters an interface shown in FIG. 7e. In addition, in FIG. 7d, the user may alternatively select "Create a new group" to establish a new group, and share data with a member in the newly created group. FIG. 7e includes three sharing objects: Tom, Jack, and Group1. After setting the sharing object, the user may return to the interface shown in FIG. 7a. In this case, the user may select sharing content in a display area 75, and enter an interface shown in FIG. 7f. In FIG. 7f, the user may turn on sharing of a picture, a video, a voice, an itinerary, a location, a camera, a receiver, and the like based on a requirement. After setting the sharing content, the user may return to the interface shown in FIG. 7a. In this case, the user may select a sharing condition in a display area 76, and enter an interface shown in FIG. 7g. In the interface displayed in FIG. 7g, the user may select a sharing object from specified sharing objects, for example, Tom, and select, from specified sharing content, content that the user wants to share with a corresponding sharing object, for example, a picture, a video, and a voice.

Figure 7G:
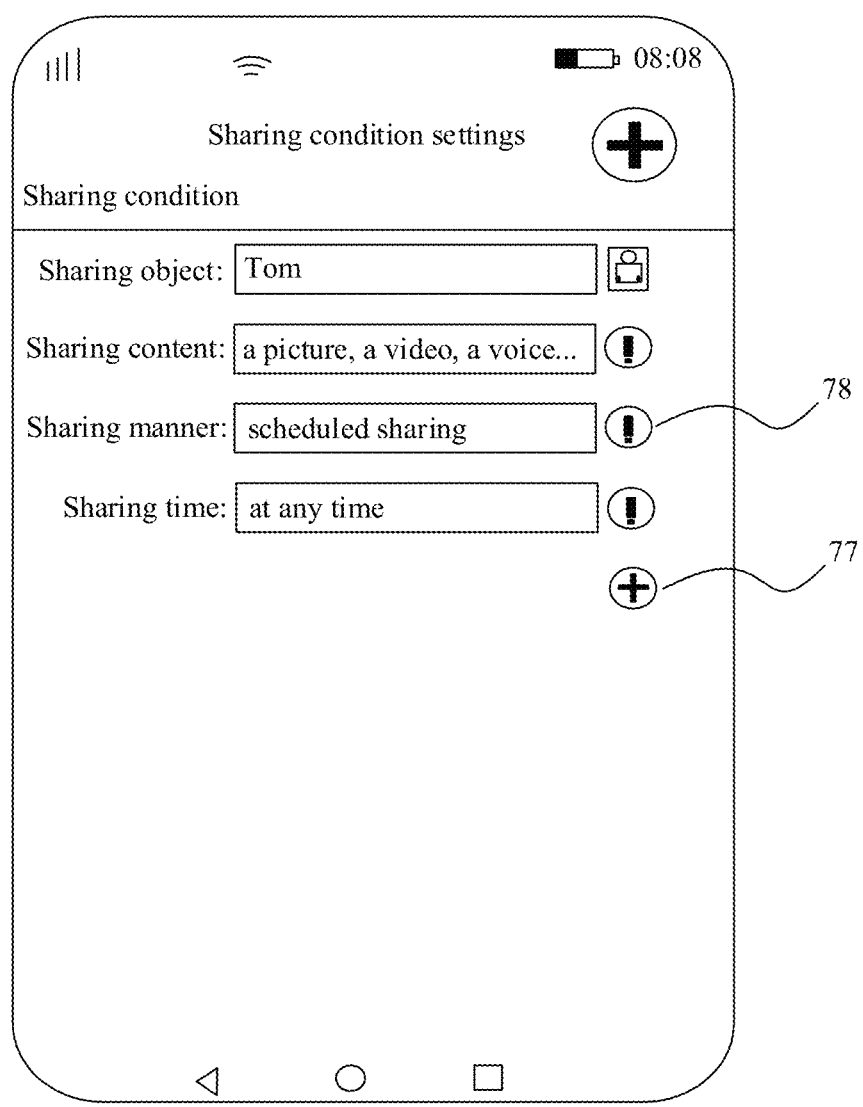
FIG. 7g is a schematic diagram of an interface of a terminal according to an embodiment of this application.
Figure 7H:
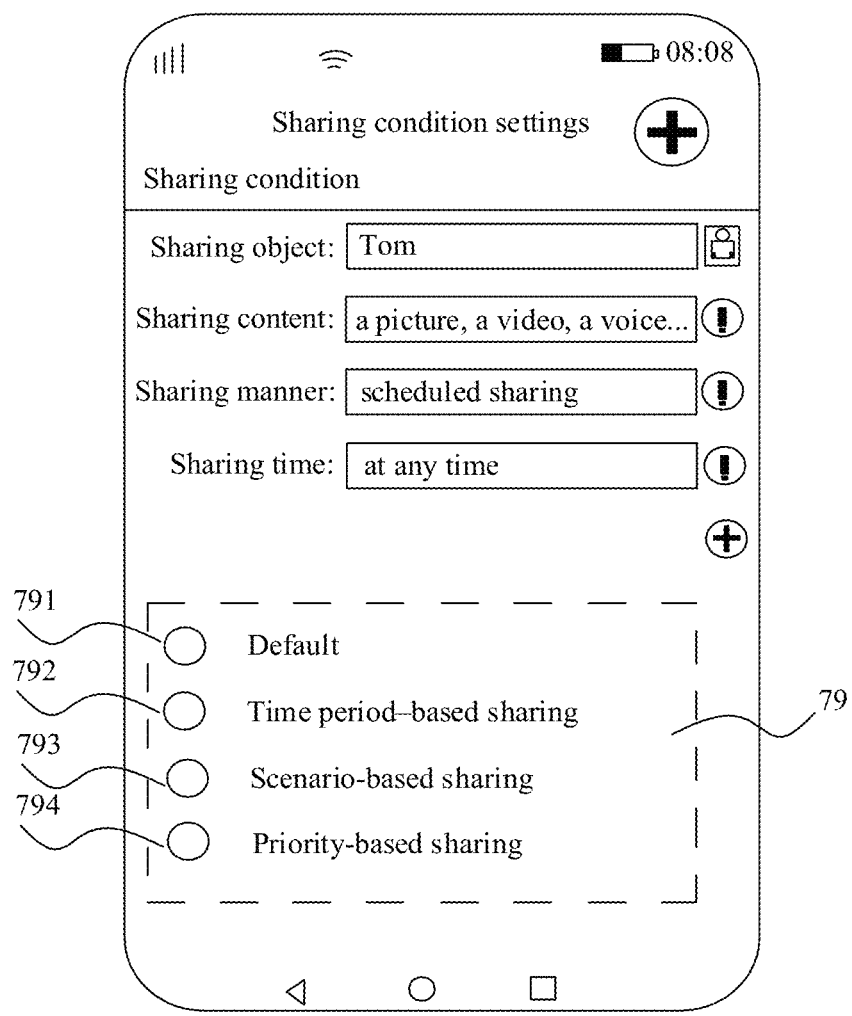
FIG. 7h is a schematic diagram of an interface of a terminal according to an embodiment of this application.

In addition, in FIG. 7g, the user may also set a sharing manner, for example, scheduled sharing, and may also set a sharing time, for example, sharing at any time. In an example, in FIG. 7g, the user may tap a button 78 for setting a sharing manner, and then enter an interface displayed in FIG. 7h. In the interface displayed in FIG. 7h, the user may select a sharing manner in a display area 79, for example, time period—based sharing, scenario-based sharing, or priority-based sharing. It may be understood that, after the button 78 for setting a sharing manner is tapped, a selectable sharing manner may alternatively be presented to the user in a drop-down menu. This is not limited herein. For example, after the user selects time period-based sharing, an interface shown in FIG. 7i may be displayed, that is, a time period setting or a time period that has been set is displayed in the display area 79, for example, sharing from 10:00 to 12:00. For example, after the user selects scenario-based sharing, an interface shown in FIG. 7j may be displayed, that is, a selectable scenario is displayed in the display area 79, for example, a driving scenario, a sports scenario, or an entertainment scenario. For example, after the user selects priority-based sharing, an interface shown in FIG. 7k may be displayed, that is, a priority that has been set or a priority that can be set is displayed in the display area 79. It may be understood that, in FIG. 7k, a priority of a vehicle is higher than that of a mobile phone, a priority of the mobile phone is higher than that of a speaker, and a priority of the speaker is higher than that of a watch. In an example, the user may drag to adjust a priority of each terminal in the interface shown in FIG. 7k. For example, the user drags the mobile phone to the vehicle. In this case, the priorities of the mobile phone and the vehicle are interchanged. It may be understood that, after the user sets a priority on a terminal, the setting information is synchronized to all terminals of a corresponding cloud account, and a priority that is set by the user most recently is replaced with a priority that is set by the user last time, that is, priority setting information that is set by the user most recently is presented to the user in a priority sharing setting interface including all terminals of a cloud account. It may be understood that, when setting a sharing manner, the user may simultaneously select a plurality of sharing manners, for example, time period-based sharing, scenario-based sharing, and priority-based sharing, or may select one of the manners. This is not limited herein.

Figure 7I:
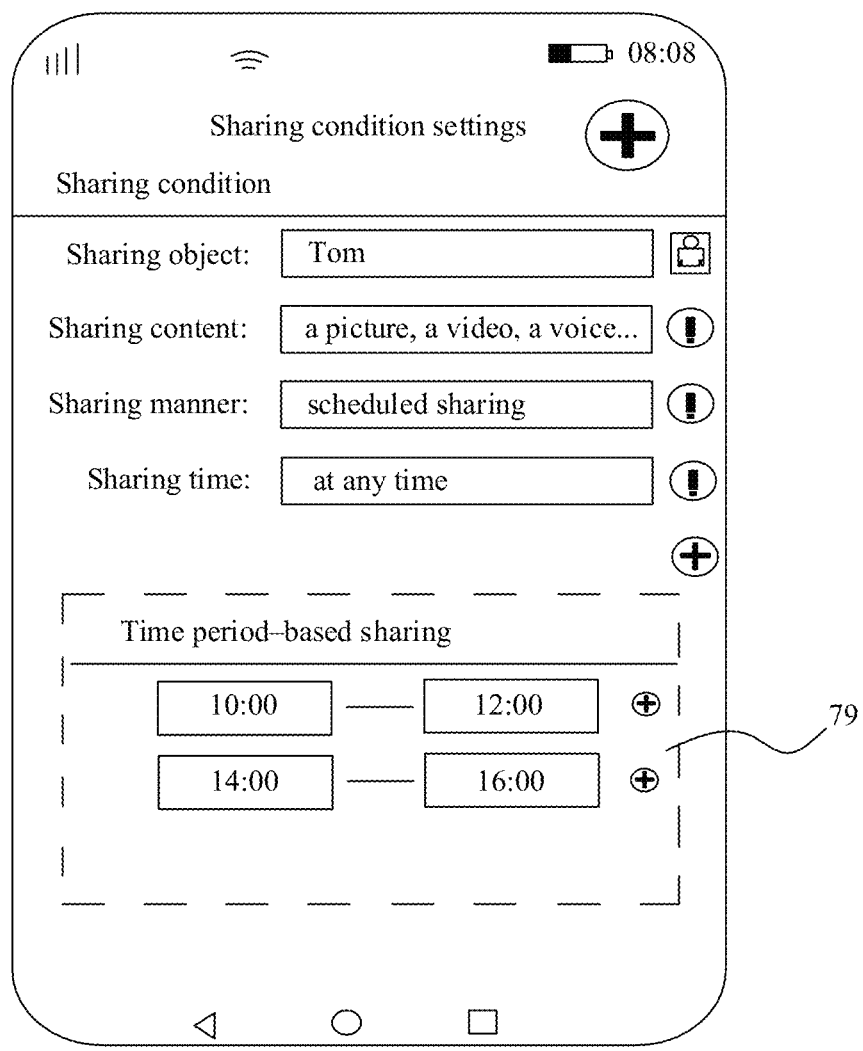
FIG. 7i is a schematic diagram of an interface of a terminal according to an embodiment of this application.
Figure 7J:
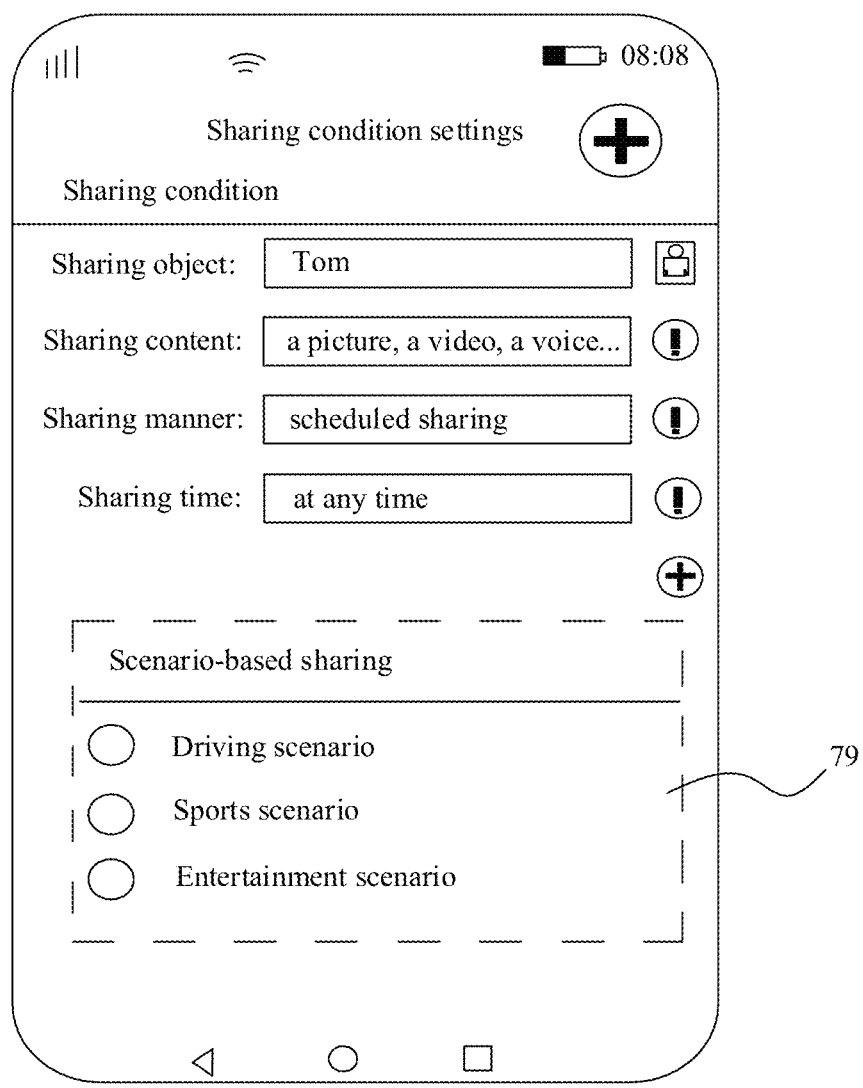
FIG. 7j is a schematic diagram of an interface of a terminal according to an embodiment of this application.
Figure 7K:
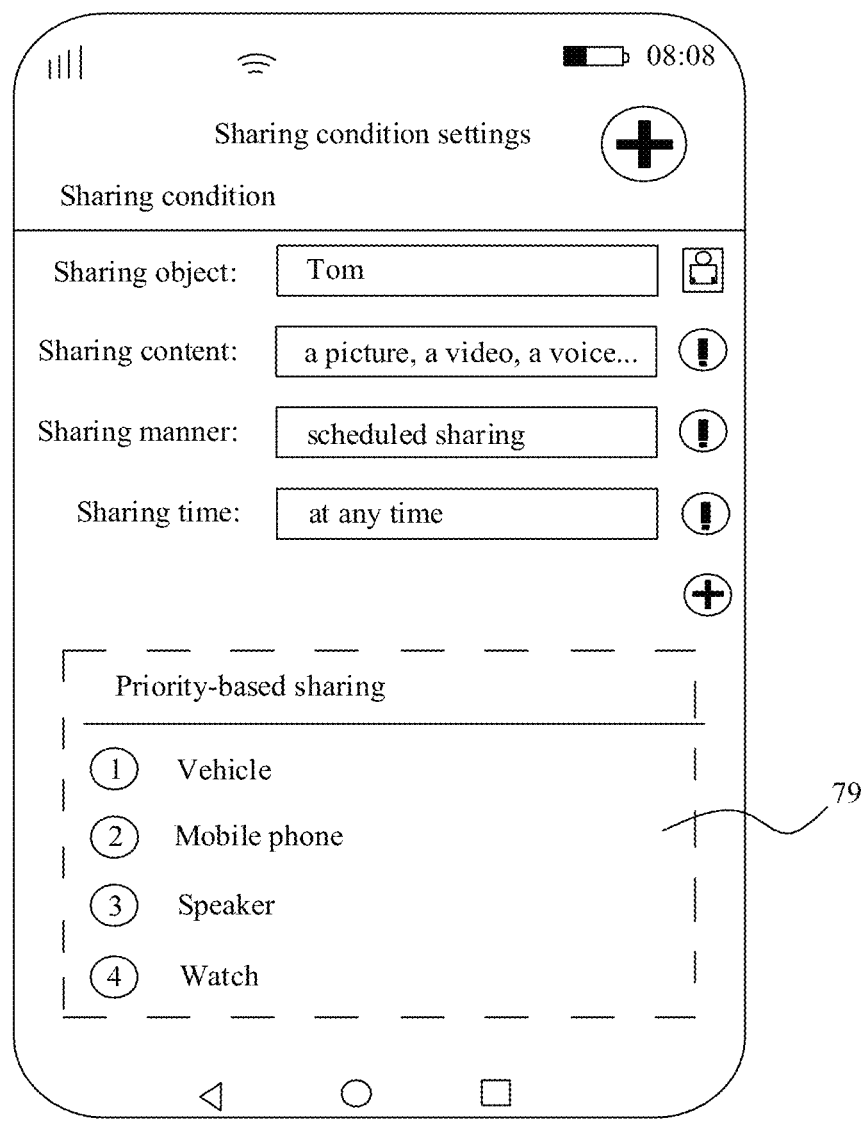
FIG. 7k is a schematic diagram of an interface of a terminal according to an embodiment of this application.
Figure 71:
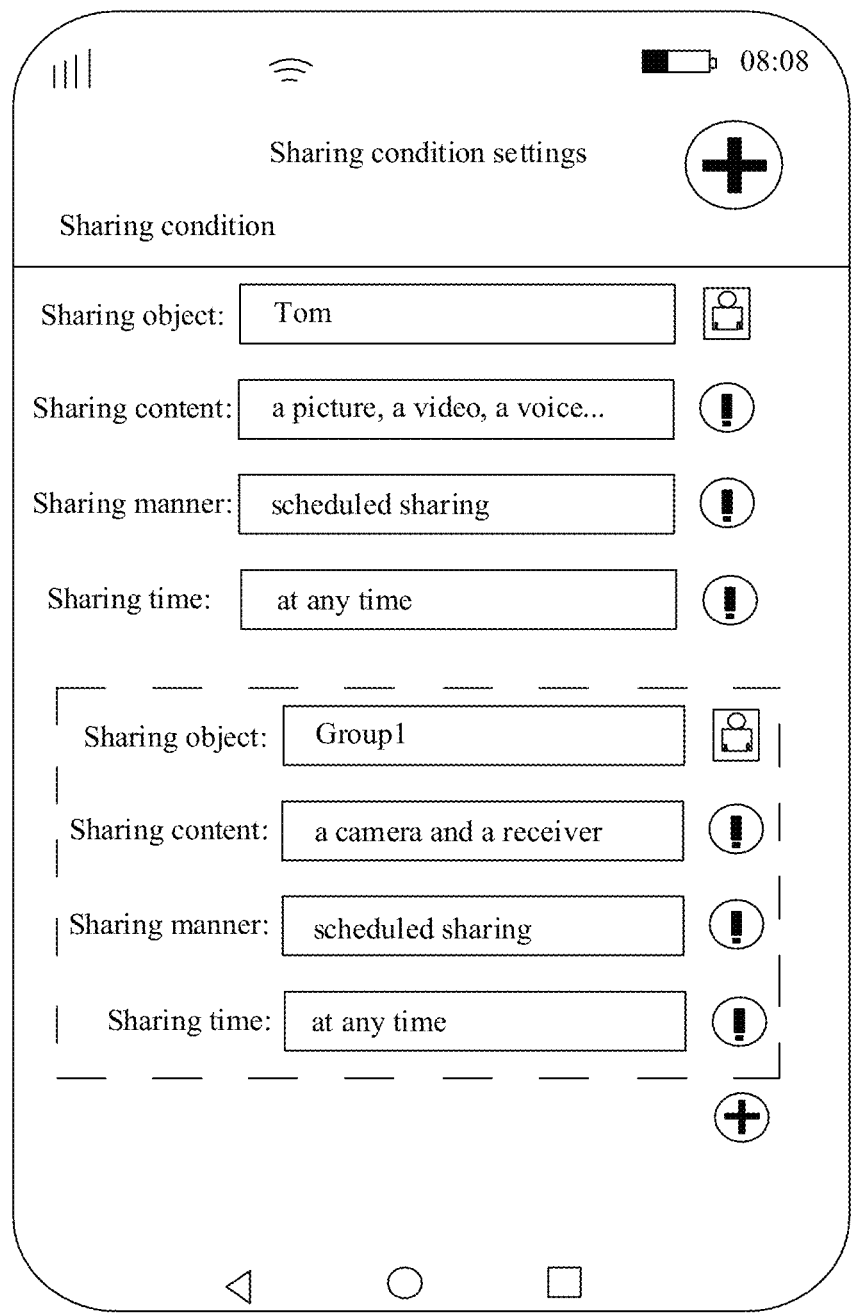
Figure 7M:
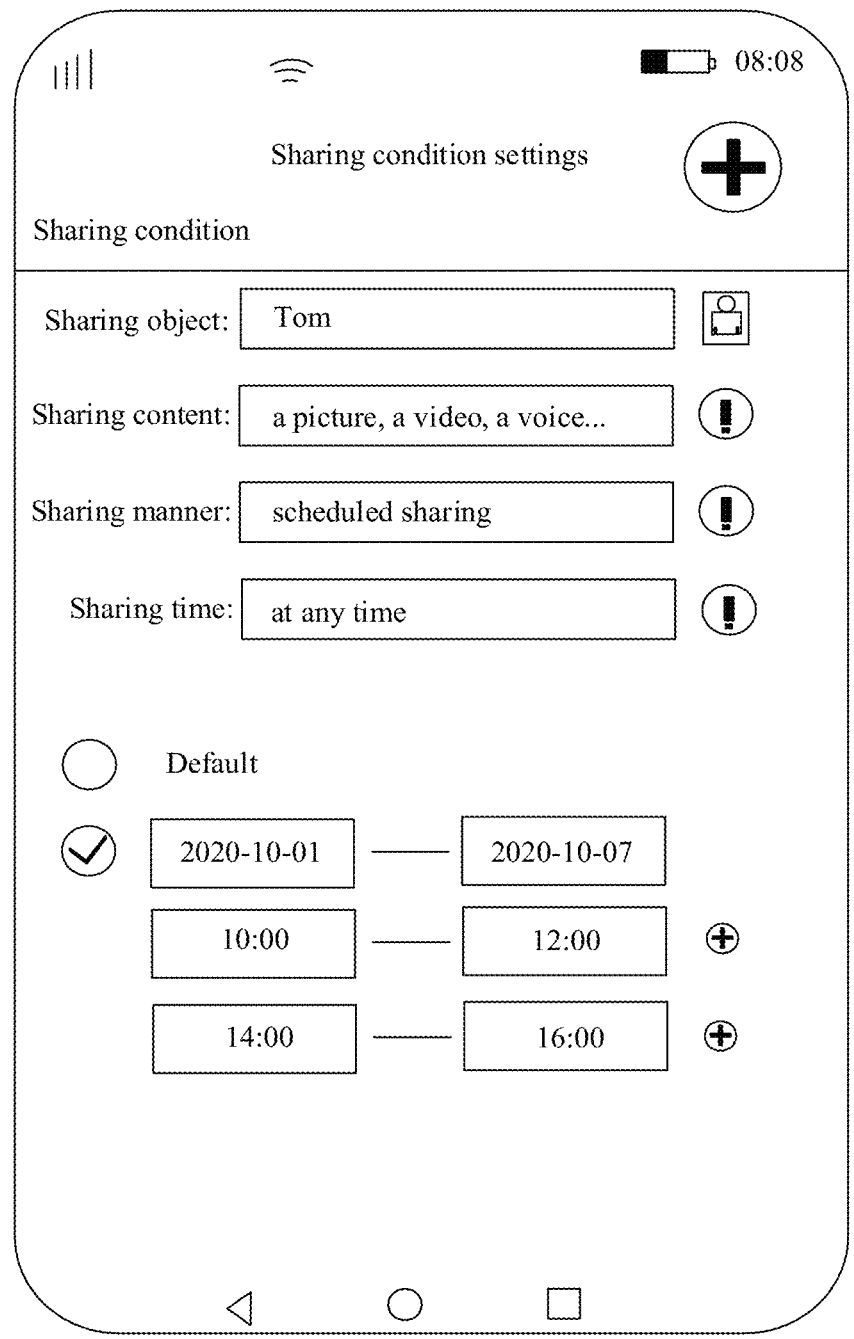
FIG. 7m is a schematic diagram of an interface of a terminal according to an embodiment of this application.

In addition, in FIG. 7g, the user may select a button 77 for adding a sharing condition, and then may enter an interface shown in FIG. 7l to add a new sharing condition. As shown in FIG. 7l, in the new sharing condition (an area enclosed by a dashed box in the figure), a sharing object may be Group1, shared content may be a camera and a receiver, a sharing manner may be scheduled sharing, and a sharing time may be any time. In addition, the user may alternatively customize a sharing time. As shown in FIG. 7m, when setting a sharing time of a sharing object Tom, the user may select a default time after tapping "at any time" in the sharing time, or may customize a time. For example, a sharing periodicity is set to 2020 Oct. 1 to 2020 Oct. 7, and a sharing time period is set to 10:00 to 12:00 and 14:00 to 16:00 every day. In this way, the user may complete setting of sharing permission for a single friend and/or a group.

It may be understood that in FIG. 7a, the user may alternatively turn on a sharing reminder, for example, turn on an SMS reminder or a phone reminder, so that the user immediately learns that a terminal that is being used by the user needs to share data. In addition, when learning that the terminal that is being used by the user needs to share data, the user may alternatively choose, according to an intention of the user, whether to allow data sharing, and the like.

After the foregoing operations are completed, if one terminal (for example, the terminal 11) in terminals (the terminal 11, the terminal 12, and the terminal 13) associated with the user A meets a data sharing policy, data in the terminal is sent to a cloud device by using a client or a web page that is logged in to by using a cloud account (for example, the cloud account a), and the cloud device forwards the data to a client or a web page corresponding to another cloud account (for example, the cloud account b) that has an association relationship with the cloud account and that has data sharing permission. In this way, when a terminal (for example, the terminal 14) that has an association relationship with the another cloud account (for example, the cloud account b) is in an active state, data shared with another terminal (for example, the terminal 11) may be viewed through the terminal (for example, the terminal 14).

Figure 8:
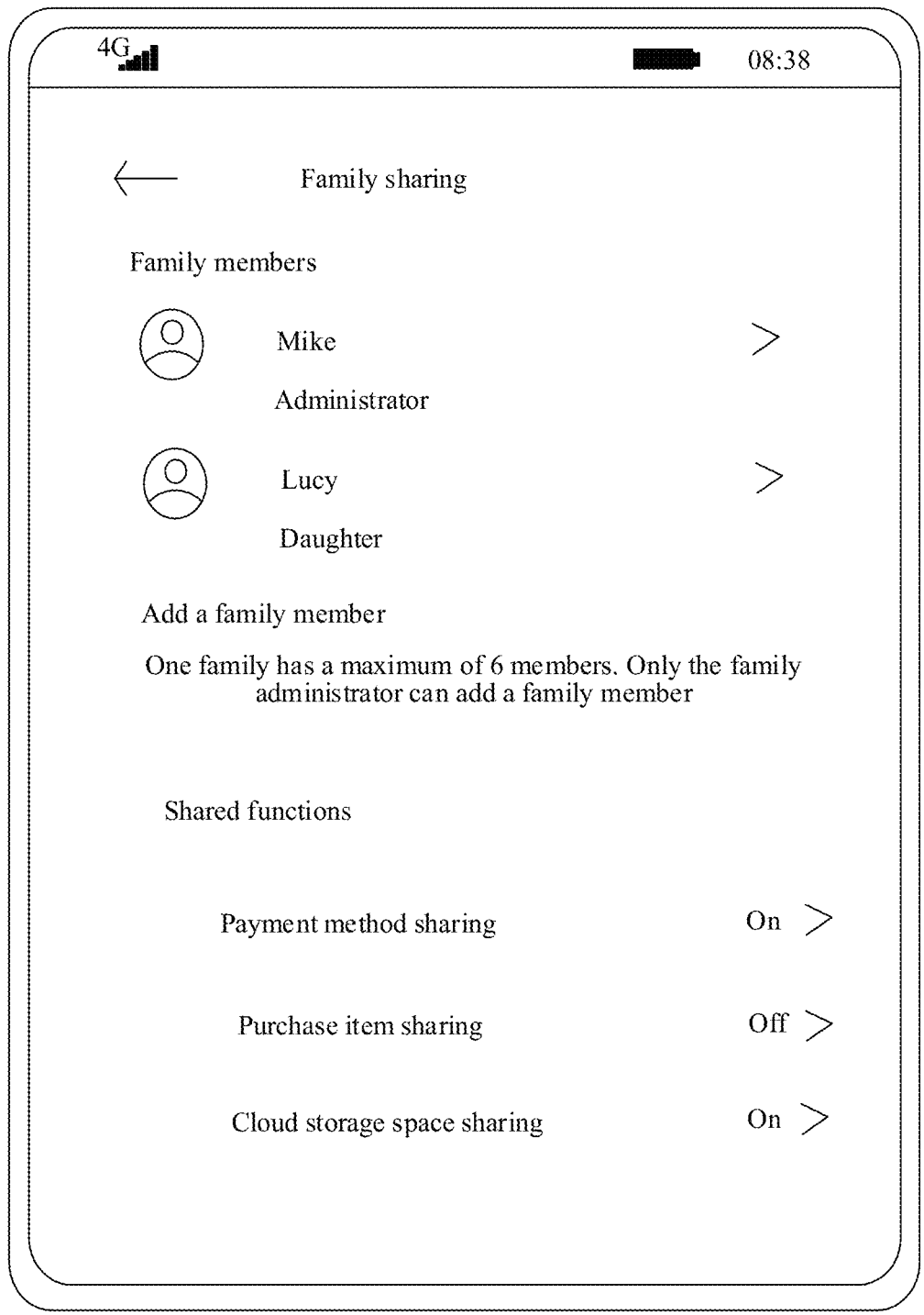
FIG. 8 is a schematic diagram of an interface of a terminal according to an embodiment of this application.

In some embodiments, after logging in to the client corresponding to the cloud account on the terminal by using the cloud account, the user may select family sharing in a setting interface or another interface, to share a payment method, a purchase item, cloud storage space, and the like of the user with user's family. For example, after selecting "Family sharing", the user may enter an interface shown in FIG. 8. In the interface shown in FIG. 8, the user Mike may add a family member to family sharing, and set a sharing function, for example, turn on payment method sharing and cloud storage space sharing.

Figure 9A:
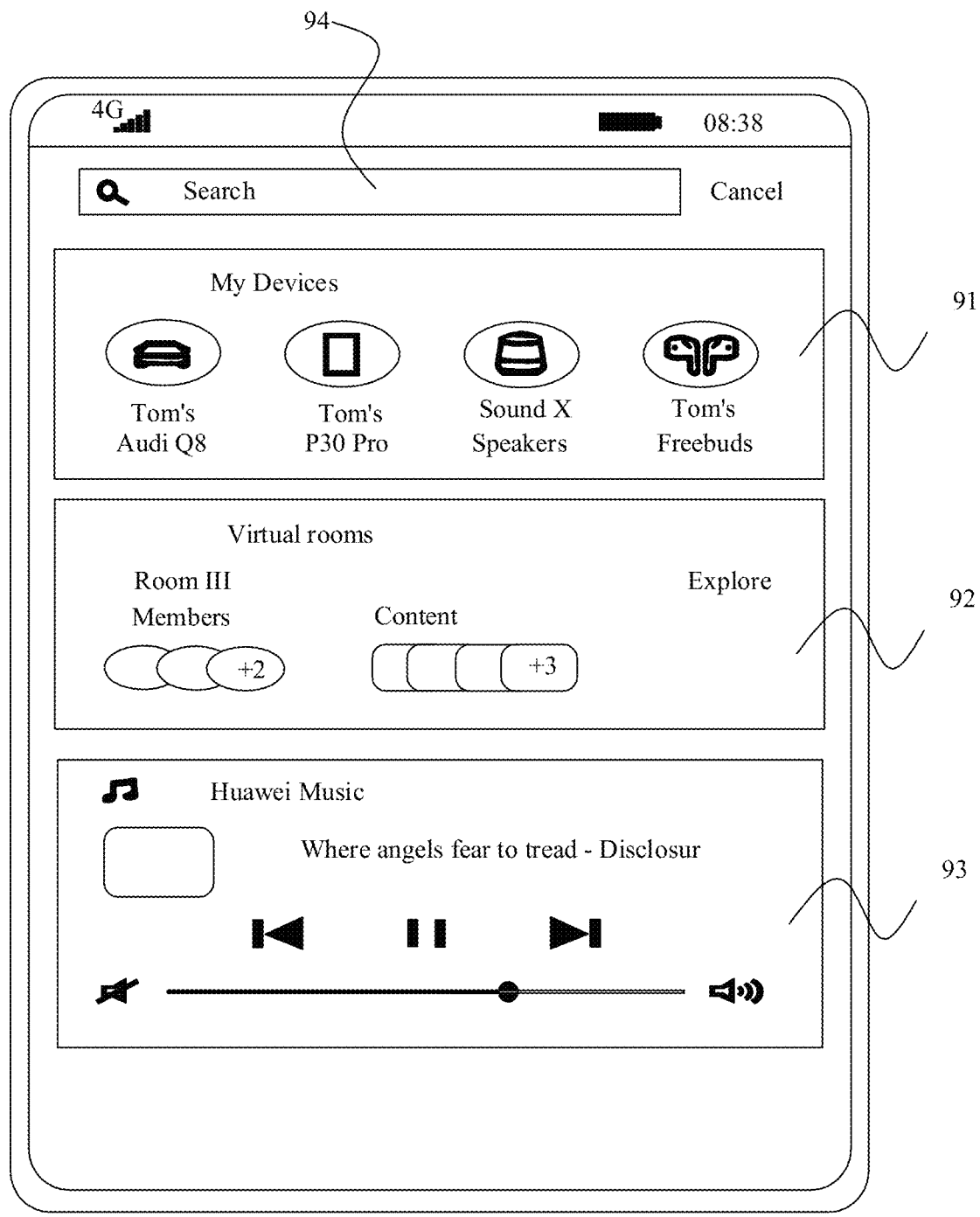
FIG. 9a is a schematic diagram of an interface of a terminal according to an embodiment of this application.
Figure 9B:
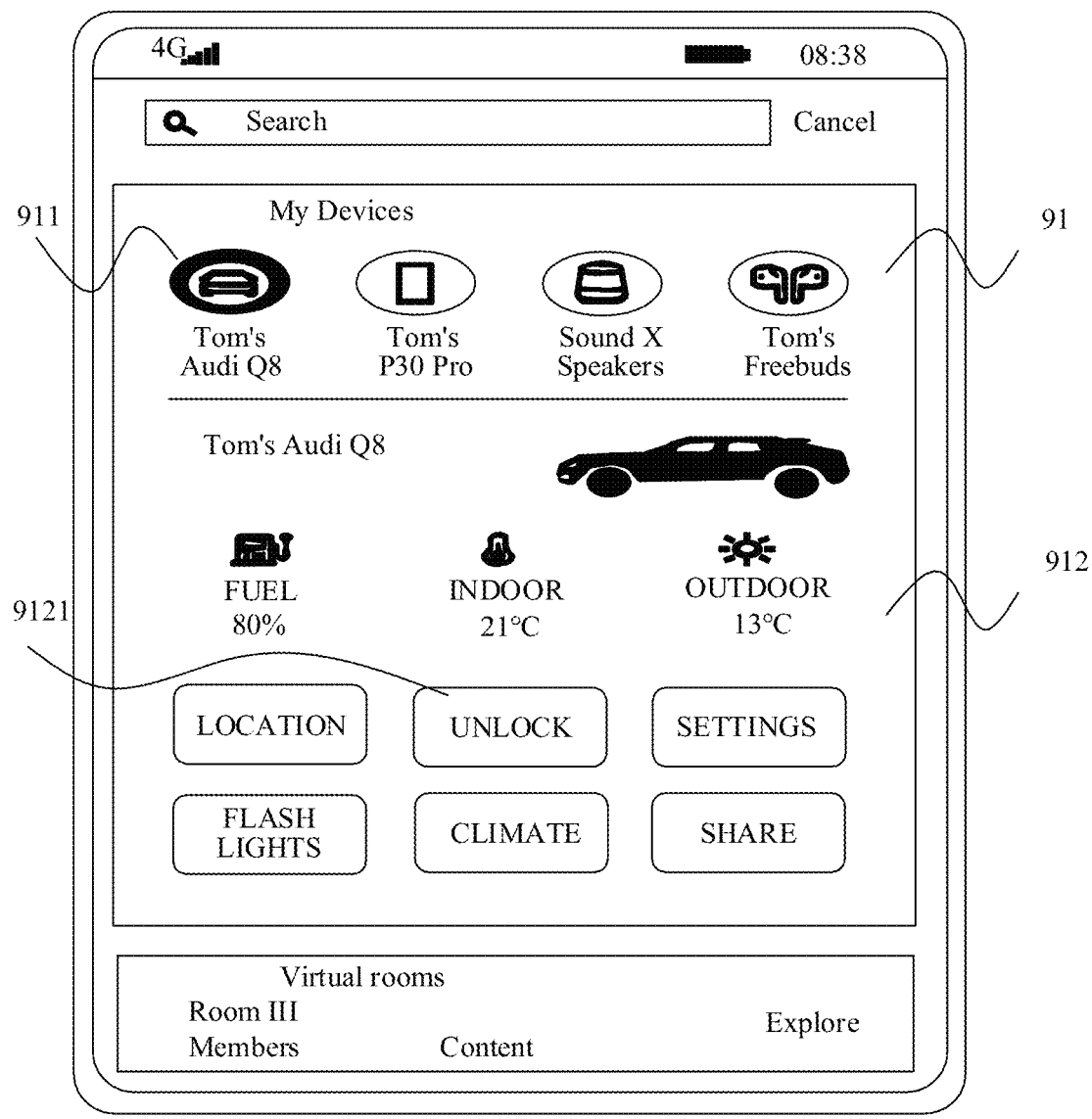
FIG. 9b is a schematic diagram of an interface of a terminal according to an embodiment of this application.
Figure 9C:
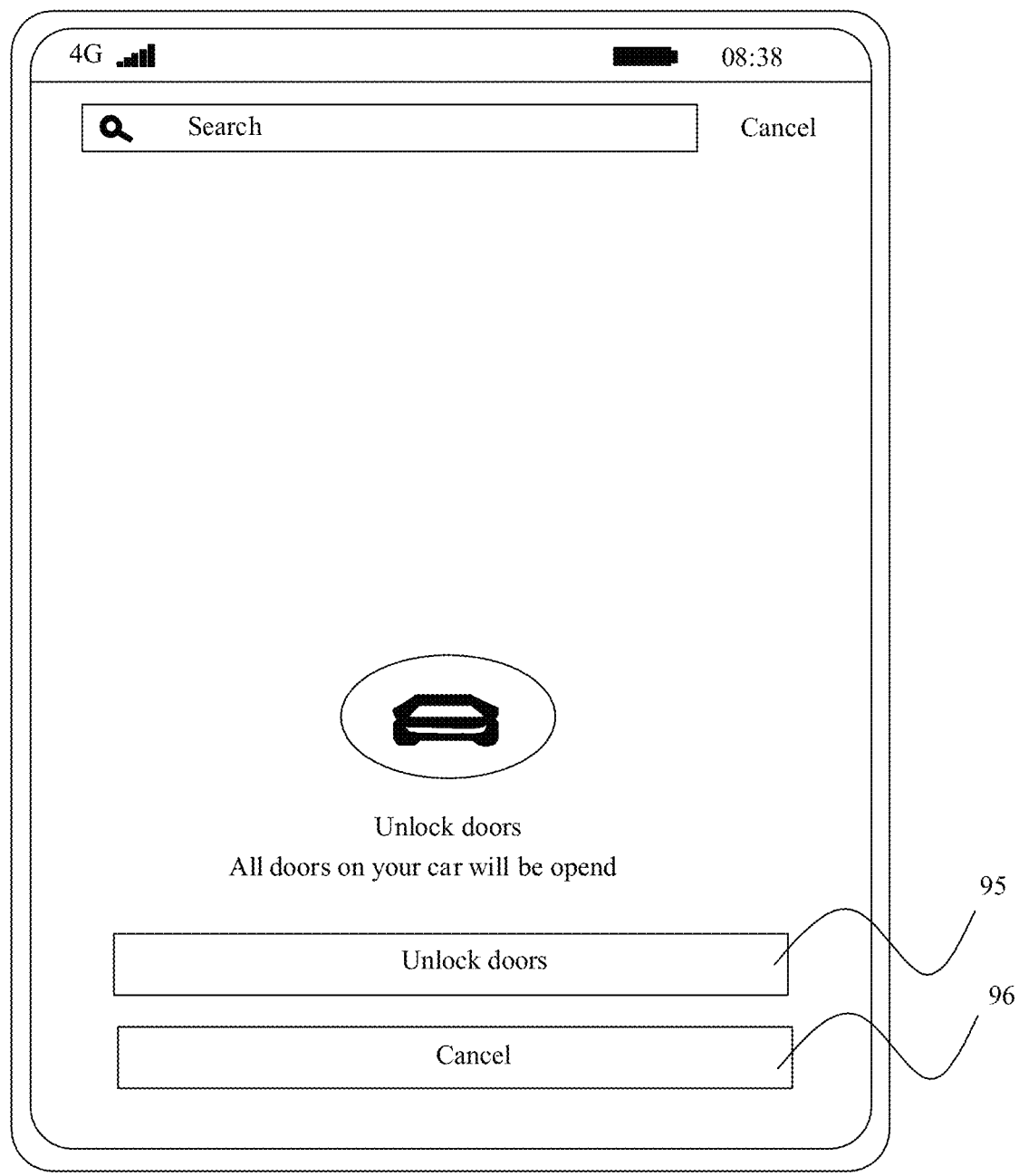
FIG. 9c is a schematic diagram of an interface of a terminal according to an embodiment of this application.

In some embodiments, if a same cloud account of the user is associated with a plurality of terminals of the user, after the user opens a client corresponding to the cloud account on one of the terminals, as shown in FIG. 9a, terminals associated with the cloud account are displayed in a display area 91 of the terminal, for example, a vehicle, a mobile phone, and a speaker. Then, the user may tap to set a terminal, to view parameter information related to the terminal. For example, as shown in FIG. 9b, the user selects a terminal 911 representing a vehicle in a display area 91 of the terminal. In this case, parameter information related to the vehicle may be displayed in a display area 912, for example, a remaining fuel amount, a temperature inside and outside the vehicle, location information, and door control information. Next, the user may tap a piece of information in the terminal selected by the user, to view content related to the piece of information. For example, as shown in FIG. 9b, the user may tap an "Unlock" button 9121 in the display area 912, to enter an interface shown in FIG. 9c. In this case, the user may select an "Unlock doors" button 95 to open the doors, or may select a "Cancel" button 96 to cancel opening the doors. It should be noted that "Virtual rooms" in FIG. 9a may be understood as "Group space" in FIG. 6d.

In some embodiments, a plurality of cloud accounts may be used to log in to one terminal. In this case, the terminal may be understood as a terminal shared by a plurality of users. For example, the terminal may be a smart television. If a cloud account a in the plurality of cloud accounts is in a foreground active state, data shared by another cloud account that has an association relationship with the cloud account a may be viewed on the terminal, or data in the terminal may be shared with another cloud account that has an association relationship with the cloud account a by using the cloud account a. It should be understood that the user may switch between cloud accounts based on a requirement of the user, and select a cloud account that the user expects to be in a foreground active state.

Figure 10:
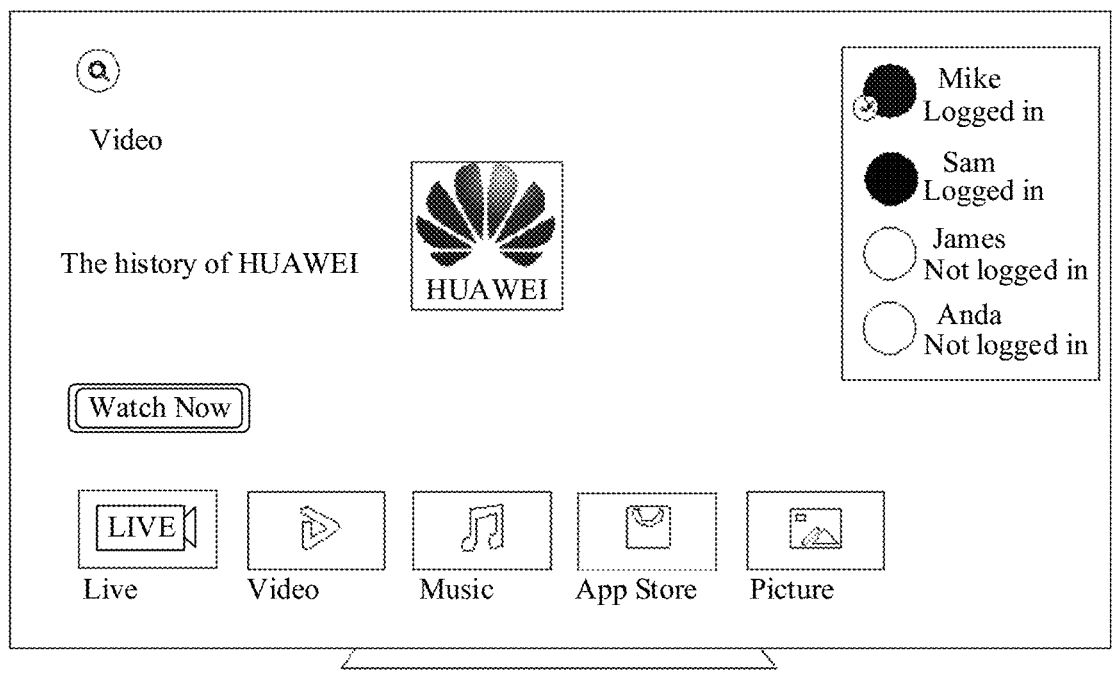
FIG. 10 is a schematic diagram of an interface of a smart television according to an embodiment of this application.

For example, as shown in FIG. 10, the terminal is a smart television, and cloud accounts that have been used to log in to the smart television include a cloud account of Mike and a cloud account of Sam. However, the cloud account of Mike is in a foreground active state, and the cloud account of Sam is not in a foreground active state. In this case, the user may tap a "Watch Now" button to choose to watch a video "The history of HUAWEI". If a data sharing policy that is set by Mike is: sharing video data in the smart television from 08:00 to 10:00 in the morning, when the user watches the video "The history of HUAWEI" on the smart television, and a current watching moment is between 08:00 and 10:00 in the morning, the video content "The history of HUAWEI" may be automatically shared with another cloud account that has an association relationship with the cloud account of Mike. In this way, the video content that is being played on the smart television, that is, the video "The history of HUAWEI", may be viewed on a terminal that is logged in to by using the another cloud account. It should be understood that the another cloud account that has the association relationship with the cloud account of Mike has permission to share the video content.

For ease of understanding, the following uses an example to describe an application process of a data sharing method in embodiments of this application.

The user A has three terminals: a head unit, a mobile phone, and smart glasses, and a cloud account of the user A is the cloud account a. The user B has two terminals: a computer and a smart television, and a cloud account of the user B is the cloud account b. The user A has added the cloud account b as a friend in a client corresponding to a cloud account in the mobile phone, and has set a sharing condition, permission, and the like, that is, there is an association relationship between the cloud account and the cloud account b.

First, a case in which data is shared based on a priority is described.

The user A logs in to the head unit, the mobile phone, and the smart glasses by using the cloud account a. The user A may set a sharing condition of the head unit to a "driving mode", and sharing conditions of the mobile phone and the smart glasses to a "camera mode". Sharing priorities of the head unit, the mobile phone, and the smart glasses are in descending order. The head unit, the mobile phone, and the smart glasses feed back their respective device status information to the cloud device in real time or at an interval of preset duration. For example, the head unit may feed back whether to be in a driving mode, and the mobile phone and the smart glasses may feed back whether to be in a camera mode.

Figure 11A:
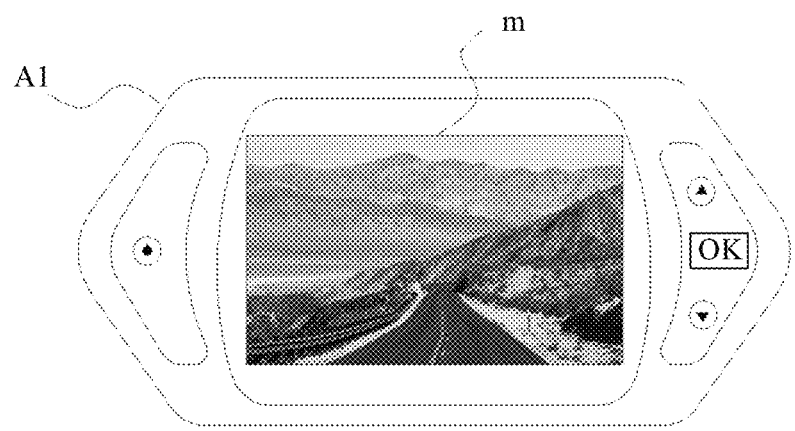
FIG. 11a and FIG. 11b jointly constitute a schematic diagram of a data sharing scenario.
Figure 11B:
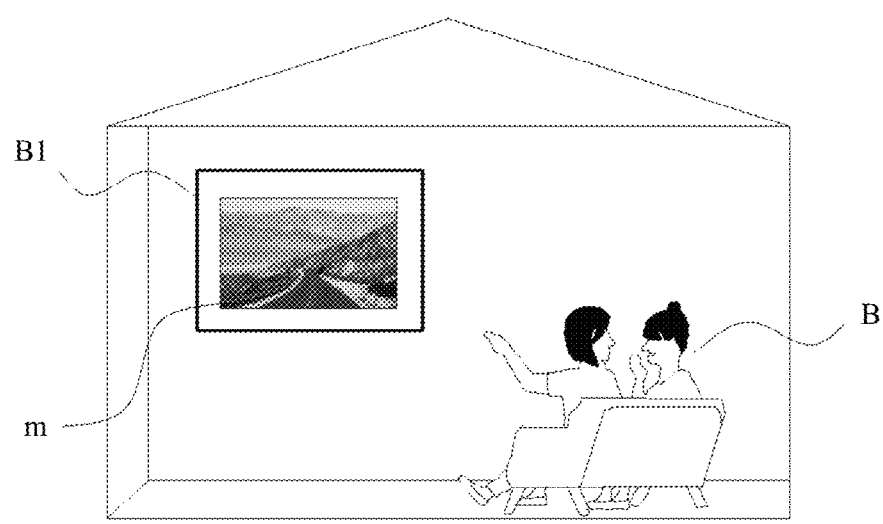

When the user A drives a vehicle in which the head unit is located to travel, the head unit is in a driving mode. In this case, a client corresponding to the cloud account a in the head unit obtains the scenery along the way that is shot and recorded by a device such as a camera or a dashcam in the head unit, and uploads the scenery to the cloud device. For example, as shown in FIG. 11a, a dashcam A1 on the vehicle captures a picture m. In this case, a client corresponding to the cloud account a in the dashcam A1 may upload the picture m to the cloud device. Then, the cloud device transmits, to the client corresponding to the cloud account b, landscape data along the way, for example, the picture m in FIG. 11a, uploaded by the cloud account a. Refer to FIG. 11b. If the user B is using a smart television B1, the user B may open a client corresponding to the cloud account b in the smart television B1, to view the landscape data along the way, for example, the picture m, shared by the user A. In a vehicle driving process, the user A enables a camera of the mobile phone, and the mobile phone is in a shooting mode. However, because a priority of the head unit is higher than a priority of the mobile phone, the cloud device determines the mobile phone as a terminal that does not need to share data, and does not send a request for receiving data in the mobile phone.

After the user A parks the vehicle, the head unit exits the driving mode. In this case, the head unit does not meet the sharing condition, and the client corresponding to the cloud account a in the head unit stops obtaining data in the head unit. In this case, if the mobile phone is still in a shooting mode, a client corresponding to the cloud account a in the mobile phone obtains a picture or a video shot by the mobile phone, and uploads the picture or the video to the cloud device. Then, the cloud device transmits the picture or the video to a client corresponding to the cloud account b.

Second, a case in which data is shared based on a time period is described.

The user A logs in to the head unit, the mobile phone, and the smart glasses by using the cloud account a. The user A may set a sharing condition as follows: Sharing is performed by the head unit during a self-driving time period from 08:00 to 12:00; sharing is performed by the mobile phone during an outdoor dining time period from 12:00 to 14:00; sharing is performed by the smart glasses during a scenic sightseeing time period from 14:00 to 16:00; and sharing is performed by the smart glasses during a running time period from 16:00 to 18:00.

If a current time period belongs to 08:00 and 12:00, neither the mobile phone nor the smart glasses meet the sharing condition, but the head unit meets the sharing condition. Therefore, clients corresponding to the cloud account a in the mobile phone and the smart glasses stop obtaining data, and a client corresponding to the cloud account a in the head unit obtains the scenery along the way that is shot and recorded by a device such as a camera or a dashcam in the head unit, and uploads the scenery to the cloud device. Then, the cloud device transmits, to a client corresponding to the cloud account b, landscape data along the way that is uploaded by the cloud account a. If the user B is using a smart television, the user B may open a client corresponding to the cloud account b in the smart television, to view the landscape data along the way that is shared by the user A.

Figure 12A:
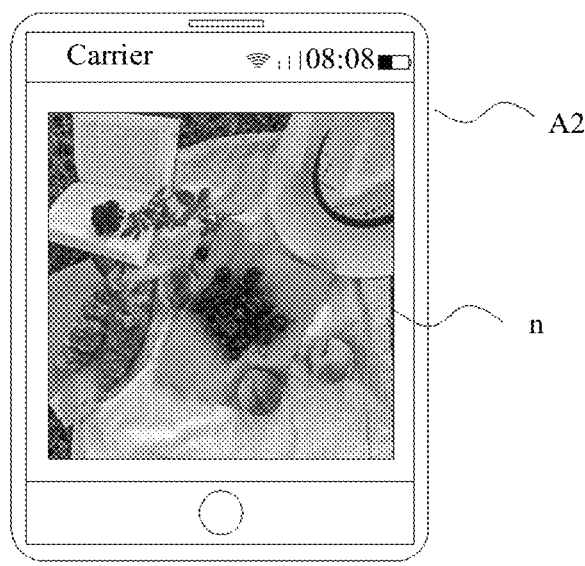
FIG. 12a and FIG. 12b jointly constitute a schematic diagram of a data sharing scenario.
Figure 12B:
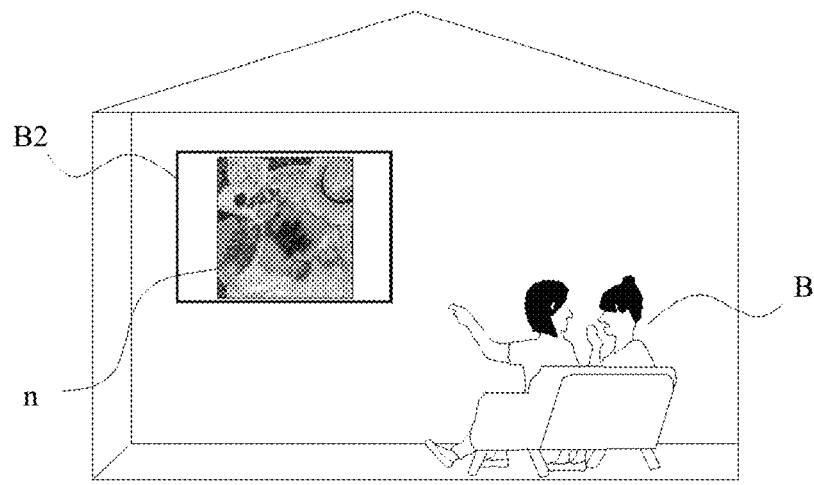

If a current time period belongs to 12:00 and 14:00, neither the head unit nor the smart glasses meet the sharing condition, but the mobile phone meets the sharing condition. Therefore, clients corresponding to the cloud account a in the head unit and the smart glasses stop obtaining data, and a client corresponding to the cloud account a in the mobile phone obtains a picture or a video shot by the mobile phone, and uploads the picture or the video to the cloud device. For example, as shown in FIG. 12a, a mobile phone A2 captures a picture n, and a client corresponding to the cloud account a in the mobile phone A2 uploads the picture n to the cloud device. Then, the cloud device transmits the uploaded picture or video, for example, the picture n in FIG. 12a, to the client corresponding to the cloud account b. As shown in FIG. 12b, if the user B is using a smart television B2, the user B may open a client corresponding to the cloud account b in the smart television B2, to view the picture or the video, for example, the picture n, that is shared by the user A and that is shot by the mobile phone.

If a current time period belongs to 14:00 and 18:00, neither the head unit nor the mobile phone meets the sharing condition, but the smart glasses meet the sharing condition. Therefore, clients corresponding to the cloud account a in the head unit and the mobile phone stop obtaining data, and a client corresponding to the cloud account a in the smart glasses obtains a picture or a video shot by the smart glasses, and uploads the picture or the video to the cloud device. Then, the cloud device transmits the uploaded picture or video to the client corresponding to the cloud account b. If the user B is using a smart television, the user B may open a client corresponding to the cloud account b in the smart television, to view the picture or the video that is shared by the user A and that is shot by the smart glasses.

Third, a case in which data is shared based on a sharing scenario is described.

The user A logs in to the head unit, the mobile phone, and the smart glasses by using the cloud account a. The user A may set a sharing condition as follows: When a distance between any terminal of the user A and any terminal of the user B is greater than a preset distance, for example, 100 meters, sharing is performed by a terminal that exceeds the preset distance.

Both the terminal of the user A and the terminal of the user B may continuously or periodically upload their respective location information to the cloud device. The location information may carry an identifier of the terminal. Then, the cloud device determines a distance between each terminal (that is, the head unit, the mobile phone, and the smart glasses) of the user A and each terminal (that is, the computer and the smart television) of the user B. It is assumed that the cloud device determines that a distance between the head unit of the user A and the terminal of the user B is L1, a distance between the mobile phone of the user A and the terminal of the user B is L2, and a distance between the smart glasses of the user A and the terminal of the user B is L3. In this case, if both L1 and L3 are less than a preset distance L0, and L2 is greater than L0, it may be determined that the distance between the mobile phone of the user A and the terminal of the user B exceeds the preset distance. In this case, the cloud device may send an indication for obtaining location information to a client corresponding to the cloud account a in the mobile phone. Then, the client corresponding to the cloud account a in the mobile phone obtains location information of the mobile phone, and uploads the location information to the cloud device. Then, the cloud device transmits the uploaded location information to a client corresponding to the cloud account b. If the user B is using a smart television, the user B may open a client corresponding to the cloud account b in the smart television, to view the location information of the mobile phone that is shared by the user A.

It may be understood that the sharing scenario may alternatively be another scenario, for example, a sports scenario, an entertainment scenario, a sightseeing scenario, or a travel scenario. Details are not described herein. In an example, the sports scenario may be understood as a scenario in which the user performs physical exercise, such as running, rope skipping, or cycling. The entertainment scenario may be understood as a scenario in which the user plays an indoor game or an outdoor game. The sightseeing scenario may be understood as a scenario in which the user visits places of interest or explores the scenery of nature. The travel scenario may be understood as a scenario in which the user takes or drives a vehicle to move, for example, a scenario in which the user drives a vehicle on a road.

It should be noted that the foregoing data sharing cases are merely examples for description, and constitute no limitation. A specific sharing condition is not specifically limited in this embodiment. One sharing condition may be used, or a combination of a plurality of sharing conditions may be used, for example, a combination of a sharing time and a sharing priority, a combination of a sharing time and a sharing scenario, or a combination of a sharing time, a sharing priority, and a sharing scenario.

The following describes a data sharing method provided in a solution.

The data sharing method provided in this solution may be applied to a system including a first device group, a second device group, and a cloud device. The first device group and the second device group each include at least one device, a first cloud account is used to log in to a device in the first device group, a second cloud account is used to log in to a device in the second device group, and the cloud device stores a data sharing policy for the first cloud account and an association relationship between the first cloud account and the second cloud account. The first device group may be understood as a device group including one or more of the terminals 11, 12, and 13 in FIG. 1. The device in the first device group may include one or more of the terminals 11, 12, and 13. The second device group may be understood as a device group including one or more of the terminals 14 and 15 in FIG. 1. The device in the second device group may include one or more of the terminals 14 and 15. The cloud device may be understood as the cloud device 16 in FIG. 1. The following describes specific operations of the data sharing method provided in this solution.

Figure 13:
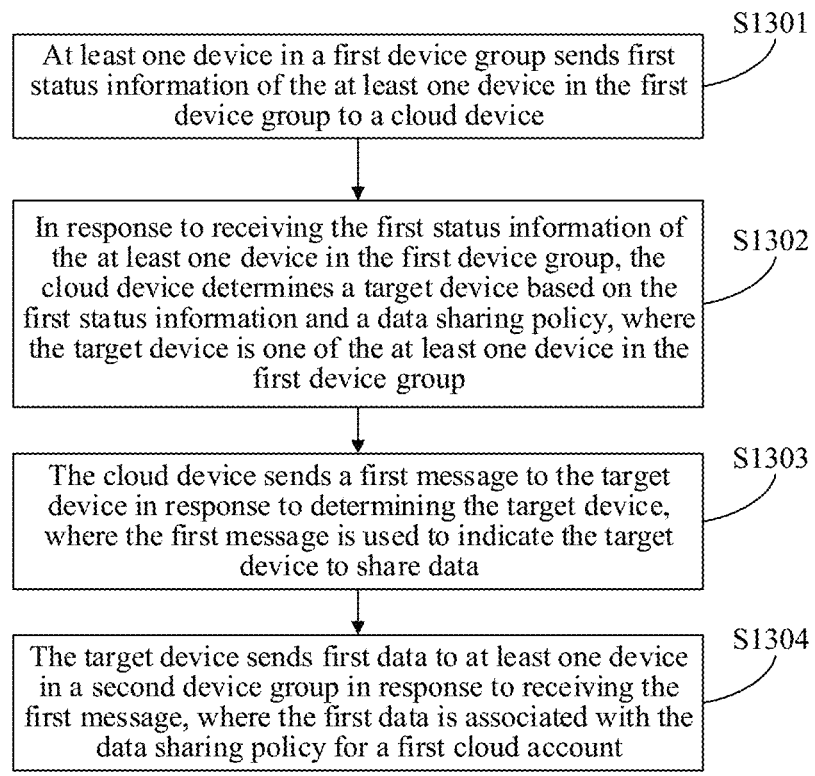
FIG. 13 is a schematic flowchart of a data sharing method according to an embodiment of this application.

FIG. 13 is a schematic flowchart of a data sharing method according to an embodiment of this application. As shown in FIG. 13, the data sharing method may include the following operations.

Operation S1301: The at least one device in the first device group sends first status information of the at least one device in the first device group to the cloud device.

Specifically, the at least one device in the first device group may send the first status information of the at least one device in the first device group to the cloud device in real time or periodically, for example, over a wired network or a wireless network. For example, a first device in the first device group may send first status information of the first device to the cloud device. In addition, the first device may also receive first status information of another device in the first device group, and send the first status information of the another device to the cloud device. This may be specifically determined based on an actual situation, and is not limited herein.

In an example, the first status information may include one or more of an identifier, running information, speed information, and screen brightness information of a device in the first device group. The running information may indicate whether the corresponding device in the first device group is in a running state.

In an example, the first device group may include the first device and a second device, and the data sharing policy for the first cloud account that is stored in the cloud device may include a correspondence between the first device and a first sharing policy and a correspondence between the second device and a second sharing policy. The first sharing policy may include a first sharing object, a first data sharing type, and a first data sharing condition, and the second sharing policy may include the first sharing object, a second data sharing type, and a second data sharing condition. The first sharing object is associated with the second cloud account, that is, the first sharing object is an object to which the second cloud account belongs. It may be understood that the data sharing policy for the first cloud account that is stored in the cloud device is equivalent to a stored correspondence between each device under the first cloud account and a sharing policy to which the device belongs.

In addition, the data sharing policy may further include a data sharing periodicity. For example, data sharing is performed every day or every other day.

In an example, a data sharing type in the data sharing policy for the first cloud account that is stored in the cloud device may include one or more of a data type, a file type, and a multimedia type. For example, the data type may include an integer type, a floating-point number type, a character type, and a Boolean type; the file type may include a document, a compressed package, a web page, and an installation package; and the multimedia type may include a text, a sound, an animation, a video image, and an image.

A data sharing condition in the data sharing policy for the first cloud account that is stored in the cloud device may include one or more of a data sharing scenario, a data sharing priority, and a data sharing time period.

The data sharing scenario may include one or more of a sports scenario, an entertainment scenario, a driving scenario, a travel scenario, a leisure scenario, a viewing scenario, and a learning scenario. For example, as shown in FIG. 7j, the sharing scenario includes a driving scenario, a sports scenario, and an entertainment scenario. For example, the sports scenario may be a scenario in which a user runs, swims, or does yoga; the entertainment scenario may be a scenario in which the user watches a movie or a TV series, or listens to music; the driving scenario may be a scenario in which the user drives a vehicle; the travel scenario may be a scenario in which the user is on a journey; the leisure scenario may be a scenario in which the user walks or sits idly; the viewing scenario may be a scenario in which the user stops to view a target (such as a building, a tree, or a flower); and the learning scenario may be a scenario in which the user is learning, for example, a scenario in which the user learns by using learning software in a device.

The data sharing priority may be understood as a priority between devices in the first device group. As shown in FIG. 7k, a priority of the vehicle is higher than a priority of the mobile phone, a priority of the mobile phone is higher than a priority of the speaker, and a priority of the speaker is higher than a priority of the watch.

The data sharing time period may be understood as a time period in which the device in the first device group shares data. For example, as shown in FIG. 7i, a data sharing time period is 10:00 to 12:00 and 14:00 to 16:00. It should be understood that the foregoing data sharing periodicity may be combined with the data sharing time period herein. For example, as shown in FIG. 7m, the data sharing periodicity is 2020 Oct. 1 to 2020 Oct. 7, and the data sharing time period is 10:00 to 12:00 and 14:00 to 16:00.

In an example, all devices in the first device group may send their respective first status information to the cloud device. For example, the first device may send the first status information of the first device to the cloud device, and the second device may send first status information of the second device to the cloud device.

Operation S1302: In response to receiving the first status information of the at least one device in the first device group, the cloud device determines a target device based on the first status information and the data sharing policy, where the target device is one of the at least one device in the first device group.

Specifically, the cloud device receives the first status information of the at least one device in the first device group, and may select one or more target devices from the at least one device in the first device group through screening based on the first status information and the data sharing policy.

In an example, the first data sharing condition of the first device and the second data sharing condition of the second device each may be a data sharing scenario, the data sharing scenario corresponding to the first data sharing condition is a driving scenario, and the data sharing scenario corresponding to the second data sharing condition is an entertainment scenario. The first status information of the first device may include speed information and an identifier of the first device, and the first status information of the second device may be screen brightness information and an identifier of the second device. In this case, that the cloud device determines a target device based on the first status information and the data sharing policy may be specifically: if a speed of the first device is greater than a preset speed threshold, determining that the first device is in a moving state, determining that the first device meets the driving scenario, and determining that the first device is the target device; and/or if screen brightness of the second device is greater than a preset brightness threshold, determining that the second device meets the entertainment scenario, and determining that the second device is the target device. It may be understood that, when the screen brightness of the second device is greater than the preset brightness threshold, it indicates that the second device is in use. In this case, it may be determined that the second device meets the entertainment scenario. Further, to improve screening accuracy, duration in which the screen brightness of the second device is greater than the preset brightness threshold may be further recorded. When the duration exceeds preset duration, it may be determined that the second device meets the entertainment scenario.

In an example, the first data sharing condition of the first device and the second data sharing condition of the second device each may be a data sharing time period, the data sharing time period corresponding to the first data sharing condition is a first time period, and the data sharing time period corresponding to the second data sharing condition is a second time period. The first status information of the first device may include first running information and an identifier of the first device, the first running information is used to indicate whether the first device is in a running state, the first status information of the second device may include second running information and an identifier of the second device, and the second running information is used to indicate whether the second device is in a running state. In this case, the cloud device determines a target device based on the first status information and the data sharing policy may be specifically: if both the first device and the second device are in a running state, and a current time period belongs to the first time period, determining that the first device is the target device; or if both the first device and the second device are in a running state, and a current time period belongs to the second time period, determining that the second device is the target device.

For example, the first device may be a vehicle, and the first running information may include speed information and/or start/stop information of the vehicle; and/or the second device may be an electronic device having a screen, and the second running information may include screen brightness information and/or power-on/off information of the electronic device.

In an example, the first data sharing condition of the first device and the second data sharing condition of the second device each may further include the data sharing priority, and a priority of the first device is higher than that of the second device. In this case, that the cloud device determines a target device based on the first status information and the data sharing policy may be specifically: if both the first device and the second device meet the data sharing scenario and/or the data sharing time period, determining that the first device is the target device. For example, as shown in FIG. 7k, if both the vehicle and the mobile phone meet the data sharing scenario and/or the data sharing time period, but the priority of the vehicle is higher than that of the mobile phone, the vehicle may be determined as the target device.

Operation S1303: The cloud device sends a first message to the target device in response to determining the target device, where the first message is used to indicate the target device to share data.

Specifically, after determining the target device, the cloud device may indicate the target device to share data, for example, send the first message used to indicate the target device to share data to the target device.

Operation S1304: The target device sends first data to the at least one device in the second device group in response to receiving the first message, where the first data is associated with the data sharing policy for the first cloud account.

Specifically, after receiving the first message, the target device may send the first data to the at least one device in the second device group. The first data is associated with the data sharing policy for the first cloud account. In an example, that the first data is associated with the data sharing policy for the first cloud account may be specifically: The first data is all or a part of data included in the first data sharing type. For example, the target device may be the mobile phone A2 shown in FIG. 12a, and the at least one device in the second device group may be the smart television B2 shown in FIG. 12b. In this case, the mobile phone A2 may share a picture captured by the mobile phone A2 with the smart television B2, so that a user using the smart television B2 can view the picture shared by the mobile phone A2.

Figure 14:
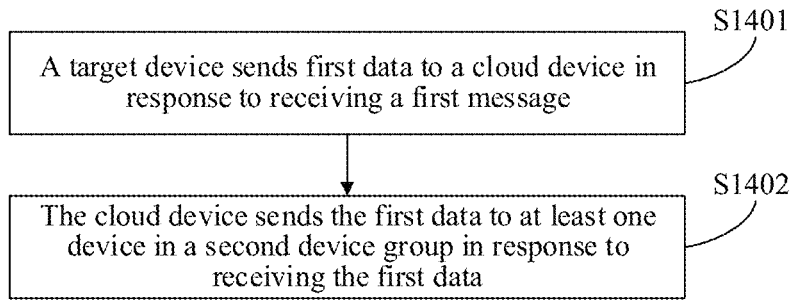
FIG. 14 is a schematic diagram of an operation in which a target device sends first data to at least one device in a second device group according to an embodiment of this application.

In an example, as shown in FIG. 14, that the target device sends first data to the at least one device in the second device group may specifically include the following operations.

Operation S1401: The target device sends the first data to the cloud device in response to receiving the first message.

Specifically, the target device may send the first data to the cloud device in response to the received first message.

Operation S1402: The cloud device sends the first data to the at least one device in the second device group in response to receiving the first data.

Specifically, after receiving the first data, the cloud device may forward the first data to the at least one device in the second device group.

It may be understood that the at least one device in the second device group may also send second status information of the at least one device in the second device group to the cloud device in real time or periodically. After receiving the second status information, the cloud device may determine a device in an online state in the second device group, for example, a fifth device. Then, the cloud device may forward the first data to the device in an online state in the second device group, for example, the fifth device. For example, the second status information may represent that a corresponding device in the second device group is online. In an example, if all devices in the second device group are in an offline state, the cloud device may temporarily store the first data, and when there is a device in an online state in the second device group, the cloud device sends the first data to the device in an online state in the second device group.

In an example, the first message received by the target device may carry an identifier of a device in an online state in the second device group, for example, an identifier of a fifth device. In this case, in response to the received first message, the target device may send the first data to the device in an online state in the second device group, for example, the fifth device.

It may be understood that the cloud device may determine a device in an online state in the second device group. For example, the cloud device may determine, based on second status information of the at least one device in the second device group, that a fifth device is online. The at least one device in the second device group includes the fifth device. In addition, before the cloud device determines, based on the second status information of the at least one device in the second device group, that the fifth device is online, the fifth device may send second status information of the fifth device to the cloud device. The second status information of the fifth device may be used to represent that the fifth device is online. For example, the second status information may include running information, and the running information may include one or more of power-on/off information, start/stop information, and screen brightness information of a device.

In this way, the data sharing method can implement data sharing between cloud accounts, so that different devices belonging to one cloud account can automatically share their respective data with a device belonging to another cloud account in a specific scenario. This simplifies a data sharing process, and improves a degree of intelligence of data sharing.

The following describes a method for setting the data sharing policy for the first cloud account in this solution.

It may be understood that, in this solution, the data sharing policy for the first cloud account may be set by using any device in the first device group.

Figure 15:
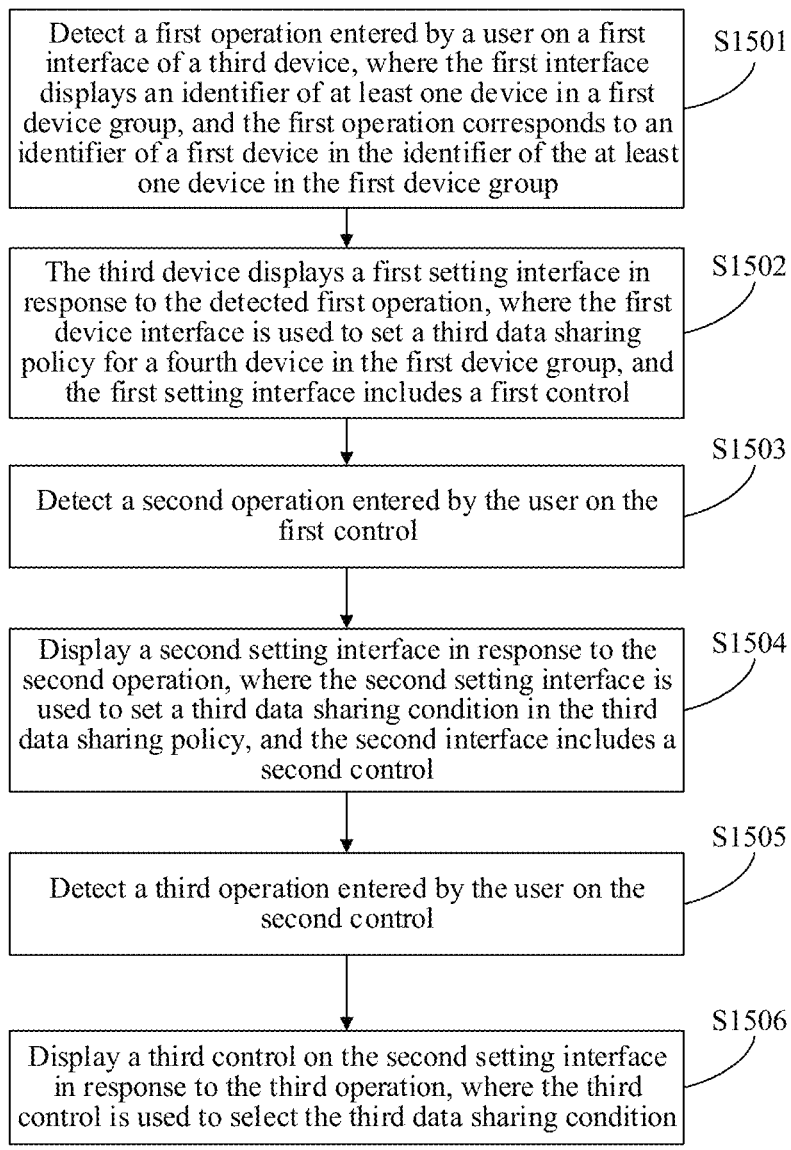
FIG. 15 is a schematic flowchart of a method for setting a data sharing policy for a first cloud account according to an embodiment of this application.

FIG. 15 is a schematic flowchart of a method for setting a data sharing policy for a first cloud account according to an embodiment of this application. The method is performed by a third device included in a first device group. The third device may be the first device and/or the second device described above, or may be another device in the first device group. This is not limited herein. As shown in FIG. 15, the method includes the following operations.

Operation S1501: Detect a first operation entered by a user on a first interface of the third device, where the first interface displays an identifier of the at least one device in the first device group, and the first operation corresponds to the identifier of the first device in the identifier of the at least one device in the first device group.

Specifically, the first interface of the third device displays the identifier of the at least one device in the first device group. For example, the interface shown in FIG. 6e may be understood as the first interface, and the mobile phone, the vehicle, the tablet, and the speaker in the interface shown in FIG. 6e may be understood as identifiers of devices in the first device group.

The third device may detect an input operation (that is, the first operation) of the user on the first interface in real time or periodically. The input operation may be a voice input operation, or may be a touch operation. For example, the first operation may be a touch control operation for the "mobile phone" in the interface displayed in FIG. 6e, for example, a single-finger tap operation. In this solution, the first operation corresponds to the identifier of the first device in the identifier of the at least one device in the first device group.

Operation S1502: The third device displays a first setting interface in response to the detected first operation, where the first device interface is used to set a third data sharing policy for a fourth device in the first device group, and the first setting interface includes a first control.

Specifically, after detecting the first operation entered by the user, the third device may display the first setting interface in response to the operation. The first device interface is used to set the third data sharing policy for the fourth device in the first device group, and the first setting interface includes the first control. For example, the first setting interface may be the interface displayed in FIG. 7a, and the interface may be used to set a data sharing policy for the mobile phone, the vehicle, the tablet, or the speaker in FIG. 6e. In addition, the interface displayed in FIG. 7a includes the first control, and the first control may be a control 72 for setting a sharing object, a control 75 for setting shared content, or a control 76 for setting a sharing condition.

It may be understood that the fourth device may be the first device, the second device, or the third device, or another device in the first device group. This is not limited herein.

Operation S1503: Detect a second operation entered by the user on the first control.

Specifically, the third device may detect an input operation (that is, the second operation) of the user on the first control in real time or periodically. The input operation may be a voice input operation, or may be a touch operation. For example, the second operation may be a touch control operation for the control 76 for setting a sharing condition in the interface displayed in FIG. 7a, for example, a single-finger tap operation.

Operation S1504: Display a second setting interface in response to the second operation, where the second setting interface is used to set a third data sharing condition in the third data sharing policy, and the second interface includes a second control.

Specifically, the third device may display the second setting interface in response to the second operation. The second setting interface is used to set the third data sharing condition in the third data sharing policy, and the second interface includes the second control. For example, the second setting interface may be the interface shown in FIG. 7g, and the interface may be used to set the third data sharing condition in the third data sharing policy, for example, a sharing manner. In addition, the interface displayed in FIG. 7g includes the second control, and the second control may be the control 78 for setting a sharing manner.

Operation S1505: Detect a third operation entered by the user on the second control.

Specifically, the third device may detect an input operation (that is, the third operation) of the user on the second control in real time or periodically. The input operation may be a voice input operation, or may be a touch operation. For example, the third operation may be a touch control operation for the control 78 for setting a sharing manner in the interface displayed in FIG. 7g, for example, a single-finger tap operation.

Operation S1506: Display a third control on the second setting interface in response to the third operation, where the third control is used to select the third data sharing condition.

Specifically, in response to the third operation, the third device may display, on the second setting interface, the third control used to select the third data sharing condition. For example, the third control may be a control 791, 792, 793, or 794 in the interface displayed in FIG. 7h. In this case, the user may select the third data sharing condition as time period-based sharing, scenario-based sharing, priority-based sharing, and/or the like.

In this way, the data sharing policy for the first cloud account may be set by setting the data sharing policy in the third device.

Further, the third device may send, to the cloud device, the third data sharing policy that has been set by the user. Then, the cloud device stores the third data sharing policy for the first cloud account in response to receiving the third data sharing policy.

The following describes a method for establishing the association relationship between the first cloud account and the second cloud account in this solution.

Figure 16:
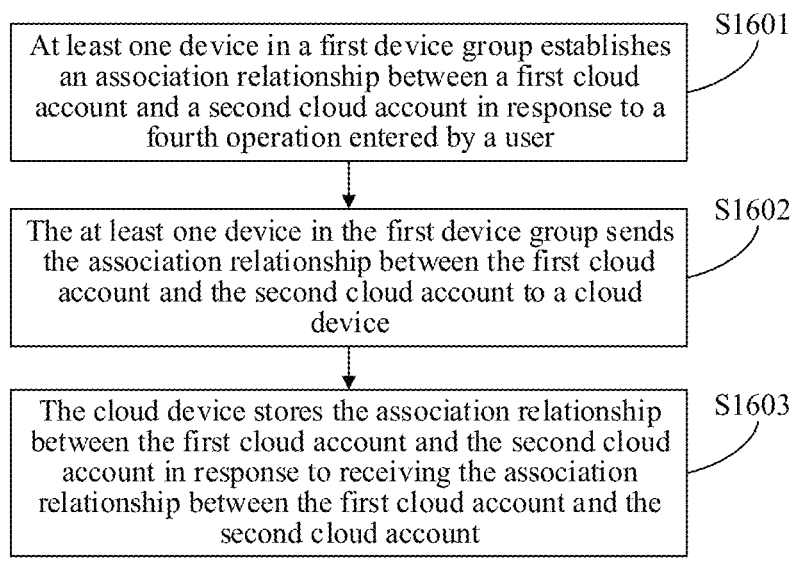
FIG. 16 is a schematic flowchart of a method for establishing an association relationship between a first cloud account and a second cloud account according to an embodiment of this application.

FIG. 16 is a schematic flowchart of a method for establishing an association relationship between a first cloud account and a second cloud account according to an embodiment of this application. As shown in FIG. 16, the method includes the following operations.

Operation S1601: The at least one device in the first device group establishes the association relationship between the first cloud account and the second cloud account in response to a fourth operation entered by the user.

Specifically, the at least one device (for example, the first device) in the first device group may detect an input operation (that is, the fourth operation) of the user in real time or periodically. The input operation may be a voice input operation, or may be a touch operation. For example, the fourth operation may be a touch operation for "Add a friend" in the display area 66 in FIG. 6c, for example, a single-finger tap operation. In this solution, the fourth operation may be understood as an operation of adding a friend.

After detecting the input operation of the user, the at least one device (for example, the first device) in the first device group may establish the association relationship between the first cloud account and the second cloud account in response to the input operation. For example, still refer to FIG. 6c. After the user chooses to add "User1" displayed in the display area 66 as a friend, and "User1" agrees, the at least one device (for example, the first device) in the first device group may establish the association relationship between the first cloud account and the second cloud account. It may be understood that the association relationship between the first cloud account and the second cloud account may alternatively be established in another manner. This is not limited herein.

Operation S1602: The at least one device in the first device group sends the association relationship between the first cloud account and the second cloud account to the cloud device.

Specifically, after establishing the association relationship between the first cloud account and the second cloud account, the at least one device (for example, the first device) in the first device group may send the association relationship between the first cloud account and the second cloud account to the cloud device.

Operation S1603: The cloud device stores the association relationship between the first cloud account and the second cloud account in response to receiving the association relationship between the first cloud account and the second cloud account.

Specifically, the cloud device may store the association relationship between the first cloud account and the second cloud account in response to the association relationship between the first cloud account and the second cloud account that is received by the cloud device. In this way, the cloud device may complete work of storing the association relationship between the first cloud account and the second cloud account.

Figure 17:
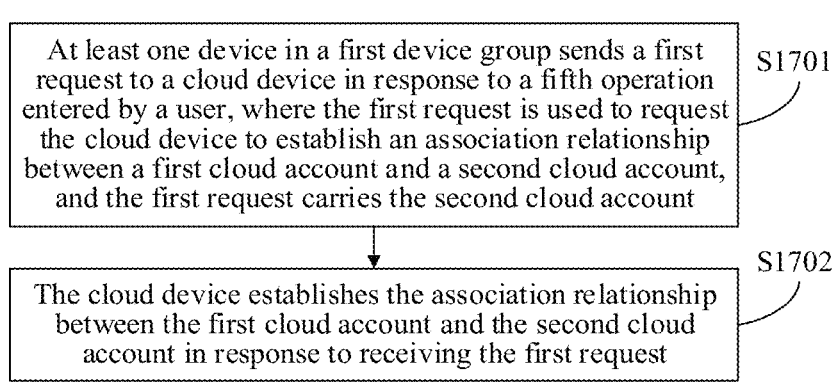
FIG. 17 is a schematic flowchart of another method for establishing an association relationship between a first cloud account and a second cloud account according to an embodiment of this application.

FIG. 17 is a schematic flowchart of another method for establishing an association relationship between a first cloud account and a second cloud account according to an embodiment of this application. As shown in FIG. 17, the method includes the following operations.

Operation S1701: The at least one device in the first device group sends a first request to the cloud device in response to a fifth operation entered by the user, where the first request is used to request the cloud device to establish the association relationship between the first cloud account and the second cloud account, and the first request carries the second cloud account.

Specifically, the at least one device (for example, the first device) in the first device group may detect an input operation (that is, the fifth operation) of the user in real time or periodically. The input operation may be a voice input operation, or may be a touch operation.

After detecting the input operation of the user, the at least one device (for example, the first device) in the first device group may send the first request to the cloud device in response to the input operation. The first request may carry the first cloud account and the second cloud account. In addition, the first request may be used to request the cloud device to establish the association relationship between the first cloud account and the second cloud account.

Operation S1702: The cloud device establishes the association relationship between the first cloud account and the second cloud account in response to receiving the first request.

Specifically, after receiving the first request, the cloud device may establish the association relationship between the first cloud account and the second cloud account in response to the first request, and store the association relationship, for example, mark the first cloud account and the second cloud account as a friend relationship. In this way, the cloud device may complete work of establishing and storing the association relationship between the first cloud account and the second cloud account.

The following describes another data sharing method provided in a solution.

Figure 18:
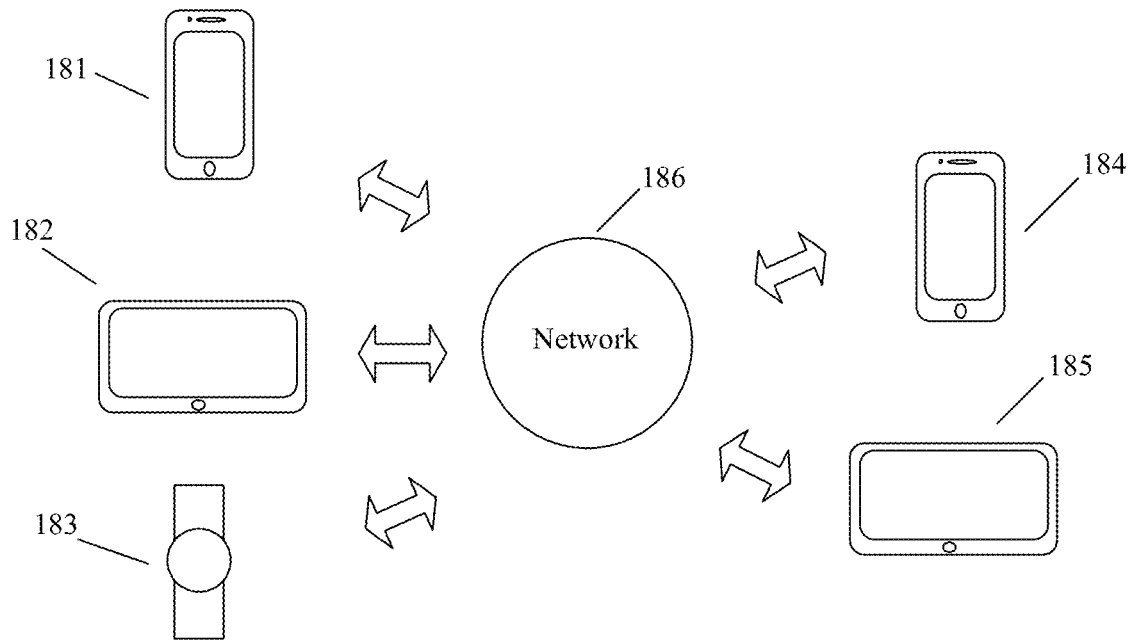
FIG. 18 is a schematic diagram of an architecture of another data sharing system according to an embodiment of this application.

The data sharing method provided in this solution may be applied to a system including a first device group and a second device group. The first device group and the second device group each include at least one device, a first cloud account is used to log in to a device in the first device group, and a second cloud account is used to log in to a device in the second device group. The at least one device in the first device group includes a first device, and the first device stores a data sharing policy for the first cloud account and an association relationship between the first cloud account and the second cloud account. The first device group may be understood as a device group including one or more of terminals 181, 182, and 183 in FIG. 18. The device in the first device group may include one or more of the terminals 181, 182, and 183. The second device group may be understood as a device group including one or more of terminals 184 and 185 in FIG. 18. The device in the second device group may include one or more of the terminals 184 and 185. In FIG. 18, the first device group and the second device group may communicate with each other over a network 186. The network 186 may be a wired network or a wireless network. This is not limited herein. The following describes specific operations of the data sharing method provided in this solution.

Figure 19:
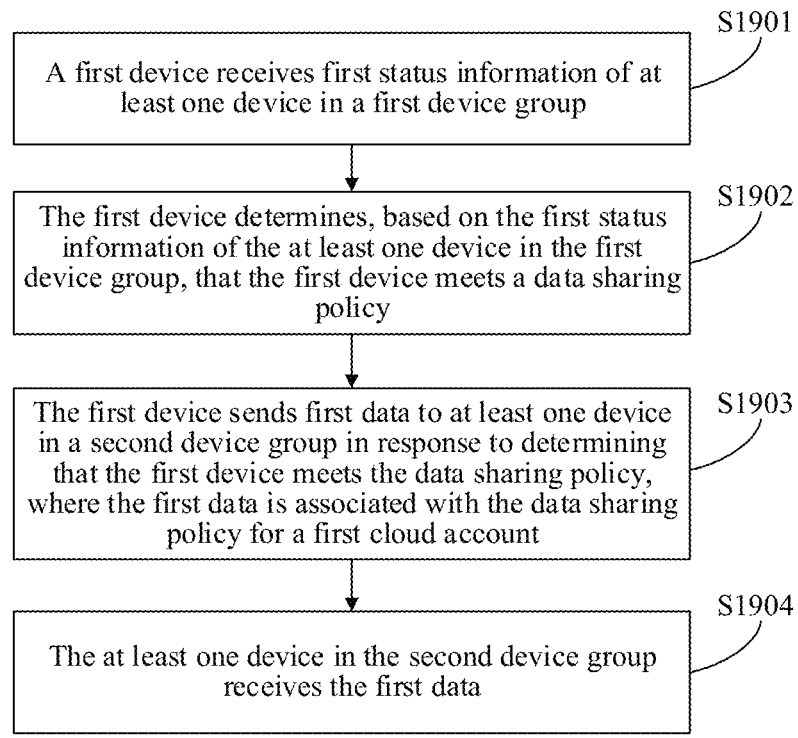
FIG. 19 is a schematic flowchart of another data sharing method according to an embodiment of this application.

FIG. 19 is a schematic flowchart of another data sharing method according to an embodiment of this application. As shown in FIG. 19, the data sharing method may include the following operations.

Operation S1901: The first device receives first status information of the at least one device in the first device group.

Specifically, devices in the first device group may communicate with each other over a network.

In an example, the first device may send a request to one or more other devices in the first device group in real time or periodically. The request may be a request for obtaining first status information of a corresponding device. After receiving the request sent by the first device, the other devices in the first device group may send their respective first status information to the first device, and then the first device may receive the first status information of the other devices in the first device group.

In an example, devices other than the first device in the first device group may actively send their respective first status information to the first device in real time or periodically, and then the first device may receive the first status information of the devices other than the first device in the first device group.

In an example, the first device may directly obtain first status information of the first device by using the first device. For example, when the first status information is power-on duration, the first device may learn of the power-on duration of the first device from power-on-related information recorded in the system of the first device.

Operation S1902: The first device determines, based on the first status information of the at least one device in the first device group, that the first device meets the data sharing policy.

Specifically, the first device may determine, based on the first status information of the at least one device in the first device group, whether the first device meets the data sharing policy. For example, the data sharing policy is as follows: When a speed of the first device is greater than 21 km/h, the first device shares data. In this case, when the speed of the first device is greater than 21 km/h, it may be determined that the first device meets the data sharing policy.

In an example, the first status information may include one or more of running information, speed information, and screen brightness information. The running information may indicate whether the first device is in a running state.

In an example, the data sharing policy may include a correspondence between the first device and a first data sharing policy, the first data sharing policy may include a sharing object, a data sharing type, and a data sharing condition, and the sharing object may be associated with the second cloud account. It may be understood that the data sharing policy for the first cloud account includes a correspondence between each device under the first cloud account and a data sharing policy for the device, for example, a correspondence between the first device and a data sharing policy for the first device, a correspondence between a second device and a data sharing policy for the second device, and a correspondence between a third device and a data sharing policy for the third device.

The data sharing type may include one or more of a data type, a file type, and a multimedia type. For example, the data type may include an integer type, a floating-point number type, a character type, and a Boolean type; the file type may include a document, a compressed package, a web page, and an installation package; and the multimedia type may include a text, a sound, an animation, a video image, and an image.

The data sharing condition may include one or more of a data sharing scenario, a data sharing priority, and a data sharing time period.

The data sharing scenario may include one or more of a sports scenario, an entertainment scenario, a driving scenario, a travel scenario, a leisure scenario, a viewing scenario, and a learning scenario. For example, as shown in FIG. 7j, the sharing scenario includes a driving scenario, a sports scenario, and an entertainment scenario. For example, the sports scenario may be a scenario in which a user runs, swims, or does yoga; the entertainment scenario may be a scenario in which the user watches a movie or a TV series, or listens to music; the driving scenario may be a scenario in which the user drives a vehicle; the travel scenario may be a scenario in which the user is on a journey; the leisure scenario may be a scenario in which the user walks or sits idly; the viewing scenario may be a scenario in which the user stops to view a target (such as a building, a tree, or a flower); and the learning scenario may be a scenario in which the user is learning, for example, a scenario in which the user learns by using learning software in a device.

The data sharing priority may be understood as a priority between devices in the first device group. As shown in FIG. 7k, a priority of the vehicle is higher than a priority of the mobile phone, a priority of the mobile phone is higher than a priority of the speaker, and a priority of the speaker is higher than a priority of the watch.

The data sharing time period may be understood as a time period in which the device in the first device group shares data. For example, as shown in FIG. 7i, a data sharing time period is 10:00 to 12:00 and 14:00 to 16:00. It should be understood that the foregoing data sharing periodicity may be combined with the data sharing time period herein. For example, as shown in FIG. 7m, the data sharing periodicity is 1919 Oct. 1 to 1919 Oct. 7, and the data sharing time period is 10:00 to 12:00 and 14:00 to 16:00.

Operation S1903: The first device sends first data to the at least one device in the second device group in response to determining that the first device meets the data sharing policy, where the first data is associated with the data sharing policy for the first cloud account.

Specifically, after determining that the first device meets the data sharing policy, the first device may send the first data to the at least one device in the second terminal device group. The first data is associated with the data sharing policy for the first cloud account. In an example, that the first data is associated with the data sharing policy for the first cloud account may be specifically: The first data is all or a part of data included in the data sharing type of the first device.

In an example, the first device may determine, based on second status information of the at least one device in the second device group, that a fifth device is online. The at least one device in the second device group includes the fifth device. Then, the first device sends the first data to the fifth device.

In addition, before the first device determines, based on the second status information of the at least one device in the second device group, that the fifth device is online, the fifth device may send second status information of the fifth device to the first device. The second status information of the fifth device may be used to represent that the fifth device is online. In this way, the first device may determine a device in an online state in the second device group, and may send the first data to the device in an online state in the second device group.

Operation S1904: The at least one device in the second device group receives the first data.

Specifically, after the first device sends the first data, the at least one device in the second device group may receive the first data.

In an example, if all devices in the second device group are in an offline state, the first device may send the first data to a server to which the second cloud account belongs, and the server to which the second cloud account belongs temporarily stores the first data. Then, when there is a device in an online state in the second device group, the server to which the second cloud account belongs may forward the first data to the device in an online state in the second device group.

The following describes another data sharing method provided in a solution.

The data sharing method provided in this solution may be applied to a system including a first device group and a second device group. The first device group and the second device group each include at least one device, a first cloud account is used to log in to a device in the first device group, and a second cloud account is used to log in to a device in the second device group. The at least one device in the first device group includes a first device, and the first device stores a data sharing policy for the first cloud account and an association relationship between the first cloud account and the second cloud account. The first device group may be understood as a device group including one or more of terminals 181, 182, and 183 in FIG. 18. The device in the first device group may include one or more of the terminals 181, 182, and 183. The second device group may be understood as a device group including one or more of terminals 184 and 185 in FIG. 18. The device in the second device group may include one or more of the terminals 184 and 185. In FIG. 18, the first device group and the second device group may communicate with each other over a network 186. The network 186 may be a wired network or a wireless network. This is not limited herein. The following describes specific operations of the data sharing method provided in this solution.

Figure 20:
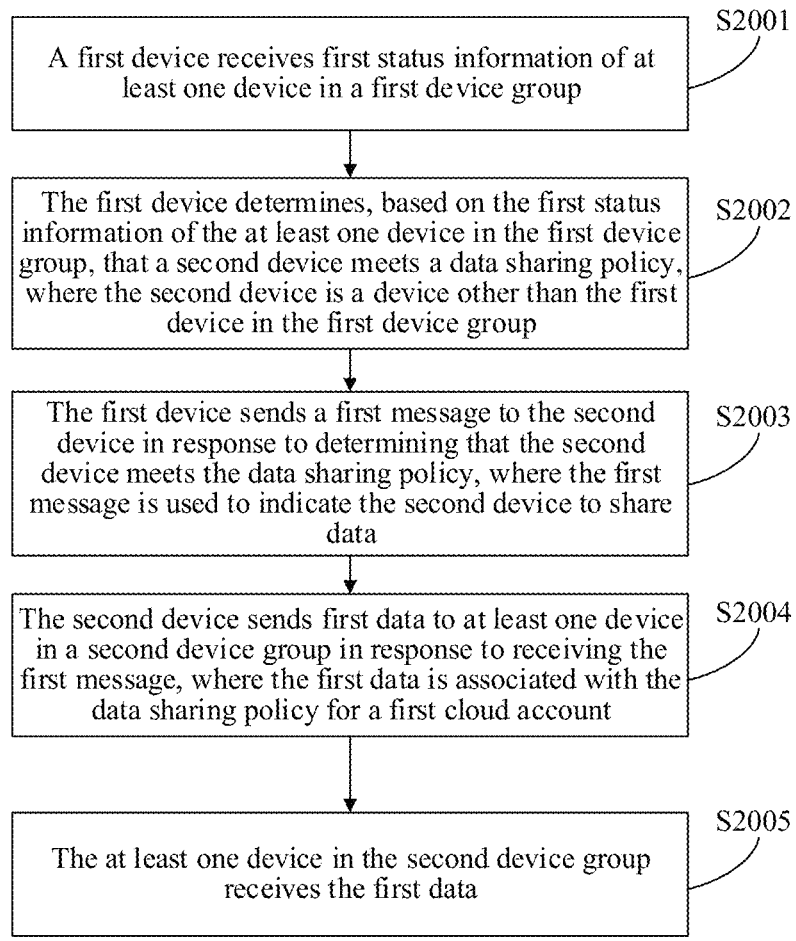
FIG. 20 is a schematic flowchart of another data sharing method according to an embodiment of this application.

FIG. 20 is a schematic flowchart of another data sharing method according to an embodiment of this application. As shown in FIG. 20, the data sharing method may include the following operations.

Operation S2001: The first device receives first status information of the at least one device in the first device group.

Specifically, devices in the first device group may communicate with each other over a network.

In an example, the first device may send a request to one or more other devices in the first device group in real time or periodically. The request may be a request for obtaining first status information of a corresponding device. After receiving the request sent by the first device, the other devices in the first device group may send their respective first status information to the first device, and then the first device may receive the first status information of the other devices in the first device group.

In an example, devices other than the first device in the first device group may actively send their respective first status information to the first device in real time or periodically, and then the first device may receive the first status information of the devices other than the first device in the first device group.

In an example, the first device may directly obtain first status information of the first device by using the first device. For example, when the first status information is power-on duration, the first device may learn of the power-on duration of the first device from power-on-related information recorded in the system of the first device.

Operation S2002: The first device determines, based on the first status information of the at least one device in the first device group, that a second device meets the data sharing policy, where the second device is a device other than the first device in the first device group.

Specifically, the first device may determine, based on the first status information of the at least one device in the first device group, whether a device other than the first device meets the data sharing policy, for example, determine whether the second device in the first device group meets the data sharing policy. For example, the data sharing policy is as follows: When a speed of the second device is greater than 21 km/h, the second device shares data. In this case, when the speed of the second device is greater than 21 km/h, it may be determined that the second device meets the data sharing policy.

In an example, the first status information may include one or more of running information, speed information, and screen brightness information. The running information may indicate whether the second device is in a running state.

In an example, the data sharing policy may include a correspondence between the second device and a second data sharing policy, the second data sharing policy includes a sharing object, a data sharing type, and a data sharing condition, and the sharing object may be associated with the second cloud account. It may be understood that the data sharing policy for the first cloud account includes a correspondence between each device under the first cloud account and a data sharing policy for the device, for example, a correspondence between the first device and a data sharing policy for the first device, a correspondence between the second device and a data sharing policy for the second device, and a correspondence between a third device and a data sharing policy for the third device.

For the data sharing type, the data sharing condition, and the like, refer to the foregoing related descriptions in the method shown in FIG. 19. Details are not described herein again.

Operation S2003: The first device sends a first message to the second device in response to determining that the second device meets the data sharing policy, where the first message is used to indicate the second device to share data.

Specifically, after determining that the second device meets the data sharing policy, the first device may send, to the second device over a network, the first message used to indicate the second device to share data, so that the second device shares data.

Operation S2004: The second device sends first data to the at least one device in the second device group in response to receiving the first message, where the first data is associated with the data sharing policy for the first cloud account.

Specifically, after receiving the first message sent by the first device, the second device may send the first data to the at least one device in the second terminal device group. The first data is associated with the data sharing policy for the first cloud account. In an example, that the first data is associated with the data sharing policy for the first cloud account may be specifically: The first data is all or a part of data included in the data sharing type of the first device.

In an example, the first device may determine, based on second status information of the at least one device in the second device group, that a fifth device is online. The at least one device in the second device group includes the fifth device. Then, the first device adds an identifier of the fifth device to the first message, and sends the first message to the fifth device. Further, after receiving the first message, the second device may directly send the first data to the fifth device based on the identifier of the fifth device.

In addition, before the first device determines, based on the second status information of the at least one device in the second device group, that the fifth device is online, the fifth device may send second status information of the fifth device to the first device. The second status information of the fifth device may be used to represent that the fifth device is online. In this way, the first device may determine a device in an online state in the second device group, and indicate the second device to send the first data to the device in an online state in the second device group.

Operation S2005: The at least one device in the second device group receives the first data.

Specifically, after the second device sends the first data, the at least one device in the second device group may receive the first data.

In an example, when the first device determines a device in an online state in the second device group, and the first device has notified the second device of an identifier of the device in an online state in the second device group, the second device may directly send the first data to the device in an online state in the second device group. In this case, the device in an online state in the second device group may receive the first data, and a device in an offline state in the second device group may not receive the first data.

In an example, if all devices in the second device group are in an offline state, the second device may send the first data to a server to which the second cloud account belongs, and the server to which the second cloud account belongs temporarily stores the first data. Then, when there is a device in an online state in the second device group, the server to which the second cloud account belongs may forward the first data to the device in an online state in the second device group.

The following describes another data sharing method provided in a solution.

Figure 21:
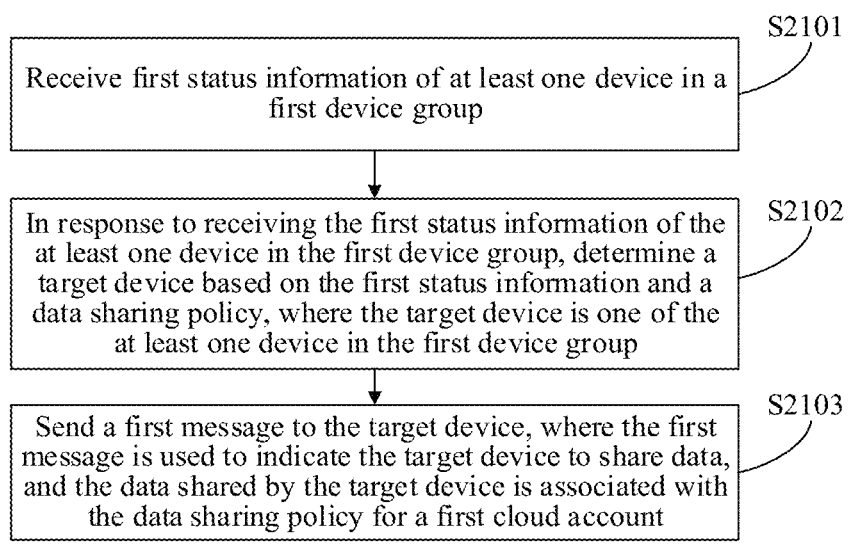
FIG. 21 is a schematic flowchart of another data sharing method according to an embodiment of this application.

FIG. 21 is a schematic flowchart of another data sharing method according to an embodiment of this application. The method may be applied to the cloud device shown in FIG. 1. The cloud device stores a data sharing policy for a first cloud account and a second cloud account and an association relationship between the first cloud account and the second cloud account, the first cloud account is used to log in to a device in a first device group, the second cloud account is used to log in to a device in a second device group, and the first device group and the second device group each include at least one device. As shown in FIG. 21, the data sharing method may include the following operations:

Operation S2101: Receive first status information of the at least one device in the first device group.

Operation S2102: In response to receiving the first status information of the at least one device in the first device group, determine a target device based on the first status information and the data sharing policy, where the target device is one of the at least one device in the first device group.

Operation S2103: Send a first message to the target device, where the first message is used to indicate the target device to share data, and the data shared by the target device is associated with the data sharing policy for the first cloud account.

It should be noted that, for a specific implementation process and a principle of the method provided in this solution, refer to the foregoing descriptions in the methods shown in FIG. 13 to FIG. 17. Details are not described herein again.

The following describes another data sharing method provided in a solution.

Figure 22:
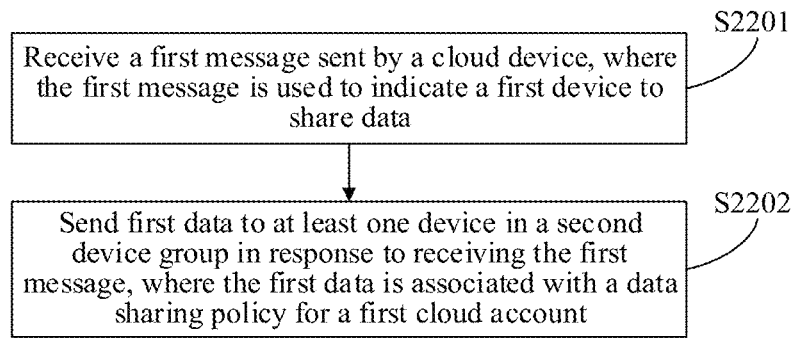
FIG. 22 is a schematic flowchart of another data sharing method according to an embodiment of this application.

FIG. 22 is a schematic flowchart of another data sharing method according to an embodiment of this application. The method may be applied to a first device, and the first device may be the terminal 11, 12, or 13 shown in FIG. 1. The first device is a device in a first device group, the first device group includes at least one device, and a first cloud account is used to log in to a device in the first device group. As shown in FIG. 22, the data sharing method may include the following operations.

Operation S2201: Receive a first message sent by a cloud device, where the first message is used to indicate the first device to share data.

The cloud device stores a data sharing policy for the first cloud account and a second cloud account and an association relationship between the first cloud account and the second cloud account, the second cloud account is used to log in to a device in a second device group, and the second device group includes at least one device.

Operation S2202: Send first data to the at least one device in the second device group in response to receiving the first message, where the first data is associated with the data sharing policy for the first cloud account.

It should be noted that, for a specific implementation process and a principle of the method provided in this solution, refer to the foregoing descriptions in the methods shown in FIG. 13 to FIG. 17. Details are not described herein again. The first device may be understood as the target device in the method in FIG. 13.

The following describes another data sharing method provided in a solution.

Figure 23:
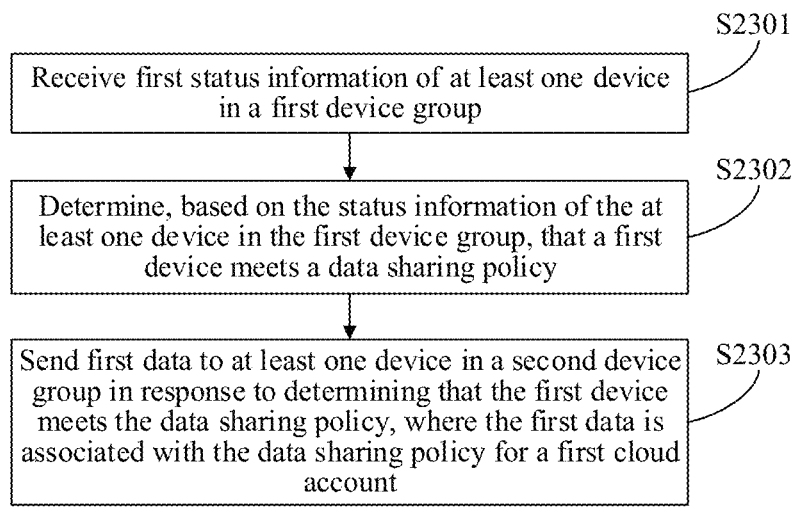
FIG. 23 is a schematic flowchart of another data sharing method according to an embodiment of this application.

FIG. 23 is a schematic flowchart of another data sharing method according to an embodiment of this application. The method may be applied to a first device, and the first device may be the terminal 181, 182, or 183 shown in FIG. 18. The first device is a device in a first device group, the first device group includes at least one device, a first cloud account is used to log in to a device in the first device group, the first device stores a data sharing policy for the first cloud account and an association relationship between the first cloud account and a second cloud account, the second cloud account is used to log in to a second device group, and the second device group includes at least one device. As shown in FIG. 23, the data sharing method may include the following operations:

Operation S2301: Receive first status information of the at least one device in the first device group.

Operation S2302: Determine, based on the first status information of the at least one device in the first device group, that the first device meets the data sharing policy.

Operation S2303: Send first data to the at least one device in the second device group in response to determining that the first device meets the data sharing policy, where the first data is associated with the data sharing policy for the first cloud account.

It should be noted that, for a specific implementation process and a principle of the method provided in this solution, refer to the foregoing descriptions in the method shown in FIG. 19. Details are not described herein again.

The following describes another data sharing method provided in a solution.

Figure 24:
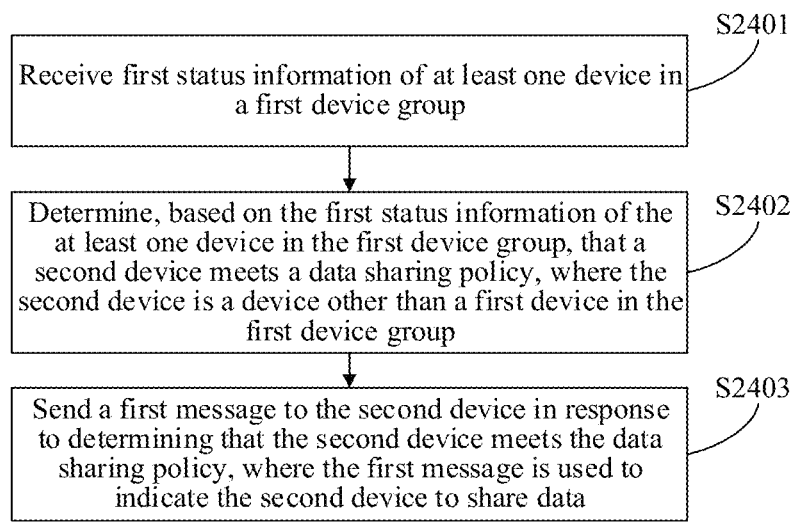
FIG. 24 is a schematic flowchart of another data sharing method according to an embodiment of this application.

FIG. 24 is a schematic flowchart of another data sharing method according to an embodiment of this application. The method may be applied to a first device, and the first device may be the terminal 181, 182, or 183 shown in FIG. 18. The first device is a device in a first device group, the first device group includes at least one device, a first cloud account is used to log in to a device in the first device group, the first device stores a data sharing policy for the first cloud account and an association relationship between the first cloud account and a second cloud account, the second cloud account is used to log in to a second device group, and the second device group includes at least one device. As shown in FIG. 24, the data sharing method may include the following operations:

Operation S2401: Receive first status information of the at least one device in the first device group.

Operation S2402: Determine, based on the first status information of the at least one device in the first device group, that a second device meets the data sharing policy, where the second device is a device other than the first device in the first device group.

Operation S2403: Send a first message to the second device in response to determining that the second device meets the data sharing policy, where the first message is used to indicate the second device to share data.

It should be noted that, for a specific implementation process and a principle of the method provided in this solution, refer to the foregoing descriptions in the method shown in FIG. 20. Details are not described herein again.

Figure 25:
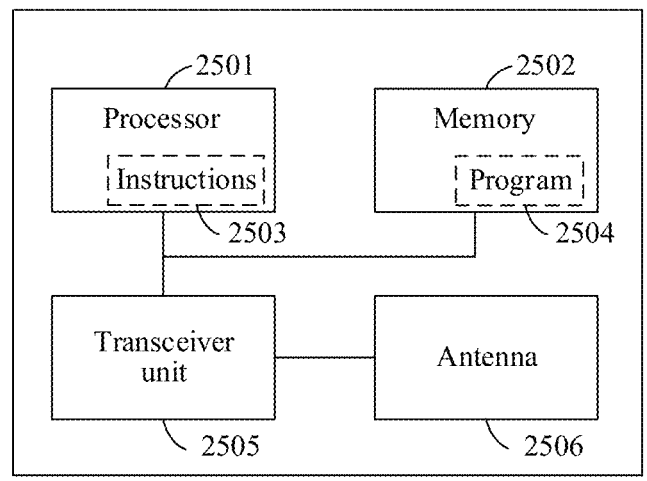
FIG. 25 is a schematic diagram of a structure of a data sharing apparatus according to an embodiment of this application.

Based on the methods in the foregoing embodiments, an embodiment of this application further provides a data sharing apparatus. FIG. 25 is a schematic diagram of a structure of a data sharing apparatus according to an embodiment of this application. As shown in FIG. 25, the data sharing apparatus provided in this embodiment of this application may be configured to implement the methods described in the foregoing method embodiments.

The data sharing apparatus includes at least one processor 2501, and the at least one processor 2501 may support the data sharing apparatus in implementing the methods provided in embodiments of this application.

The processor 2501 may be a general-purpose processor or a dedicated processor. For example, the processor 2501 may include a central processing unit (CPU) and/or a baseband processor. The baseband processor may be configured to process communication data (for example, determine a target screen terminal), and the CPU may be configured to: implement corresponding control and processing functions, execute a software program, and process data of the software program.

Further, the data sharing apparatus may further include a transceiver unit 2505, configured to implement input (receiving) and output (sending) of a signal. For example, the transceiver unit 2505 may include a transceiver or a radio frequency chip. The transceiver unit 2505 may further include a communications interface.

In an embodiment, the data sharing apparatus may further include an antenna 2506, which may be configured to support the transceiver unit 2505 in implementing receiving and sending functions of the data sharing apparatus.

In an embodiment, the data sharing apparatus may include one or more memories 2502. The memory 2502 stores a program (or instructions or code) 2504. The program 2504 may be run by the processor 2501, so that the processor 2501 performs the methods described in the foregoing method embodiments. In an embodiment, the memory 2502 may further store data. In an embodiment, the processor 2501 may further read the data (for example, prestored first feature information) stored in the memory 2502. The data and the program 2504 may be stored at a same storage address, or the data and the program 2504 may be stored at different storage addresses.

The processor 2501 and the memory 2502 may be disposed separately, or may be integrated together, for example, integrated on a board or integrated into a system-on-a-chip (SOC).

For detailed descriptions of the operations performed by the data sharing apparatus in the foregoing possible designs, refer to the descriptions in the method embodiments provided in embodiments of this application. Details are not described herein again.

Based on the apparatus in the foregoing embodiment, an embodiment of this application further provides an electronic device. The electronic device includes the data sharing apparatus provided in the foregoing embodiment.

Figure 26:
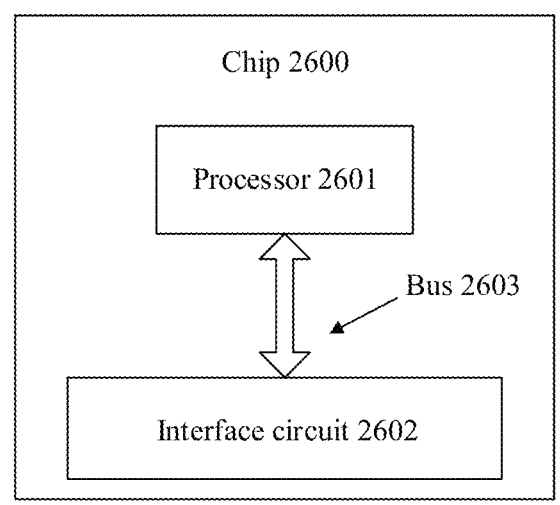
FIG. 26 is a schematic diagram of a structure of a chip according to an embodiment of this application.

Based on the methods in the foregoing embodiments, an embodiment of this application further provides a chip. FIG. 26 is a schematic diagram of a structure of a chip according to an embodiment of this application. As shown in FIG. 26, the chip 2600 includes one or more processors 2601 and an interface circuit 2602. In an embodiment, the chip 2600 may further include a bus 2603.

The processor 2601 may be an integrated circuit chip, and has a signal processing capability. In an implementation process, operations in the foregoing methods may be implemented by using an integrated logic circuit in a form of hardware in the processor 2601, or by using instructions in a form of software. The processor 2601 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor 2601 may implement or perform the methods and operations disclosed in embodiments of this application. The general-purpose processor may be a microprocessor, or the processor may be any conventional processor or the like.

The interface circuit 2602 may be configured to send or receive data, instructions, or information. The processor 2601 may process the data, instructions, or other information received through the interface circuit 2602, and send processed information through the interface circuit 2602.

In an embodiment, the chip further includes a memory. The memory may include a read-only memory and a random access memory, and provide operation instructions and data for the processor. A part of the memory may further include a nonvolatile random access memory (NVRAM).

In an embodiment, the memory stores an executable software module or a data structure, and the processor may perform a corresponding operation by invoking operation instructions (the operation instructions may be stored in an operating system) stored in the memory.

In an embodiment, the interface circuit 2602 may be configured to output an execution result of the processor 2601.

It should be noted that functions corresponding to the processor 2601 and the interface circuit 2602 may be implemented by using a hardware design, may be implemented by using a software design, or may be implemented by using a combination of software and hardware. This is not limited herein.

It should be understood that operations in the foregoing method embodiments may be implemented by using a logic circuit in a form of hardware in the processor, or by using instructions in a form of software.

It may be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor, or may be any conventional processor.

The method operations in embodiments of this application may be implemented in a hardware manner, or may be implemented in a manner of executing software instructions by the processor. The software instructions may include corresponding software modules. The software modules may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. An example storage medium is coupled to the processor, so that the processor can read information from the storage medium and write information into the storage medium. Certainly, the storage medium may be a component of the processor. The processor and the storage medium may be located in an ASIC.

All or some of the foregoing embodiments may be implemented by using software, hardware, firmware, or any combination thereof. When software is used to implement the foregoing embodiments, all or some of the foregoing embodiments may be implemented in a form of a computer program product. The computer program product includes one or more computer instructions. When the computer program instructions are loaded and executed on a computer, all or some of the procedures or functions in embodiments of this application are generated. The computer may be a general-purpose computer, a dedicated computer, a computer network, or another programmable apparatus. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It may be understood that various numbers in embodiments of this application are merely used for differentiation for ease of description, and are not used to limit the scope of embodiments of this application.

The invention claimed is:

1. A data sharing method, applied to a system, comprising:
sending, by at least one device in a first device group, first status information of the at least one device in the first device group to a cloud device, wherein the system comprises the first device group, a second device group, and the cloud device, wherein the first device group and the second device group each comprise the at least one device, a first cloud account is used to log in to a device in the first device group, a second cloud account is used to log in to a device in the second device group, the cloud device stores a data sharing policy for the first cloud account and an association relationship between the first cloud account and the second cloud account;
in response to receiving the first status information of the at least one device in the first device group, determining, by the cloud device, a target device based on the first status information and the data sharing policy, wherein the target device is one of the at least one device in the first device group;
sending, by the cloud device, a first message to the target device in response to determining the target device, wherein the first message is used to indicate the target device to share data; and
sending, by the target device, first data to the at least one device in the second device group in response to receiving the first message, wherein the first data is associated with the data sharing policy for the first cloud account.

2. The method according to claim 1, wherein the first device group comprises a first device and a second device, the data sharing policy comprises a correspondence between the first device and a first sharing policy and a correspondence between the second device and a second sharing policy, the first sharing policy comprises a first sharing object, a first data sharing type, and a first data sharing condition, the second sharing policy comprises the first sharing object, a second data sharing type, and a second data sharing condition, and the first sharing object is associated with the second cloud account.

3. The method according to claim 2, wherein that the first data is associated with the data sharing policy for the first cloud account comprises: the first data is all or a part of data comprised in the first data sharing type.

4. The method according to claim 2, wherein a data sharing type comprises one or more of a data type, a file type, and a multimedia type, wherein a data sharing condition comprises one or more of a data sharing scenario, a data sharing priority, or a data sharing time period, and the data sharing scenario comprises one or more of a sports scenario, an entertainment scenario, and a driving scenario.

5. The method according to claim 4, wherein the first data sharing condition and the second data sharing condition each are a data sharing scenario, the data sharing scenario corresponding to the first data sharing condition is a driving scenario, and the data sharing scenario corresponding to the second data sharing condition is an entertainment scenario;
the sending, by the at least one device in the first device group, first status information of the at least one device in the first device group to the cloud device comprises:
sending, by the first device, first status information of the first device to the cloud device, wherein the first status information of the first device comprises speed information and an identifier of the first device; and
sending, by the second device, first status information of the second device to the cloud device, wherein the first status information of the second device comprises screen brightness information and an identifier of the second device; and
the determining, by the cloud device, a target device based on the first status information and the data sharing policy comprises:
if a speed of the first device is greater than a preset speed threshold, determining that the first device meets the driving scenario, and determining that the first device is the target device; and/or if screen brightness of the second device is greater than a preset brightness threshold, determining that the second device meets the entertainment scenario, and determining that the second device is the target device.

6. The method according to claim 4, wherein the first data sharing condition and the second data sharing condition each are a data sharing time period, the data sharing time period corresponding to the first data sharing condition is a first time period, and the data sharing time period corresponding to the second data sharing condition is a second time period;
the sending, by the at least one device in the first device group, first status information of the at least one device in the first device group to the cloud device comprises:
sending, by the first device, first status information of the first device to the cloud device, wherein the first status information of the first device comprises first running information and an identifier of the first device, and the first running information is used to indicate whether the first device is in a running state; and
sending, by the second device, first status information of the second device to the cloud device, wherein the first status information of the second device comprises second running information and an identifier of the second device, and the second running information is used to indicate whether the second device is in a running state; and
the determining, by the cloud device, a target device based on the first status information and the data sharing policy comprises:
if both the first device and the second device are in a running state, and a current time period belongs to the first time period, determining that the first device is the target device; or
if both the first device and the second device are in a running state, and a current time period belongs to the second time period, determining that the second device is the target device.

7. The method according to claim 6, wherein the first device is a vehicle, and the first running information comprises speed information and/or start/stop information of the vehicle; and/or the second device is an electronic device having a screen, and the second running information comprises screen brightness information and/or power-on/off information of the electronic device.

8. The method according to claim 5, wherein the data sharing condition further comprises the data sharing priority, and a priority of the first device is higher than that of the second device; and
the determining, by the cloud device, a target device based on the first status information and the data sharing policy comprises:
if both the first device and the second device meet the data sharing scenario and/or the data sharing time period, determining that the first device is the target device.

9. The method according to claim 2, wherein the data sharing policy further comprises a data sharing periodicity.

10. The method according to claim 1, further comprising:
detecting, by a third device, a first operation entered by a user on a first interface of the third device, wherein the first interface displays an identifier of the at least one device in the first device group, and the first operation corresponds to the identifier of a first device in the identifier of the at least one device in the first device group, wherein the first device group further comprises the third device;
displaying, by the third device, a first setting interface in response to the detected first operation, wherein the first setting interface is used to set a third data sharing policy for a fourth device in the first device group, and the first setting interface comprises a first control;
detecting, by the third device, a second operation entered by the user on the first control;
displaying, by the third device, a second setting interface in response to the second operation, wherein the second setting interface is used to set a third data sharing condition in the third data sharing policy, and the second setting interface comprises a second control;
detecting, by the third device, a third operation entered by the user on the second control; and
displaying, by the third device, a third control on the second setting interface in response to the third operation, wherein the third control is used to select the third data sharing condition.

11. The method according to claim 1, further comprising:
establishing, by the at least one device in the first device group, the association relationship between the first cloud account and the second cloud account in response to a fourth operation entered by a user;
sending, by the at least one device in the first device group, the association relationship between the first cloud account and the second cloud account to the cloud device; and
storing, by the cloud device, the association relationship between the first cloud account and the second cloud account in response to receiving the association relationship between the first cloud account and the second cloud account.

12. The method according to claim 1, further comprising:
sending, by the at least one device in the first device group, a first request to the cloud device in response to a fifth operation entered by a user, wherein the first request is used to request the cloud device to establish the association relationship between the first cloud account and the second cloud account, and the first request carries the first cloud account and the second cloud account; and
establishing, by the cloud device, the association relationship between the first cloud account and the second cloud account in response to receiving the first request.

13. The method according to claim 1, further comprising:
before the sending, by the cloud device, a first message to the target device, determining, by the cloud device based on second status information of the at least one device in the second device group, that a fifth device is online, wherein the at least one device in the second device group comprises the fifth device;
the sending, by the cloud device, a first message to the target device comprises:
sending, by the cloud device, the first message to the target device, wherein the first message carries an identifier of the fifth device; and
the sending, by the target device, first data to the at least one device in the second device group in response to receiving the first message comprises:
sending, by the target device, the first data to the fifth device in response to receiving the first message.

14. The method according to claim 13, further comprising:
before the determining, by the cloud device based on second status information of the at least one device in the second device group, that a fifth device is online, sending, by the fifth device, second status information of the fifth device to the cloud device, wherein the second status information of the fifth device is used to represent that the fifth device is online.

15. A data sharing method, applied to a first device, comprising:
receiving first status information of at least one device in a first device group, wherein the first device is in the first device group, the first device group comprises the at least one device, a first cloud account is used to log in to a device in the first device group, the first device stores a data sharing policy for the first cloud account and an association relationship between the first cloud account and a second cloud account, the second cloud account is used to log in to a second device group, and the second device group comprises at least one device;
determining, based on the first status information of the at least one device in the first device group, that the first device meets the data sharing policy; and
sending first data to the at least one device in the second device group in response to determining that the first device meets the data sharing policy, wherein the first data is associated with the data sharing policy for the first cloud account; or
determining, based on the first status information of the at least one device in the first device group, that a second device meets the data sharing policy, wherein the second device is a device other than the first device in the first device group; and
sending a first message to the second device in response to determining that the second device meets the data sharing policy, wherein the first message is used to indicate the second device to share data.

16. The method according to claim 15, further comprising:
before the sending first data to the at least one device in the second device group, determining, based on second status information of the at least one device in the second device group, that a fifth device is online, wherein the at least one device in the second device group comprises the fifth device; and the sending first data to the at least one device in the second device group comprises: sending the first data to the fifth device; or before the sending a first message to the second device, determining, based on second status information of the at least one device in the second device group, that a fifth device is online, wherein the at least one device in the second device group comprises the fifth device; and the sending a first message to the second device comprises: the first message carries an identifier of the fifth device.

17. The method according to claim 16, further comprising:

Before the determining, based on second status information of the at least one device in the second device group, that a fifth device is online, receiving second status information of the fifth device that is sent by the fifth device, wherein the second status information of the fifth device is used to represent that the fifth device is online.

18. A first device, wherein the first device is in a first device group, the first device group comprises at least one device, a first cloud account is used to log in to a device in the first device group, the first device stores a data sharing policy for the first cloud account and an association relationship between the first cloud account and a second cloud account, the second cloud account is used to log in to a second device group, and the second device group comprises at least one device; and the first device comprises:

a memory configured to store program instructions;

a processor configured to execute the program instructions, causing the first device to perform:

receiving first status information of the at least one device in the first device group;

determining, based on the first status information of the at least one device in the first device group, that the first device meets the data sharing policy; and sending first data to the at least one device in the second device group in response to determining that the first device meets the data sharing policy, wherein the first data is associated with the data sharing policy for the first cloud account; or determining, based on the first status information of the at least one device in the first device group, that a second device meets the data sharing policy, wherein the second device is a device other than the first device in the first device group; and sending a first message to the second device in response to determining that the second device meets the data sharing policy, wherein the first message is used to indicate the second device to share data.

19. The first device according to claim 18, wherein the processor further configured to execute the program instructions, causing the first device to perform:

determining, based on second status information of the at least one device in the second device group, that a fifth device is online, wherein the at least one device in the second device group comprises the fifth device; and the sending first data to the at least one device in the second device group comprises: sending the first data to the fifth device; or before the sending a first message to the second device, the method further comprises:

determining, based on second status information of the at least one device in the second device group, that a fifth device is online, wherein the at least one device in the second device group comprises the fifth device; and the sending a first message to the second device comprises: the first message carries an identifier of the fifth device.

20. The first device according to claim 19, wherein the processor further configured to execute the program instructions, causing the first device to perform:

receiving second status information of the fifth device that is sent by the fifth device, wherein the second status information of the fifth device is used to represent that the fifth device is online.

\* \* \* \* \*